United States Patent
Gould et al.

(10) Patent No.: US 10,719,268 B2
(45) Date of Patent: Jul. 21, 2020

(54) TECHNIQUES FOR SAFELY AND EFFICIENTLY ENQUEUEING AND DEQUEUEING DATA ON A GRAPHICS PROCESSOR

(71) Applicant: Microsoft Technology Licensing, LLC, Redmond, WA (US)

(72) Inventors: Jason Matthew Gould, Woodinville, WA (US); Jack Andrew Elliott, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/024,656

(22) Filed: Jun. 29, 2018

(65) Prior Publication Data
US 2020/0004460 A1   Jan. 2, 2020

(51) Int. Cl.
*G06F 3/06* (2006.01)
*G06T 1/20* (2006.01)

(52) U.S. Cl.
CPC .......... *G06F 3/0659* (2013.01); *G06F 3/0613* (2013.01); *G06F 3/0631* (2013.01); *G06F 3/0644* (2013.01); *G06F 3/0679* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 5,668,767 A | 9/1997 | Barringer | |
| 7,533,237 B1 | 5/2009 | Nordquist | |
| 8,223,788 B1 | 7/2012 | Perelstain et al. | |
| 10,120,781 B2* | 11/2018 | Hu | G06F 11/3632 |
| 10,235,220 B2 | 3/2019 | Howes et al. | |
| 2004/0107240 A1* | 6/2004 | Zabarski | G06F 9/546 |
| | | | 709/201 |

(Continued)

OTHER PUBLICATIONS

"Notice of Allowance Issued in U.S. Appl. No. 16/001,608", dated Sep. 9, 2019, 9 Pages.

(Continued)

*Primary Examiner* — Ryan M Gray
(74) *Attorney, Agent, or Firm* — Arent Fox LLP

(57) ABSTRACT

Methods and devices for managing first-in first-out (FIFO) queues in graphics processing are described. A write operation can be executed by multiple write threads on a graphics processing unit (GPU) to write data to memory locations in the multiple pages of memory. Similarly, and/or simultaneously, a read operation can be executed by multiple read threads to read data from the memory locations. The write and read operations include updating a pointer or multiple pointers indicating the point at which all preceding data has been fully written, or fully read. The read and write operations can also include maintaining and advancing one or more allocation pointers, and performing comparisons with the read and write done pointers, and/or various methods of synchronization, to handle overflow and underflow scenarios, to ensure read operations only read valid data, and write operations do not attempt to write to locations which are already in use.

25 Claims, 19 Drawing Sheets

(56) References Cited

U.S. PATENT DOCUMENTS

| | | | |
|---|---|---|---|
| 2004/0160449 A1* | 8/2004 | Gossalia | G06F 3/14 345/543 |
| 2009/0091577 A1 | 4/2009 | Brothers | |
| 2010/0125685 A1 | 5/2010 | Ohta | |
| 2010/0318751 A1* | 12/2010 | Andreasen | G06F 11/0724 711/154 |
| 2012/0278811 A1 | 11/2012 | Baynast et al. | |
| 2013/0305009 A1 | 11/2013 | Durant et al. | |
| 2013/0305252 A1* | 11/2013 | Venkataraman | G06F 3/0653 718/103 |
| 2014/0283040 A1* | 9/2014 | Wilkerson | G06F 21/52 726/22 |
| 2014/0331023 A1* | 11/2014 | Sharp | G06F 12/1009 711/206 |
| 2014/0365734 A1* | 12/2014 | Bridge, Jr. | G06F 12/0891 711/144 |
| 2015/0123980 A1 | 5/2015 | Nalluri et al. | |
| 2015/0227414 A1* | 8/2015 | Varma | G06F 11/073 714/47.1 |
| 2015/0269065 A1* | 9/2015 | Bourd | G06F 9/54 711/155 |
| 2016/0062931 A1* | 3/2016 | Darbari | G06F 13/36 710/110 |
| 2016/0062941 A1* | 3/2016 | Darbari | G06F 5/00 714/5.1 |
| 2016/0139624 A1* | 5/2016 | Orr | G06F 9/46 713/400 |
| 2016/0267005 A1 | 9/2016 | Natarajan et al. | |
| 2017/0039087 A1* | 2/2017 | Darbari | G06F 5/00 |
| 2017/0126738 A1* | 5/2017 | Wilkerson | G06F 21/52 |
| 2017/0168755 A1 | 6/2017 | Lo | |
| 2017/0256016 A1 | 9/2017 | Lee et al. | |
| 2017/0344503 A1* | 11/2017 | Darbari | G06F 13/36 |
| 2019/0114172 A1* | 4/2019 | Eyole | G06F 9/30036 |
| 2019/0129633 A1 | 5/2019 | Wang et al. | |
| 2019/0196745 A1 | 6/2019 | Persson et al. | |
| 2019/0236749 A1 | 8/2019 | Gould et al. | |

OTHER PUBLICATIONS

Brenton, et al., "Data-Parallel Hashing Techniques for GPU Architectures", In Journal of IEEE Transactions on Parallel and Distributed Systems, Jul. 18, 2019, 14 Pages.

"International Search Report and Written Opinion Issued in PCT Application No. PCT/US2019/037411", dated Sep. 25, 2019, 13 Pages.

"Notice of Allowance Issued in U.S. Appl. No. 16/001,608", dated Jan. 9, 2020, 6 Pages.

* cited by examiner

TECHNIQUES FOR SAFELY AND EFFICIENTLY ENQUEUEING AND DEQUEUEING DATA ON A GRAPHICS PROCESSOR

BACKGROUND

The present examples relate to a computer device, and more particularly, to managing memory for graphics processing on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DirectX collection of application programming interfaces by MICROSOFT CORPORATION, including the DIRECT3D application programming interface (API), is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel. GPUs now also execute compute shaders that can perform highly-parallelized general-purpose computations that may or may not relate to graphics processing.

Memory resources can be allocated for GPUs (e.g., via driver or title executing on a central processing unit (CPU) that manages the memory resources) for performing various graphics processing operations, such as operating shaders or other stages in the graphics pipeline. The driver typically allocates a large amount of memory sufficient for performing the operations. In some cases, however, an amount of memory that is used by a shader or other resource may not be known at the outset of processing, and launching of multiple shaders using the large amount of memory may be prohibitive or wasteful of available system resources.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to managing first-in first-out (FIFO) queues in graphics processing. This can include allocating multiple pages of memory to a FIFO queue of multiple FIFO queues, and executing, via parallel execution of multiple read threads of a graphics processing unit (GPU), a read operation to read data from memory locations in multiple pages of memory corresponding to the FIFO queue, wherein, for a given read thread of the multiple read threads, the read operation can include obtaining and advancing one read allocation pointer of multiple read allocation pointers, wherein the multiple read allocation pointers are associated with the FIFO queue, and determining whether the one read allocation pointer of multiple read allocation pointers is greater than one write done pointer of multiple write allocation done maintained for the FIFO queue. Where the one read allocation pointer is not greater than the one write done pointer, the read operation can include reading data from one or more memory locations to which the one read allocation pointer points within the memory, and advancing the one read allocation pointer to a next memory location following the one or more memory locations, wherein the read allocation pointer is common to the FIFO queue.

Another example relates to managing FIFO queues in graphics processing including allocating multiple pages of memory to a FIFO queue of multiple FIFO queues, and executing, via parallel execution of multiple read threads of a GPU, a read operation to read data from memory locations in multiple pages of memory corresponding to the FIFO queue. In this example, for a given read thread of the multiple read threads, the read operation can include determining whether a read page pointer, which points to a page of memory being read, and a write page pointer, which points to a page of memory being written, point to a same page of the memory. Where the read page pointer and the write page pointer do not point to the same page of the memory, the read operation can include reading data from one or more memory locations to which a read allocation pointer points within the memory, and advancing a read done pointer to the one or more memory locations, wherein the read allocation pointer and the read done pointer are common to the FIFO queue. Where the read page pointer and the write page pointer point to the same page of the memory, the read operation can include indicating an error resulting from execution of the read operation.

Another example includes a method for managing FIFO queues in graphics processing. The method includes allocating multiple pages of memory to a FIFO queue of multiple FIFO queues, and executing, via parallel execution of multiple write threads of a GPU, a write operation to write data to memory locations in multiple pages of memory corresponding to the FIFO queue. For a given write thread of the multiple write threads, the write operation includes obtaining and advancing one write allocation pointer of multiple write allocation pointers, wherein the multiple write allocation pointers are associated with the FIFO queue, and determining whether the one write allocation pointer of the multiple write allocation pointers is greater than one read done pointer of multiple read done pointers maintained for the FIFO queue, where the one write allocation pointer is not greater than the one read done pointer, writing data to one or more memory locations to which the one write allocation pointer points within the memory.

In another example, a method for managing FIFO queues in graphics processing is provided. The method includes allocating multiple pages of memory to a FIFO queue of multiple FIFO queues, and executing, via parallel execution of multiple write threads of a GPU, a write operation to write data to memory locations in multiple pages of memory corresponding to the FIFO queue. For a given write thread of the multiple write threads, the write operation includes determining whether a write page pointer, which points to a page of memory being written to, and a read page pointer, which points to a page of memory being read, point to a same page of the memory, where the write page pointer and the read page pointer do not point to the same page of the memory, writing data to one or more memory locations to which a write allocation pointer points within the memory, and advancing a write done pointer to the one or more memory locations, wherein the write allocation pointer and the write done pointer are common to the FIFO queue, and where the write page pointer and the read page pointer point to the same page of the memory, indicating an error resulting from execution of the write operation.

Additional advantages and novel features relating to examples of the present invention will be set forth in part in the description that follows, and in part will become more apparent to those skilled in the art upon examination of the following or upon learning by practice thereof.

DETAILED DESCRIPTION

Figure 1:
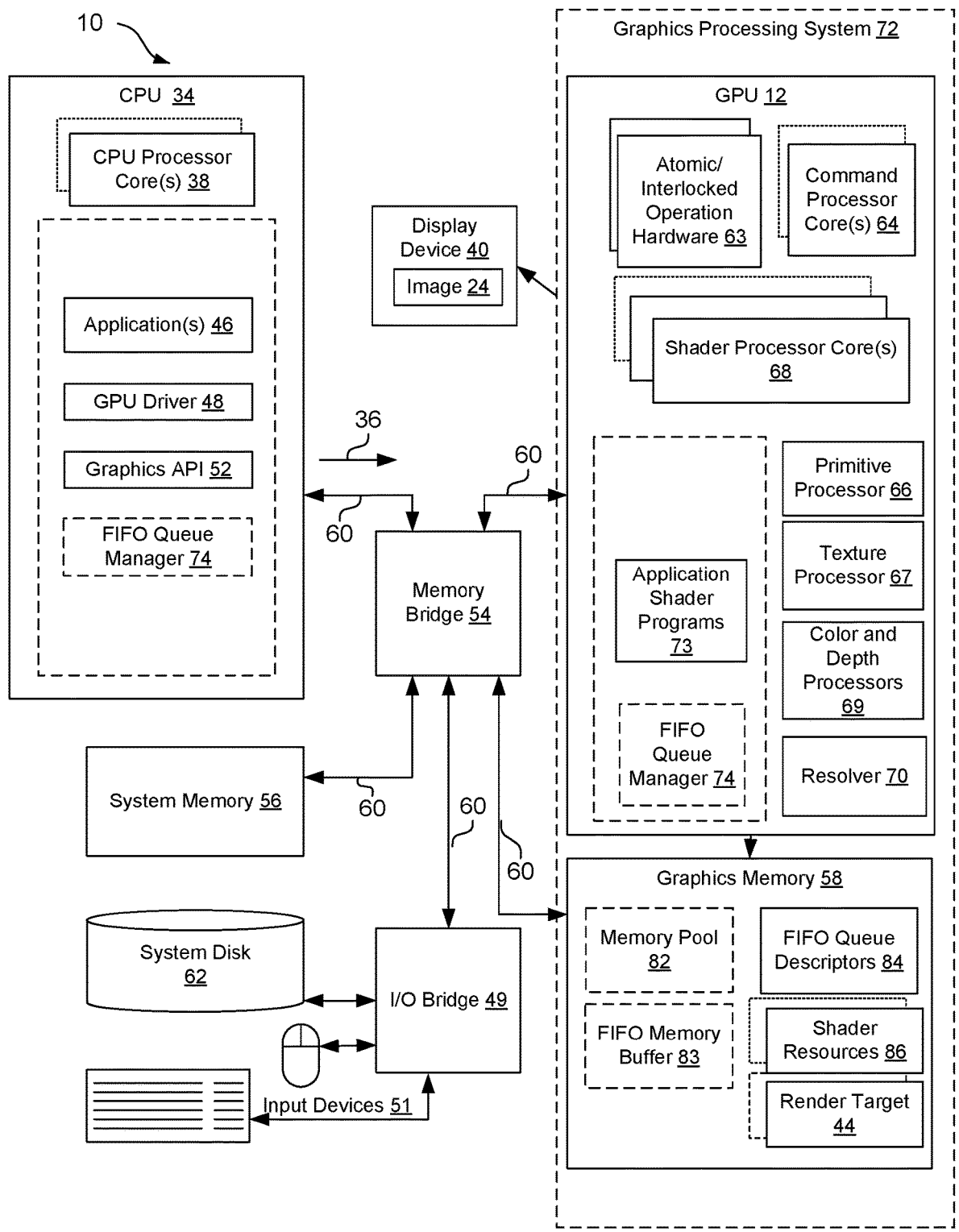
FIG. 1 is a schematic block diagram of an example architecture of a computer device including a graphics processing unit configured according to the described examples.

The described solutions provide a graphical processing unit (GPU) with a flexible, dynamic mechanism that provides managing memory resources, such as first-in first-out (FIFO) queues, for use in graphics processing operations. In one example, the GPU can execute one or more compute shaders to manage the memory resources. For instance, a pool of memory resources can be initialized for use with multiple FIFO queues. An amount of the pool of memory resources, such as one or more pages of memory, can be initially allocated to a given FIFO queue. Multiple threads (e.g., executing in parallel on the GPU) can write data to the FIFO queue. For example, the FIFO queues can be growable or non-growable. For growable FIFO queues, one or more of the threads can allocate additional memory resources (e.g. additional pages of memory) from the pool to the FIFO queue at some point to ensure the FIFO queue has sufficient memory resources for writing. For example, the FIFO queue can include a variety of pointers to assist in writing data to, and reading data from, memory locations within the memory resources while preventing reading data from memory locations that have not yet been written.

For example, the multiple pointers may include at least one write allocation pointer that can be advanced by a given thread beyond the memory location to which the thread is to write the data, so the next write thread can use the write allocation pointer to determine the next memory location at which to write data (and can advance the write allocation pointer for the next write thread, and so on). The multiple pointers may also include one or more write done pointers that can point to a last written memory location to prevent reading beyond memory that has been written. In addition, the multiple pointers may include at least one read allocation pointer that can be advanced by a given thread beyond a memory location from which the data is read, so the next read thread can begin reading at the read allocation pointer (and can advance the read allocation pointer for the next read thread, and so on). The multiple pointers may also include one or more read done pointers that are advanced once the memory is actually read, which may allow for freeing memory resources.

In various examples described herein, multiple read allocation pointers and/or write done pointers can be maintained for each FIFO queue to facilitate handling error and/or race conditions to prevent reading data from locations that have not yet been written. For example, a snapshot pointer can be used as an index into an array of read allocation pointers and/or write done pointers to facilitate storing and using previous values of the pointers. For example, where a latest read allocation pointer or write done pointer results in reading data that has not yet been written, a previous value for the pointer, stored in the array, can be used, or attempted to be used, to read data from the FIFO queue. In other examples, a read page pointer and write page pointer can be maintained per FIFO queue to indicate on which memory page the read allocation pointer and write done pointer are respectively positioned. In this example, reading can be avoided where the read page pointer and write page pointer point to the same memory page, which can prevent reading data from memory locations that have not yet been written as well.

Referring to FIG. 1, in one example, a computer device 10 includes a graphics processing unit (GPU) 12 configured to implement the described features of managing memory resources for performing graphics operations. For example, GPU 12 is configured to allocate memory from a pool to multiple FIFO queues, write data, in parallel, to the FIFO queues, allocate additional memory from the pool during the write operation, read data, in parallel, from the FIFO queues, deallocate memory back to the pool once read, etc., as described further herein. In addition, the CPU 34 and/or GPU 12 can execute one or more compute shaders to provide managing of the growable or non-growable (e.g., ring buffer) memory resources. The GPU 12 can also be configured to provide one or multiple pointers per FIFO queue to facilitate reading data once it is determined that data has been written to a corresponding memory location. As described herein, this may also be coupled driver and/or other software functionality at the CPU 34 (e.g., a dispatcher thread) that can work in conjunction with the one or more compute shaders, as described herein. In this regard, GPU 12 and/or CPU 34 can include a FIFO queue manager 74 to facilitate initializing and managing FIFO queues, as described herein, etc. Moreover, an interface may be exposed, via software executing on the CPU 34 or GPU 12, to allow for leveraging the functions for using and managing memory resources.

For example, in one implementation, computer device 10 includes a CPU 34, which may be one or more processors, or CPU processor core(s) 38, that are specially-configured or programmed to control operation of computer device 10 according to the described examples. For instance, a user may provide an input to computer device 10 to cause CPU 34 to execute one or more of software application(s) 46, GPU driver 48, graphics application programming interface (API) 52, an optional CPU-side FIFO queue manager 74, as described in further detail herein, etc. Software application(s) 46 that execute on CPU 34 may include, for example, but are not limited to one or more of an operating system, a word processor application, an email application, a spread sheet application, a media player application, a video game application, a graphical user interface application or another program. Additionally, the GPU driver 48 can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics API 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, a Vulkan API, a Metal API, a CUDA API or any other public or proprietary standard graphics API that may provide functionality to implement certain shaders, such as compute shaders, which allow for performing highly-parallelized general-purpose computations that may or may not relate to graphics processing. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

In another example, the software applications 46 that execute on CPU 34 may include one or more ray tracing applications that can generate an image 24 from the perspective of a virtual camera shooting rays from a viewing points. For a given pixel in the image 24, for example, the path of a ray that passes through the pixel from the viewing point can be traced until it intersects with an object in the environment. The surface of the object can have a color associated with it at the intersection point, as well as values that indicate albedo (reflectivity), scattering, refraction, diffusion or another material property. Such values can be interpolated in ray tracing, for example, between values of properties of vertices of the object. At the intersection point, depending on the surface of the object, the ray can be reflected or refracted within the environment, or it can generate diffuse rays, to simulate optical effects such as reflection, refraction/translucence, scattering, and dispersion. The angle of the surface at the intersection point can be determined by interpolating between norms of vertices of the object, or the angle of the surface at the intersection point can be estimated as the angle of a face plane of the object. A shadow ray can be generated, in the direction of a light source, to simulate optical effects such as shading from the light source (blocking of light from the light source). Such newly generated rays (secondary rays) can be similarly traced in the environment, and can generate other rays (tertiary rays), and so on. Successive rays can be generated, for example, until a threshold number of stages is reached or threshold distance is traveled. Ultimately, the value of the given pixel in ray tracing can depend on the color of the surface of the object at the intersection point and results reported back from secondary rays, which may in turn depend on results reported back from tertiary rays, and so on, so as to simulate shadows, reflected light, refracted light, and other effects at the intersection point. Thus, in addition to the color of the surface at the intersected point, the value of the given pixel can depend on the incoming light and material properties of the object at the intersection point.

Ray tracing, in this regard, can produce ray or pixel information, and can group the information by one or more detected properties, such as a determined texture or surface of the ray/pixel for processing. In this example, a size of memory to hold the information for each texture or surface is not known prior to the ray tracing. Thus, ray tracing can benefit by using the growable or non-growable rung-buffer style memory resources, as described herein, and/or a ring buffer, to store, read, and/or otherwise process the information.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store software applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives, ray tracing, etc.) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, ray tracing information, etc. GPU 12 may include atomic/interlocked operation hardware 63 for providing atomic/interlocked operations, such as for incrementing or otherwise modifying one or more values stored in Graphics Memory 58, System Memory 56, and/or other locations. In one example, GPU 12 can include mechanisms for operating with large integer values (e.g., values beyond the bounds of a single integer), such as incrementing and decrementing (e.g., using interlocked operations via atomic/interlocked operation hardware 63) and/or reading such values, as described in FIG. 14. GPU 12 may also include one or more processors, including a command processor 64 for receiving graphics command 36 and initiating or controlling the subsequent graphics processing by at least one primitive processor 66 for assembling primitives, a plurality of graphics shader processor cores 68 for processing vertex, surface, pixel, and other data for GPU 12, one or more texture processors 67 for generating texture data for fragments or pixels, and one or more color and depth processors 69 for generating color data and depth data and merging the shading output.

The shader processor core(s) 68 can execute one or more application shader program(s) 73 to process the vertex, surface, pixel, and/or other data for the GPU 12 or to perform other graphics-related (or non-graphics-related) processes. In an example, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34. Additionally, GPU 12 may be configured to perform highly-parallelized general-purpose operations for graphics or non-graphics purposes, such as executing a compute shader, as described.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

Moreover, in an example, one or more compute shaders can be launched to manage growable memory resources in graphics memory 58, as described herein. Graphics memory 58 may optionally include a memory pool 82 allocated by the FIFO queue manager 74 to provide memory to growable FIFO queues for application shader program(s) 73 and/or shader processor core(s) 68. In another example, e.g., instead of or in addition to memory pool 82, graphics memory 58 may optionally include a FIFO memory buffer 83 to provide memory to non-growable FIFO queues for application shader program(s) 73 and/or shader processor core(s) 68. Graphics memory 58 may also include FIFO queue descriptors 84 defining one or more FIFO queues in the memory pool 82 or other locations in graphics memory 58. These descriptors 84 may include page addresses 212 from the memory pool 82, per-page write done counters 224, per-page read done counters 226, various pointers 214 and/or arrays of pointers 214, etc., as described further herein. Graphics memory 58 may also include shader resources 86 to otherwise facilitate operation of the various application shader programs 73 and/or shader processor cores 68.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link. Additionally, in some configurations such as in a datacenter environment, Display device 40 may not be present at all, or may be connected remotely via a network connection and possibly another computer device.

According to one example of the described features, graphics API 52 and GPU driver 48 may configure GPU 12 to execute a logical graphics pipeline to perform various operations described herein.

Figure 2:
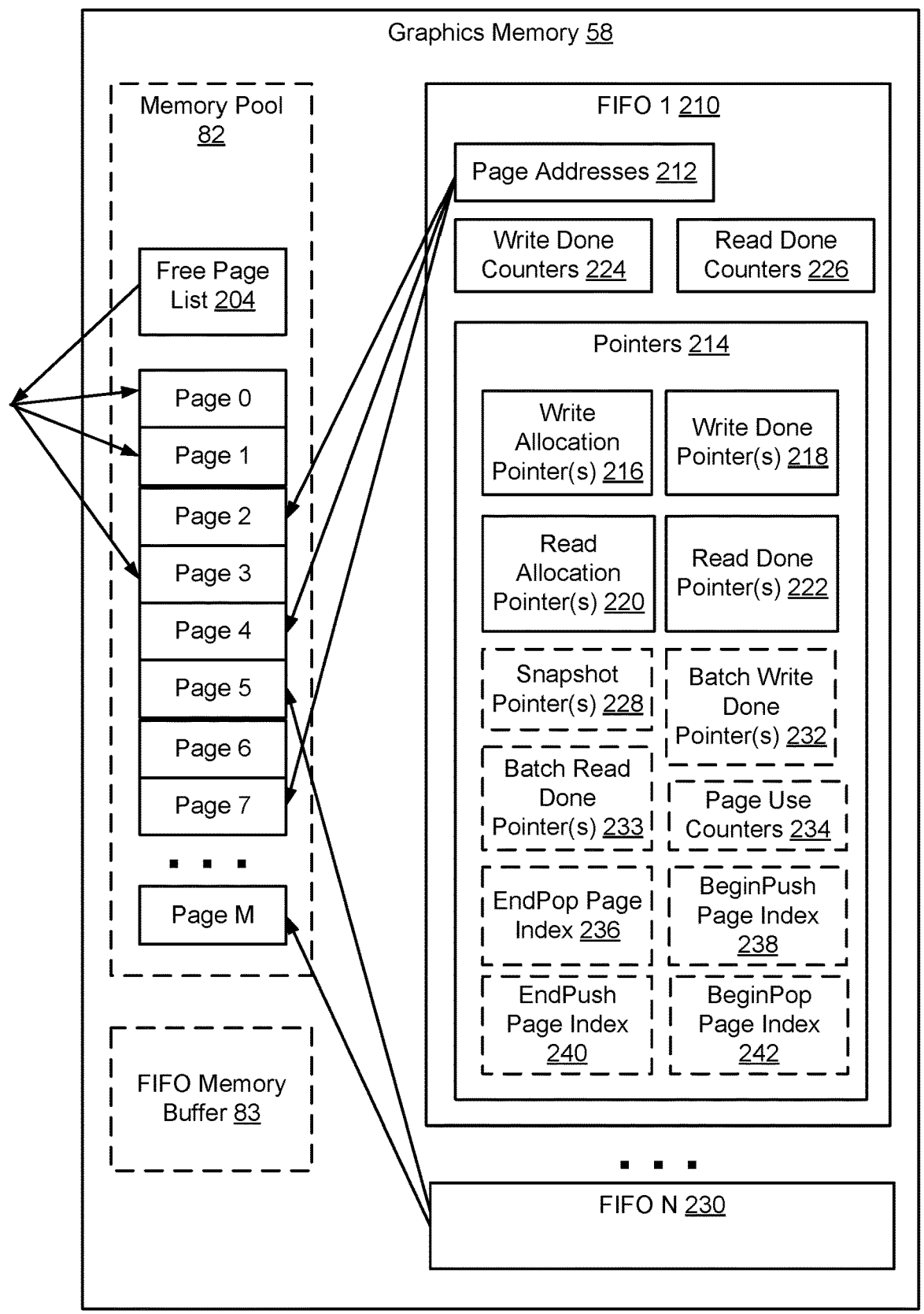
FIG. 2 is a schematic diagram of an example of a state of graphics memory of the computer device of FIG. 1.

FIG. 2 illustrates an example of a state of graphics memory 58, which can be initialized and/or managed by a FIFO queue manager 74 within the GPU 12 and/or CPU 34, in accordance with aspects described herein. Graphics memory 58, as initialized for the GPU 12 by CPU 34 and/or one or more applications, drivers, etc. executing thereon, may include a memory pool 82 of virtual memory addresses initialized for managing multiple FIFO queues, where the memory pool 82 may include virtual memory addresses that are at least partially allocated to physical memory in the graphics memory 58. For example, the memory pool 82 may include a list of memory pages, or pointers to the memory pages—e.g., page 0, page 1, page 2, page 3, page 4, page 5, page 6, page 7, . . . , page M, that may be allocated in the memory pool 82. The memory pool 82 may include a free page list 204 of pages that can be allocated out of the memory pool 82, which in the depicted example include page 0, page 1, and page 3.

Graphics memory 58 can also include multiple FIFO queues, including FIFO 1 210, . . . , FIFO N 230. Each FIFO queue can have an associated list of page addresses 212, which can correspond to pages from the memory pool that are allocated to the FIFO queue (and thus removed from the free page list 204). For example, for FIFO 1 210, the list of page addresses can include page 2, page 4, and page 7, to which data can be written and/or read, as described herein. In addition, each FIFO queue may include multiple pointers 214, such as one or more write allocation pointer(s) 216 to indicate a memory location for a next write operation (or an array of previous pointers to allow for selecting a previous pointer instead), one or more write done pointer(s) 218 to indicate a memory location where all writes preceding the write done pointer 218 have been completed (or an array of previous pointers to allow for selecting a previous pointer instead), one or more read allocation pointers 220 to indicate a memory location for a next read operation (or an array of previous pointers to allow for selecting a previous pointer instead), and/or one or more read done pointers 222 to indicate a memory location where all reads preceding the read done pointer 222 have been completed (or an array of previous pointers to allow for selecting a previous pointer instead).

The pointers 214 may also include a snapshot pointer 228 that can store one or more indices to reflect a current pointer of one or more arrays of the other pointers (e.g., an array of read allocation pointers 220, an array of write done pointers 218, etc., as described further herein). The pointers 214 can be used for various purposes, such as to determine when to allocate and/or deallocate memory to/from a given FIFO queue, when to perform a read operations of data written by write operations that have occurred, and/or the like, as described further herein. Moreover, in an example, the pointers 214 may include an array of one or more batch write done pointers 232 associated with the one or more read allocation pointers 220, indicating the end of a batch of work after which the associated read allocation pointer was abandoned in favor of a new read allocation pointer in the read allocation pointer array 220. In an example, the pointers 214 may include an array of one or more batch read done pointers 233 associated with the one or more write allocation pointers 216, indicating the end of a batch of work after which the associated write allocation pointer was abandoned in favor of a new write allocation pointer in the write allocation pointer array 216. In another example, pointers 214 can include one or more page use pointers 234 for tracking how much data has been read or written to the current page, as descried further herein. Pointers 214 may also optionally include an EndPop page index 236 to indicate the oldest page associated with the FIFO queue which has not yet been fully consumed, a BeginPush page index 238 to indicate a page of memory on which to begin pushing data or otherwise performing a data production operation, an EndPush page index 240 to indicate the oldest page associated with the FIFO queue which has not been fully filled with data, and/or a BeginPop page index 242 to indicate a page of memory on which to begin popping data or otherwise performing a data consumption operation.

In an example, the pointers 216, 218, 220, 222, 228, 232, 233, 234 may be or may include 32-bit integers or other values, and may be constructed to indicate multiple identifiers. For example, the pointers 216, 218, 220, 222, 228, 232, 233, 234 may be constructed to have a number of low order bits to indicate a memory location within a page (e.g., a number of bits equal to a page size divided by a memory unit size for the FIFO). For example, for pages that are 64 kB and where the FIFO uses a 16-byte memory unit size, the low order bits can include enough bits to indicate 4096 ($2^{12}$) memory locations (e.g., 12 bits). In addition, the pointers 216, 218, 220, 222, 228, 232, 233, 234 may be constructed to have a number of high order bits that can indicate an identifier of the memory page, which may be an index into an array of memory page addresses 212 allocated for the FIFO queue. In an example, the pointers 216, 218, 220, 222, 228, 232, 233, 234 may also have one or more wrapping bits to indicate when the low order bits have exceeded capacity. This may be useful, for example, where the memory size unit used by the FIFO is not a power of 2 because the number of data items that fit into a memory page also is not a power of 2. Thus, the number of data items in a page multiplied by the number of pages is also likely not a power of 2. In addition, in one example, the done pointers 218, 222 may be per FIFO per page. Moreover, one or more of the pointers 216, 218, 220, 222, 228, 232, 233, 234 may use a large integer format, as described with reference to FIG. 14 below.

In addition, for example, each FIFO may include a per-page write done counter 224 that can track (e.g., be incremented) when a write operation is performed to track a number of data items written to the memory page. In one example, there may be a write done counter 224 per page (e.g., or one for the current pages being written). In another example, as in non-growable FIFOs which may not use pages, the FIFO's data may be subdivided into segments, with one write done counter 224 per segment. In another example, a growable FIFO may be subdivided into segments which are smaller than, equal to, or larger than a page size, with one write done counter 224 per segment. In addition, for example, each FIFO may include a list of read done counters 226 that can track (e.g., be incremented) when a read operation is performed, to track a number of data items read from a corresponding portion of the FIFO. In one example, there may be a read done counter 226 per page (e.g., or one for the current pages being read), or for a segment of the FIFO that is smaller or larger than a page. The write done counters 224 and read done counters 226 can be initialized with their respective FIFOs and can track writes/reads for a given page (and/or multiple counters can be provided for multiple pages, in one example). When all data is written to, or read from a page or segment of a FIFO (as can be determined by Write Done Pointer 218 or Read Done Pointer 222), the associated counters 224 or 226 can be reset to 0.

Additionally, in addition or alternatively to memory pool 82, graphics memory 58 may optionally include a FIFO memory buffer 83, which may include a ring buffer, or a non-wrapping list of memory pages, etc. In this example, the FIFO queues (e.g., FIFO 1 210 . . . FIFO N 230) may each include a pointer to one or more pages of memory within the FIFO memory buffer 83 (e.g., page addresses 212), and the various pointers 214, counters 224, 226, etc., can be used, as described above and further herein, with the non-growable FIFO memory buffer 83.

Figure 3:
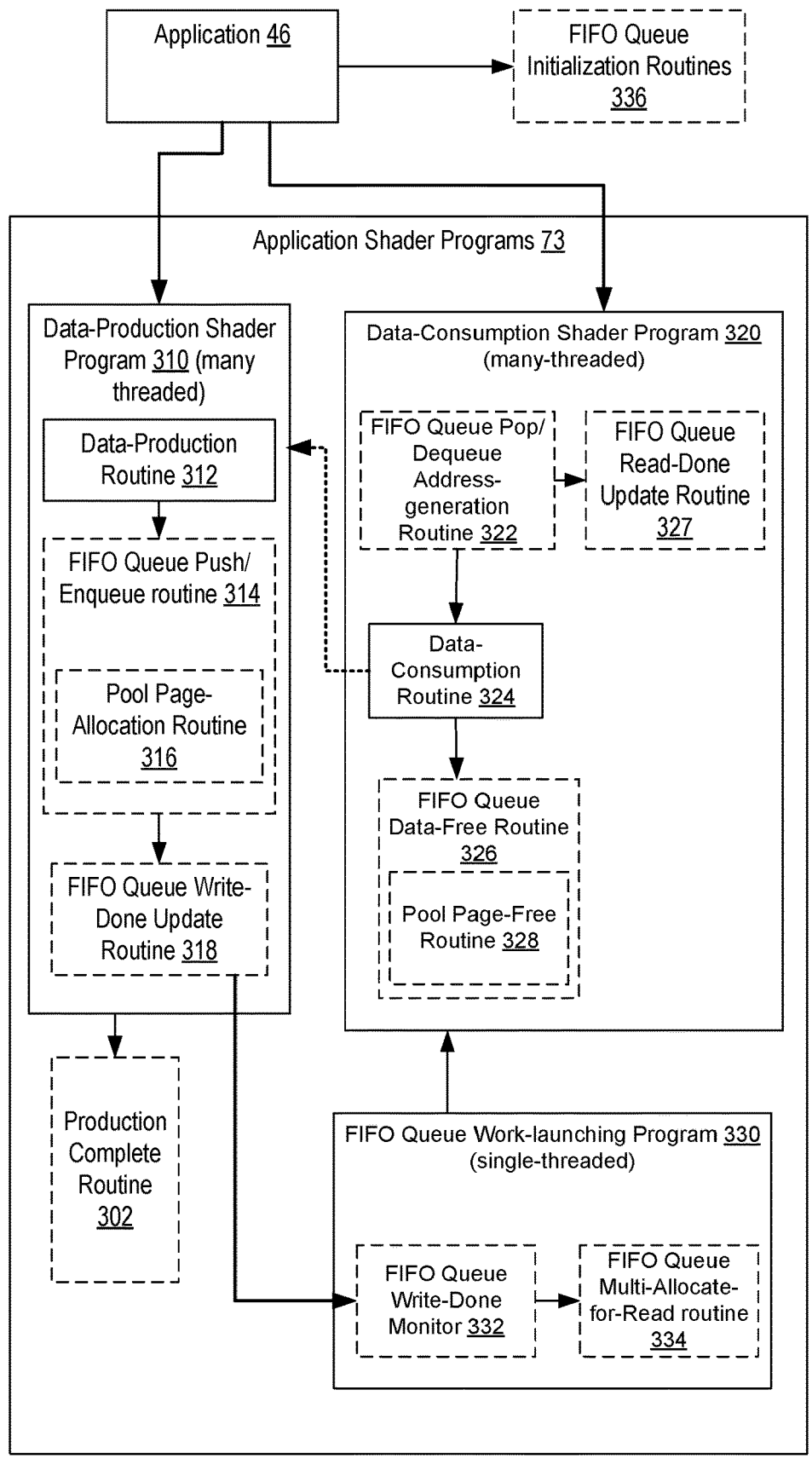
FIG. 3 is a schematic diagram of an example of applications executing on the computer device or one or more processors of FIG. 1.

FIG. 3 illustrates an example of application routines that can be executed by CPU 34, and shader programs 73 that can be implemented and/or executed by shader processor core(s) 68, Command Processor 64 and/or CPU 34 for writing and reading data to/from one or more FIFO queues (e.g., FIFO 1 210 . . . FIFO N 230). For example, application shader programs 73 may include a data-production shader program 310 for writing data to the FIFO queues. For example, data-production shader program 310 can be concurrently executed by multiple threads to write data to one or more given FIFO queues. In an example, data-production shader program 310 may receive data for writing to the FIFO queue based on data received from an application 46 (e.g., as rendering instructions, ray-tracing commands, related parameters, etc.). Data-production shader program 310 can include one or more data-production routine 312 for producing data to be written to the FIFO queue (e.g., data related to performing one or more graphics-related tasks, such as rendering instructions, instructions for defining corresponding primitives, vectors, shading rates, etc., ray-tracing instructions, or non-graphics-related processes), as received from the application 46 or otherwise interpreted from instructions received from the application 46, and a FIFO queue push/enqueue routine 314 for writing data to the FIFO queue. For example, FIFO queue push/enqueue routine 314 can write data to the FIFO queue 210 and update a write allocation pointer 216, as described further herein (e.g., in action 406 of method 400 of FIG. 4, method 500 of FIG. 5, etc.). FIFO queue push/enqueue routine 314 may also include a pool page-allocation routine 316 for allocating one or more additional pages of memory to the FIFO queue if needed (e.g., as described in action 408 of method 400, and action 504 of method 500), and/or a FIFO queue write-done update routine 318 to update a write done pointer 218 of the FIFO queue (e.g., as described in action 508 of method 500). For example, pool page-allocation routine 316 may be used in managing memory pages in a memory pool 82, as described, but may not be needed to manage a FIFO memory buffer 83.

Application shader programs 73 may also include a data-consumption shader program 320 for reading data from the FIFO queues. For example, data-consumption shader program 320 can be concurrently executed by multiple threads to read data from one or more given FIFO queues. Data-consumption shader program 320 can include a FIFO queue pop/dequeue address-generation routine 322 for determining a memory location at which to read data from the FIFO queue. For example, FIFO queue pop/dequeue address-generation routine 322 can determine the address/memory location based on a value of the read allocation pointer 220 as read and incremented by FIFO Queue Work-launching Program 330, or as read and incremented by data-consumption shader program 320, as described further herein (e.g., in action 412 of method 400 in FIG. 4, action 602 of method 600 in FIG. 6, etc.). Data-consumption shader program 320 may also include a data-consumption routine 324 for reading the data at the memory location, a FIFO queue data-free routine 326 for freeing the memory location, and/or a FIFO queue read-done update routine 327 to update a read done pointer 222 of the FIFO queue (e.g., as described in action 606 of method 600). For example, FIFO queue data-free routine 326 can free the memory location at least in part by moving a read done pointer 222 to or beyond the memory location, as described further herein (e.g., in action 606 of method 600). FIFO queue data-free routine 326 may include a pool page-free routine 328 for freeing one or more pages of memory back to the memory pool 82, as described further herein (e.g., in action 414 of method 400, action 608 of method 600, etc.). For example, pool page-free routine 328 may be used in managing memory pages in a memory pool 82, as described, but may not be needed to manage a FIFO memory buffer 83.

In addition, application shader programs 73 can include a FIFO queue work-launching program 330 for launching sets of multiple threads to execute the data-consumption shader program 320 and/or the data-production shader program 310. In an example, FIFO queue work-launching program 330 can operate using a single thread, or a single thread per FIFO, to dispatch the multiple threads of the data-consumption shader program 320 and/or data-production shader program 310. In this regard, in one example, FIFO queue work-launching program 330 may be executed on the CPU 34 or on a shader processor core 68, or in command processor 64. In addition, for example, the FIFO queue work-launching program 330 may include, or may be similar to, the dispatcher thread described herein. FIFO queue work-launching program 330 can include a FIFO queue write-done monitor 332 for monitoring the write done pointer 218 of one or more FIFO queues to determine when to launch a set of threads to consume the data written to the FIFO(s). For example, FIFO queue write-done monitor 332 can determine to start threads to read the data when the write done pointer 218 is detected to advance to a certain value (e.g., a value equal to or within a threshold of the number of threads in a set, a value equal to a number of items on a page of memory, etc.). FIFO queue work-launching program 330 can also include a FIFO queue multi-allocate-for-read routine 334 for determining/allocating the number of threads to launch to read data written to the FIFO queue (e.g., based on the write done pointer 218 value), executing the set of threads to read the data, etc., as described further herein. In an example, the FIFO queue multi-allocate-for-read routine 334 may update the Read Allocation Pointer 220 to indicate the number of items that may be consumed, and can pass a copy of the Read Allocation Pointer (or a value derived from it) to each instance of the data consumption shader program, to be used in the address generation routine 322, to determine which data to consume. In an example, the work launching program 330 can launch more than one consumer thread per data element or group of data elements to consume, or it can launch a group of threads per data element or group of data elements to consume, where the number of data elements may include a group, and the number of shader threads to launch, can be provided by application 46, or calculated by some other mechanism.

Prior to executing threads to perform the data-production shader program 310 and/or data-consumption shader program 320, application 46 can initiate, or cause initiation of, one or more FIFO queue initialization routine(s) 302 for establishing the one or more FIFO queues, allocating corresponding memory from memory pool 82, setting/initializing per-page counters, etc., as described above and further herein. In addition, application shader programs 73 can include a production complete routine 302 for updating one or more pointer values when the data production has completed (e.g., by a set of threads). For example, production complete routine 302 can set a page usage counter to a number of items on a page and/or a number of items that were written to the page by data-production shader program 310 executing by a set of write threads.

Figure 4:
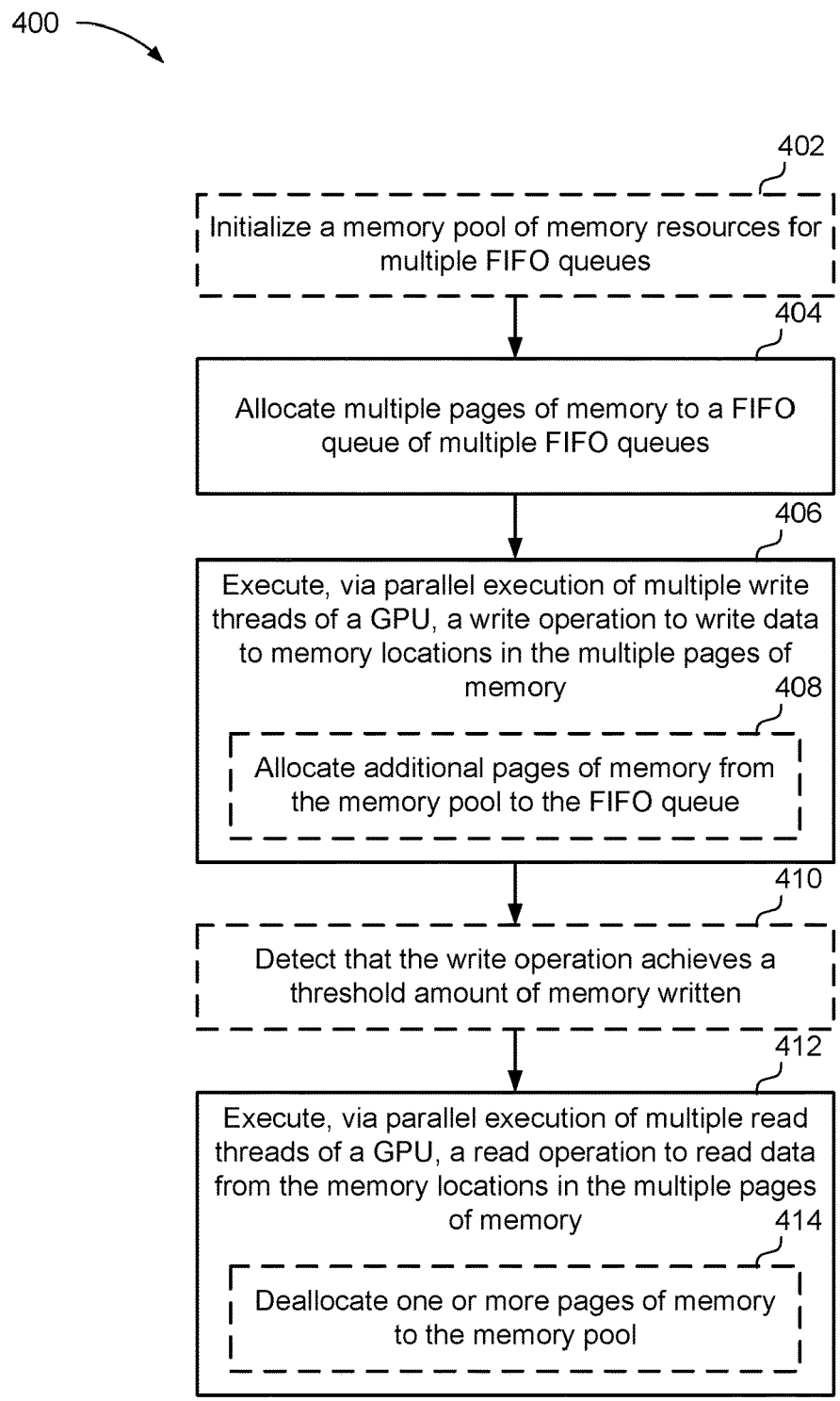
FIG. 4 is a flowchart of an example of a method of managing, writing, and reading memory resources according to the described examples.

Referring to FIG. 4, one example of a method 400 for operating a GPU 12 to manage and utilize memory resources is illustrated.

At 402, method 400 optionally includes initializing a memory pool of memory resources for multiple FIFO queues. In an example, GPU 12 or CPU 34, via FIFO queue manager 74, can be configured to initialize the memory pool of memory resources (e.g., in graphics memory 58) for multiple FIFO queues. For example, the GPU 12 can initialize the memory pool as a collection of virtual memory addresses, where the addresses can each relate to a unit of memory, such as a page. For example, a page can be 64 kilobytes (kB) or substantially any span of memory addresses. In addition, in this example, the GPU 12 can manage initialization or allocation/deallocation the collection of memory addresses, though a portion of the addresses may correspond to physical memory that is actually allocated in the graphics memory 58, while another portion of the addresses may not correspond to allocated physical memory. In this example, the GPU 12 or CPU 34, via a thread managing the memory space, can automatically allocate the non-allocated virtual addresses to physical memory when a threshold is achieved. For example, the threshold can correspond to a threshold number of unused-but-physically-allocated pages (e.g., a number that is less than a threshold), where an unused-but-physically-allocated page can correspond to a page of memory that is allocated to the GPU 12 but does not have data (or has only stale or otherwise expired data) written to it. In an additional example, GPU 12, via a thread managing the memory space, can automatically free unused pool pages from the memory pool 82, if the list of unused-but-physically-allocated pages achieves a threshold indicating that the number of unused-but-physically-allocated pages has become too large (e.g., more than a different or the same threshold).

In any case, GPU 12 can have a memory pool with at least some memory resources for allocation to a FIFO queue, as described herein, and GPU 12 or CPU 34 can manage the pool to allocate/deallocate physical resources when the respective thresholds are achieved. This can be used for a growable-FIFO implementation, as described further herein. In other examples, the memory may include a non-growable FIFO memory buffer 83.

At 404, method 400 includes allocating multiple pages of memory to a FIFO queue of multiple FIFO queues. In an example, GPU 12, via FIFO queue manager 74, FIFO queue initialization routine 336, etc., can be configured to allocate the multiple pages of memory to a FIFO queue of multiple FIFO queues (e.g., FIFO 1 210, . . . , FIFO N 230). In one example, GPU 12 can perform the allocation based on initializing the FIFO queues before rendering an image. In addition, for example, GPU 12 can determine an initial allocation size based on one or more parameters configured for and/or provided to the GPU 12 (e.g., by CPU 34) or otherwise known to the GPU 12. For example, GPU 12, in ray tracing, may initialize FIFO queues for each texture or surface, and may allocate multiple pages (e.g., one or two pages to start) to each of the FIFO queues. This can help to avoid delay in allocating memory to the FIFO queue on a first instance of a write operation to the FIFO queue. In an example, the memory can be allocated as pages from the memory pool 82 (e.g., for growable FIFO queues) or from the FIFO memory buffer 83 (e.g., for non-growable FIFO queues), as described further herein.

In addition to allocating memory to the FIFO queue(s), FIFO queue initialization routine 336 can perform additional initialization procedures, such as associating a function, program, shader object, pipeline state object, etc. with each FIFO queue, which can be invoked to consume data that has been added to the FIFO queue. For example, these can include data-production shader program 310, data-consumption shader program 320, etc. In addition, FIFO queue initialization routine 336 can associate a minimum batch size, maximum batch size, batch size granularity, preferred batch size, etc. of data to be consumed, to each FIFO queue. Each thread reading the data (e.g., via data-consumption shader program 320) can utilize the batch sizes when reading data from the FIFO queues. In another example, FIFO queue initialization routine 336 can associate a count of threads to be invoked to consume each batch of data acquired from the FIFO queue. In addition, in an example, FIFO queue initialization routine 336 can set one or more parameters for each FIFO queue, such as an associated priority for reading data from (and/or writing data to) the FIFO queue, whether the FIFO queue is growable or not, whether the FIFO queue can be automatically validated or not, etc. In addition, in one example, FIFO queue initialization routine 336 can add an initial amount of data to one or more FIFO queues to indicate that the FIFO queue is in use and avoid deallocation of the FIFO queue or associated memory.

At 406, method 400 includes executing, via parallel execution of multiple write threads of a GPU, a write operation to write data to memory locations in the multiple pages of memory. In an example, GPU 12 can be configured to execute, via parallel execution of multiple write threads of the GPU 12, the write operation to write data to memory locations in the multiple pages of memory. For example, GPU 12 can execute (e.g., via commands 36 sent by CPU 34, or via FIFO queue work-launching program 330) one or more compute shaders to perform the write operation to write data to the FIFO queue, as described herein. For example, the one or more compute shaders can execute a fixed set of threads, such as 64 threads executing in parallel, to perform one or more write operations. Each of the multiple threads can write some data into the FIFO queue, which may include each write thread performing a data-production shader program (e.g., data-production shader program 310 defined above) to produce data (e.g., via data-production routine 312), push the data to the FIFO queue (e.g., via FIFO queue push/enqueue routine 314), possibly allocate one or more additional memory pages to the FIFO queue (e.g., via pool page-allocation routine 316), and/or update a write done pointer (e.g., via FIFO queue write-done update routine 318), as described above.

For example, to facilitate the write operation, each FIFO queue may include pointers to its corresponding pages in the memory pool (e.g., page addresses 212), as well as a write allocation pointer (e.g., write allocation pointer 216) to track both which page in memory to write to, and the location within that page to write, and/or a write done pointer (e.g., write done pointer 218) to indicate a location where all previous data has been written in memory. As described further herein, the GPU 12 can accordingly determine a page to which to perform a write operation based on the pointer corresponding to the FIFO queue and/or the write allocation pointer 216. Thus, for example, the write allocation pointer can allow each thread to determine where to write its data, and each thread, upon determining the write allocation pointer, can advance the write allocation pointer to a next memory location for writing data. The acts of reading and advancing the write allocation pointer can be performed together atomically, e.g., by Atomic/Interlocked Operation Hardware 63, in order to avoid race conditions that would otherwise occur with multi-threaded programming.

In addition, once the data is written, the thread can advance the write done pointer. In one example, this can be performed based on an array of write done counters, based at least in part on determining that all write operations of the write threads have completed. For example, the array of write done counters can include one page write done counter per page or segment of the FIFO queue. The counters can be zero-initialized with the FIFO at the time of initialization, and can be incremented after writes are performed to a page or segment, and then initialized back to zero when the write done pointer advances beyond the page or segment. In an example, the write done pointer can be advanced using the conditions and calculations shown in 508, as explained in detail below.

Executing the write operation can also optionally include, at 408, allocating additional pages of memory from the memory pool to the FIFO queue. In an example, GPU 12, e.g., via a compute shader or other thread performing FIFO queue write operations, can be configured to allocate the additional pages of memory from the memory pool to the growable FIFO queue (e.g., by using functionality provided by the FIFO queue manager 74). In one example, the GPU 12 can allocate the additional pages of memory based on a location of the write allocation pointer. For example, where the write allocation pointer achieves a threshold, the GPU 12 can allocate an additional page (or pages) of memory out of the memory pool (e.g., memory pool 82), which can occur via the write thread that detects the write allocation pointer achieving the threshold. For example, this threshold for the write allocation pointer may correspond to a memory location located in a page in or before a last memory page in the list of page addresses 212. For example, the threshold may be a last memory position in the second to last memory page in the list of page addresses 212, a memory location at another position in the second to last page (or last page), etc., such that the memory can be allocated and assigned to the FIFO queue before other write threads attempt to allocate a memory position beyond the last page currently assigned to the FIFO, without those other threads having to wait for the allocation before writing to the additional memory resources.

At 410, method 400 can optionally include detecting that the write operation achieves a threshold amount of memory. For example, the GPU 12 can be configured to detect that the write operation achieves the threshold amount of memory. In one example, this can include GPU 12, or a write thread which is updating the write done pointer, or a dispatcher thread (e.g., a FIFO queue work-launching program 330) that manages the writing and/or reading operations, detecting that the write operation achieves the threshold amount of memory. This can be based on, for example, determining that the write done pointer for the FIFO achieves a threshold (e.g., as compared to the read allocation pointer or otherwise). In one example, threshold can be based on a priority indicated for the FIFO, such that higher priority FIFOs can have the threshold detected before lower priority FIFOs. For example, this threshold amount of memory can be set to ensure enough data is written to the FIFO to justify executing a read operation using multiple read threads of the GPU 12, as described in further detail below (e.g., such that no threads, or only a maximum portion of threads, are not used during the read operation).

In one example, the dispatcher thread can loop through the FIFO queues to determine whether to start reading from one or more of the FIFO queues (e.g., based on whether the write done pointer achieves the threshold). In another example, one or more of the write threads can notify the dispatcher thread that data is available for reading, which may be a notification sent from the write thread after it updates the write done pointer. In a specific example, the dispatcher thread can monitor, via one or more processors of the GPU 12 and/or CPU 34, the write done pointers associated with one or more FIFO queues, and in response to the presence of data that has been written but not consumed, the dispatcher thread can perform various operations. Such operations may include allocating some or all written data for consumption based on the parameters and conditions specified at FIFO queue initialization time. On the state of the write done pointer indicating how much data has been written to each FIFO queue, and based on the amount of data which has already been allocated for consumption (e.g., based on a read allocation pointer), the dispatcher thread can invoke execution of one or more threads of a shader program (e.g., a data-consumption shader program 320) to be executed in a parallel manner on GPU 12, as described below in action 412. In addition, the dispatcher thread may optionally provide information to the shader program such as an identifier for the FIFO queue that stores the data, the starting or base address of the data to be consumed, or an index from which the base address can be derived, in combination with the FIFO queue ID, the number of elements of data to be consumed, and/or the like.

In either case, at 412, method 400 can include executing, via parallel execution of multiple read threads of a GPU, a read operation to read data from the memory locations in the multiple pages of memory. For example, the GPU 12 can be configured to execute, via parallel execution of multiple read threads of the GPU 12, the read operation to read data from the memory locations in the multiple pages of memory. For example, GPU 12 can execute (e.g., via FIFO queue work-launching program 330) one or more compute shaders to perform the read operation to read data from the FIFO queue, as described herein. For example, the one or more compute shaders can execute a fixed set of threads, such as 64 threads executing in parallel, to perform the read operation. Each of the multiple threads can read some data from the FIFO queue, which may include each read thread performing a data-consumption shader program (e.g., data-consumption shader program 320 defined above) to pop data to be read from the FIFO queue (e.g., via FIFO queue pop/dequeue address-generation routine 322), consume the popped data (e.g., via data-consumption routine 324), and/or possibly free the data from the FIFO queue (e.g., via FIFO queue data-free routine 326) including deallocating one or more pages of data from the FIFO queue (e.g., via pool page-free routine 328), as described above.

For example, the GPU 12 can launch (e.g., via FIFO queue work-launching program 330) enough shaders to read the data written based on the write done pointer. For example, GPU 12 can determine the number of data elements to be consumed (e.g., as a number of bytes represented in a difference between the read allocation pointer and the write done pointer), and then can launch one or more read threads to consume each data element, and/or it can launch one or more threads (such as a wave, or threadgroup, or portion of such) that can cooperate to consume a batch of data elements (such as a part or whole portion of a page filled with data). The size of the batch of data to be consumed, and the number of threads to launch to consume each batch of data, can be specified by Application 46, or by some other mechanism. In another example, the dispatcher thread can launch threads to read the data until a read thread is unable to advance the read allocation pointer (e.g., once the read allocation pointer reaches the write done pointer).

For example, to facilitate this operation, each FIFO queue may include pointers to its corresponding pages in the memory pool (e.g., page addresses 212), as well as a read allocation pointer (e.g., read allocation pointer 220) to track where data has been assigned for reading in a given page of memory, and/or a read done pointer (e.g., read done pointer 222) to indicate a point before which all data has been fully read and consumed, and/or an array of counts of bytes or elements consumed on each page (e.g., Read Done Counters 226). As described further herein, the read allocation pointer can allow each thread to determine where to read its data, and each thread, upon determining the read allocation pointer, can advance the read allocation pointer to a next memory location for reading data (e.g., for use by another thread). The acts of reading and advancing the read allocation pointer can be performed together simultaneously (atomically), e.g., by Atomic/Interlocked Operation Hardware 63, in order to avoid race conditions that would otherwise happen with multi-threaded execution.

In addition, once the data is read, the thread may advance a read done pointer. In one example, this can be performed based on a read done tracker, which can include an array of counters 226 (e.g., one per page or per segment of the FIFO queue) indicating how many bytes or data items have been consumed from each page or segment of the FIFO queue. For example, the read done tracker's counters can be zero initialized with the FIFO at the time of initialization, and can be incremented as reads from a page are completed, and then initialized back to zero when the read allocation pointer advances beyond the page. When the read done counter reaches a threshold that indicates that all data allocated for reading on a page has been fully read (e.g., and thus that the corresponding portion of the page has first been entirely filled with data), which can be determined by comparing the read counter with the read allocation pointer, this can indicate that the read done pointer may be updated (e.g., by a read thread or the thread dispatcher) based on the read done tracker. To determine the new read done pointer value, the thread may read the counters of the read done tracker, starting from the counter corresponding to the page associated with the previous value of the read done pointer, and ending with the first counter indicating that data on the corresponding page has not been fully written and/or consumed, and then updating the read done pointer to that location, similarly to the conditions and operations performed for updating the write done pointer which are shown in action 508 of method 500 in FIG. 5.

In one example, the invoked shader programs can perform operations such as retrieving data from a specified portion of the specified FIFO queue, where the specified portion can be indicated to the shader program by the dispatcher thread. The operations can also optionally include updating a counter indicating portions of the FIFO queue have been read (e.g., a read done counter 226), freeing newly unused portions of the FIFO queue to be reused, or freed to a pool, as described in further detail below, performing calculations or memory requests based on data retrieved from the FIFO queue, performing write operations to append data to one or more other FIFO queues, updating a pointer (e.g., a write allocation pointer and/or write done pointer) indicating data has been appended to the one or more other FIFO queues and is ready for consumption, etc. In another example, if data was written to one or more FIFO queues, the data-consumption shader program 320 that wrote the data can also notify the dispatcher thread or threads that data has been written to one or more specific FIFO queues.

Executing the read operation can also optionally include, at 412, deallocating one or more pages of memory to the memory pool. In an example, GPU 12, e.g., via a compute shader or other thread of execution managing the read threads, can be configured to deallocate the one or more pages of memory from the memory pool (e.g., by using functionality provided by the FIFO queue manager 74). In one example, the GPU 12 can deallocate the one or more pages of memory based on a location of the read done pointer. For example, where the read done pointer achieves a threshold, which may correspond to the end of a page, the GPU 12 can deallocate the page (and optionally some number of preceding pages in memory), back to the memory pool (e.g., memory pool 82, which can add the page or pages (e.g., pointers thereto) to free page list 204). For example, this can occur via the read thread that detects the read done pointer achieving the threshold. For example, the threshold for the read allocation pointer may be a memory location in a second page or other subsequent page in the list of page addresses 212, which can indicate that the first page or other prior pages, have been read. Freeing the memory back into the memory pool in this regard can allow for reuse of the memory for other FIFO queues such to conserve resources over previous memory management for executing graphics processes. In another example, the operation of freeing pages to the pool 82 can be based solely on the associated counter 226 in the read done tracker passing a threshold. For example, once all data on a page is consumed, the page may be freed to pool 82 immediately (or otherwise based on detecting that all data on the page is consumed), even if data in preceding pages of the FIFO queue has not yet been freed or fully consumed.

Figure 5:
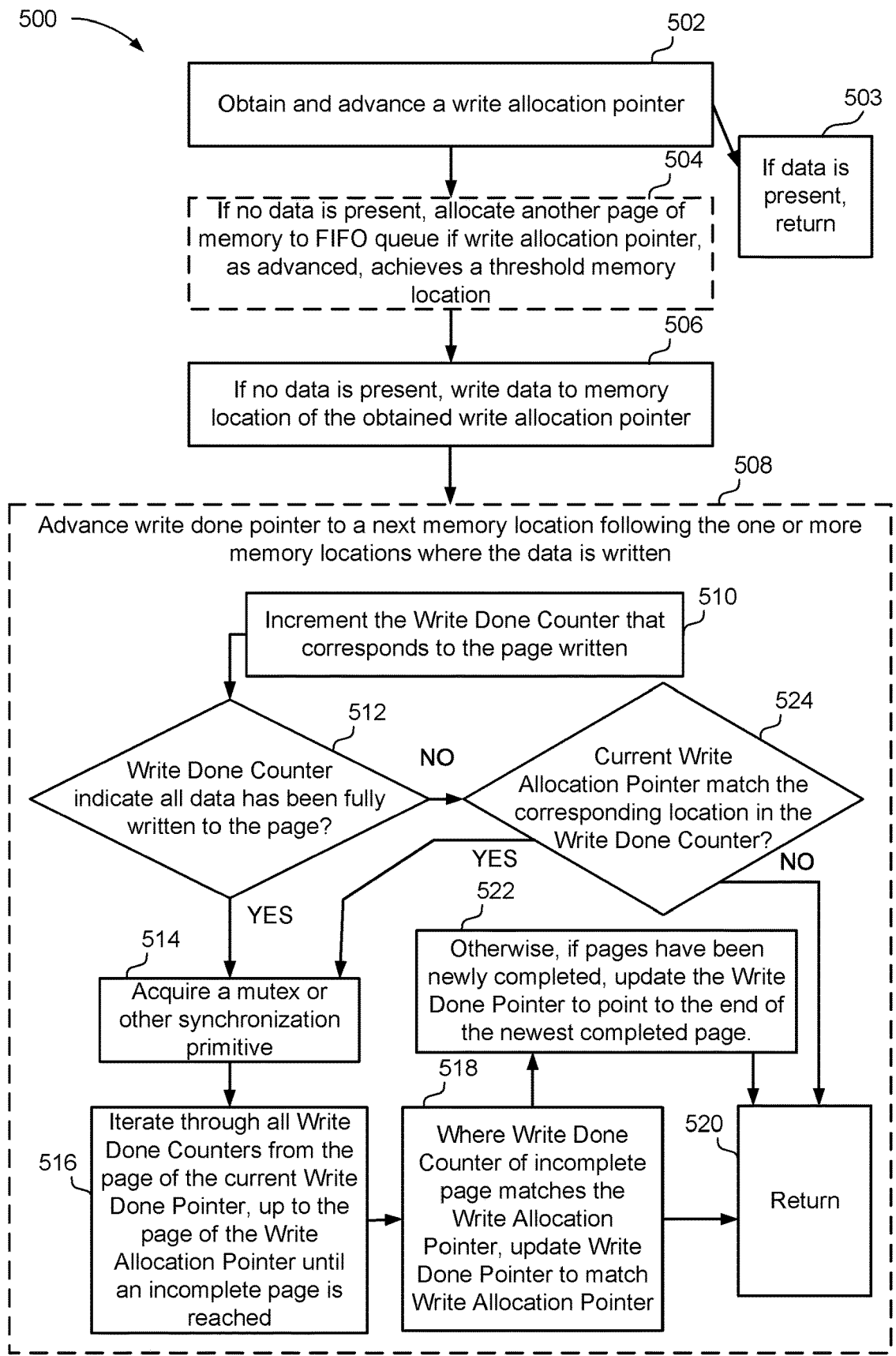
FIG. 5 is a flowchart of an example of a method of writing to memory resources according to the described examples.

Referring to FIG. 5, one example of a method 500 for operating a GPU 12 to write data to memory resources is illustrated. For example, method 500 can be performed by each write thread in a group of multiple write threads executing in parallel, as described herein. In one example, hardware-specific optimizations can be performed, such as coalescing requests to the Atomic/Interlocked Operation Hardware 63, arranging data structures to tune for device caching behavior/bus arrangement, etc. before performing operations described in method 500.

At 502, method 500 includes obtaining and advancing a write allocation pointer. In an example, GPU 12 can be configured to, e.g., via a compute shader or other construct executing a write thread, FIFO queue push/enqueue routine 314, etc., obtain and advance a write allocation pointer. For example, the GPU 12 can initialize a group of threads to write data into the FIFO queues. Thus, the GPU 12 can provide the data for writing, and can initialize the group of threads via a FIFO queue work-launching program 330 or command processor 64 that can manage writing and reading of data to/from the queues. For example, the given write thread can obtain the current write allocation pointer 216 and can advance the write allocation pointer 216. This may include performing an atomic operation to both obtain and advance the write allocation pointer 216 (such as by an instruction or request to Atomic Operation Hardware 63). Thus, for example, once the operation to advance the write allocation pointer succeeds, the thread can determine the write allocation pointer to use in writing its data (e.g. as the write allocation pointer 216 value before the increment or advance procedure succeeded). Moreover, as described, the write allocation pointer 216 can track memory locations as a function of a memory unit size for the FIFO queue, and thus the write allocation pointer 216 can be incremented by 1 (e.g., 1 memory unit size) by a given write thread, and the address can be resolved by at least one of subdividing the write allocation pointer into portions representing the memory page index, and offset within the page, looking up the memory page's address based on the index, and adding the offset multiplied by the memory unit size, etc. Once the write allocation pointer 216 is advanced, a next write thread can determine its write allocation pointer address and advance, and so on. This is so because advancing the pointer is "atomic" operation, and many threads or groups of threads can have an outstanding "obtain and increment" request outstanding at a time. Thus, while the GPU 12 itself receives atomic operations from many threads without any ordering between the threads, the GPU 12 (e.g. atomic operation hardware 63) can guarantee that reading and updating the various pointers can be done in the order the atomic operations were received, and the threads may not need to wait for other threads directly. Thus, no spinning or locking may be required.

In addition, in an example, where a write thread advances the write allocation pointer 216 beyond a last allowable page (e.g., overflow), the write thread can perform an atomic subtract to offset the write allocation pointer 216 by a count sufficient to reset it back to element zero of page zero. This overflow detection and offsetting operation may take some time. The other write threads that retrieve have a write allocation pointer in the overflowed state (e.g., after the write allocation pointer overflows but before the write allocation pointer is fixed up by the atomic subtraction) can perform a local subtract of their retrieved write allocation pointer 216 to offset from element zero of page zero. For example, if 1024 pages are allowed, and each page allows 512 elements, then both the atomic subtract operation and the local subtractions may subtract by a value of 1024*512, or 524288. In another example, if it is desired to track how many times the write allocation pointer has wrapped, then after the write allocation pointer crosses a threshold that is a specified multiple N of the number of pages P times the number of elements E per page, then subtractions of N*P*E may be performed after the write allocation pointer crosses a threshold of N*P*E; and the number of times wrapping (modulo N) can be calculated by dividing the write allocation pointer by P*E.

In one example, the dispatcher thread can initiate an ordered write (or push to the FIFO queue) by both reading and advancing the write allocation pointer 216, and then indicating, to each write thread, the original value of the write allocation pointer 216 and a thread identifier. Thus, each write thread can deduce its write allocation pointer 216 for writing the data to the FIFO queue, as described above, as an offset from the indicated write allocation pointer based on the thread identifier. In any case, at 503, if data is present at memory referenced by the write allocation pointer, the method 500 can return without further processing.

At 504, if no data is present at memory referenced by the write allocation pointer, the method 500 optionally includes allocating another page of memory to the FIFO queue if the write allocation pointer, as advanced, achieves a threshold memory location. In an example, GPU 12 can be configured to, e.g., via a compute shader or other construct executing a write thread that can utilize the FIFO queue manager 74, pool page-allocation routine 316, etc., allocate another page of memory to the FIFO queue if the write allocation pointer 216, as advanced, achieves a threshold memory location. Thus, this operation can be performed by the write thread that detects the write allocation pointer 216 achieving the threshold to ensure the allocation occurs one time for the multiple write threads. In addition, the threshold can be set so allocation occurs before the memory is actually needed for writing, so threads do not have to wait for allocation before writing data (e.g., a memory location in a second to last page in the list of memory page addresses 212, a memory location within the last page that is before the end of the page, such as a center memory location, etc.).

At 506, if no data is present at memory referenced by the write allocation pointer, the method 500 includes writing data to a memory location of the obtained write allocation pointer. In an example, GPU 12 can be configured to, e.g., via a compute shader or other construct executing a write thread, write data to the memory location calculated from the obtained write allocation pointer. For example, for a non-growable FIFO queue (such as a ring buffer), the address may be calculated by adding a base address to a product of the write allocation pointer (modulo the number of items allowed in the ring buffer), times the size in bytes of items written to the ring buffer. Or in another example, in a growable ring buffer, the address may be calculated by extracting a portion of the obtained write allocation pointer corresponding to a page index, and looking up a page address from that index, and adding that address to a remaining portion of the returned write allocation pointer.

For example, the data to write can be produced by a data-production routine 312, which may include data related to graphics processing (e.g., data or instructions related to rendering graphics, ray-tracing graphics, etc.). In this example, as each write thread has a separate value for the obtained write allocation pointer 216, as described, any of the write threads can write data to the FIFO queue in parallel at the addresses calculated from their unique values obtained from write allocation pointer 216.

At 508, the method 500 optionally includes advancing the write done pointer to a next memory location following to the one or more memory locations where the data is written. In an example, GPU 12 can be configured to, e.g., via a compute shader or other construct executing a write thread, FIFO queue write-done update routine 318, etc., advance the write done pointer 218 to the next memory location following to the one or more memory locations where the data is written. In another example, one or more of the write threads, or a dispatcher thread, can advance the write done pointer by the number of write threads once the threads have completed (e.g., and/or the number of write threads multiplied by an amount of data written by a given thread, where the amount of data is greater than or equal to one unit), or can advance by a write done counter 224 value. In yet another example, this may include the write thread (e.g., a detected last write thread or otherwise) notifying the dispatcher thread that data has been written to the FIFO queue.

In another example, the write thread can also increment a write done counter 224, as described. Moreover, in some examples described herein (e.g., for reading according to method 900 in FIG. 9), this can include setting a new value in an array of write done pointers, and incrementing a snapshot index to reflect the index of the new value within the array.

In one example, the dispatcher thread can initiate an ordered write (or push to the FIFO queue) by both reading and advancing the write allocation pointer 216, and then indicating, to each write thread, the original value of the write allocation pointer 216 and a thread identifier. Thus, each write thread can deduce its write allocation pointer 216 for writing the data to the FIFO queue, as described above, as an offset from the indicated write allocation pointer based on the thread identifier.

In a specific example, advancing the write done pointer at action 508 may include, at 510, incrementing the write done counter that corresponds to the page written. In an example, GPU 12 can be configured to, e.g., via a compute shader or other construct executing a write thread, FIFO queue write-done update routine 318, etc., increment the write done counter 224 that corresponds to the page written. In this example, at 512, it can be determined whether the write done counter indicates that all data has been fully written to the page. In an example, GPU 12 can be configured to, e.g., via a compute shader or other construct executing a write thread, FIFO queue write-done update routine 318, etc., determine whether the write done counter indicates all data has been fully written to the page. For example, this can include determining whether the write done counter is equal to a value representing a maximum number of items that can be written to the page.

Where the write done counter indicates that all data has been fully written to the page, at 514, a mutex or other synchronization primitive can be acquired, such that only one thread may be allowed to modify the one or more write done pointers at a time. In an example, GPU 12 can be configured to, e.g., via a compute shader or other construct executing a write thread, FIFO queue write-done update routine 318, etc., acquire the mutex or other synchronization primitive such as a "No-Spin Mutex" 1810. In an example, this can be accomplished using atomic/interlocked operation hardware 63, as described. In this example, at 516, all write done counters can be iterated through from the page of the current write done pointer, up to the page of the write allocation pointer until an incomplete page is reached. In an example, GPU 12 can be configured to, e.g., via a compute shader or other construct executing a write thread, FIFO queue write-done update routine 318, etc., iterate through all write done counters 224 from the page of the current write done pointer 218 up to the page of the write allocation pointer 216 until the incomplete page is reached. For example, this can include determining an incomplete page as having a write done counter not equal to the number of items that have been allocated to be written to a page.

At 518, where the write done counter of the incomplete page matches the write allocation pointer, the write done pointer can be updated to match the write allocation pointer, and can return at 520. In an example, GPU 12 can be configured to, e.g., via a compute shader or other construct executing a write thread, FIFO queue write-done update routine 318, etc., can, where it determines that the write done counter 224 matches the write allocation pointer 216, update the write done pointer 218 to match the write allocation pointer 216.

At 522, where the write done counter of the incomplete page does not match the write allocation pointer (i.e., if one page has been newly completed, but another page has some space allocated for writes, which writes have not yet completed) the write done pointer can be updated to point to the end of the newest completed page, and the code can return at 520. In an example, GPU 12 can be configured to, e.g., via a compute shader or other construct executing a write thread, FIFO queue write-done update routine 318, etc., if the pages have been newly completed, update the write done pointer 218 to point to the end of the newest completed page of memory.

Where the write done counter does not indicate that all data has been fully written to the page at action 512, at 524, it can be determined whether the current write allocation pointer matches the corresponding location in the write done counter. In an example, GPU 12 can be configured to, e.g., via a compute shader or other construct executing a write thread, FIFO queue write-done update routine 318, etc., determine whether the current write allocation pointer 216 matches the corresponding location in the write done counter 224. If not, this can indicate that there is more writing to be performed, and the action 508 can return at 520. Or if so, action 508 can proceed to 514 to acquire the mutex and begin iterating through counters, as described.

Figure 6:
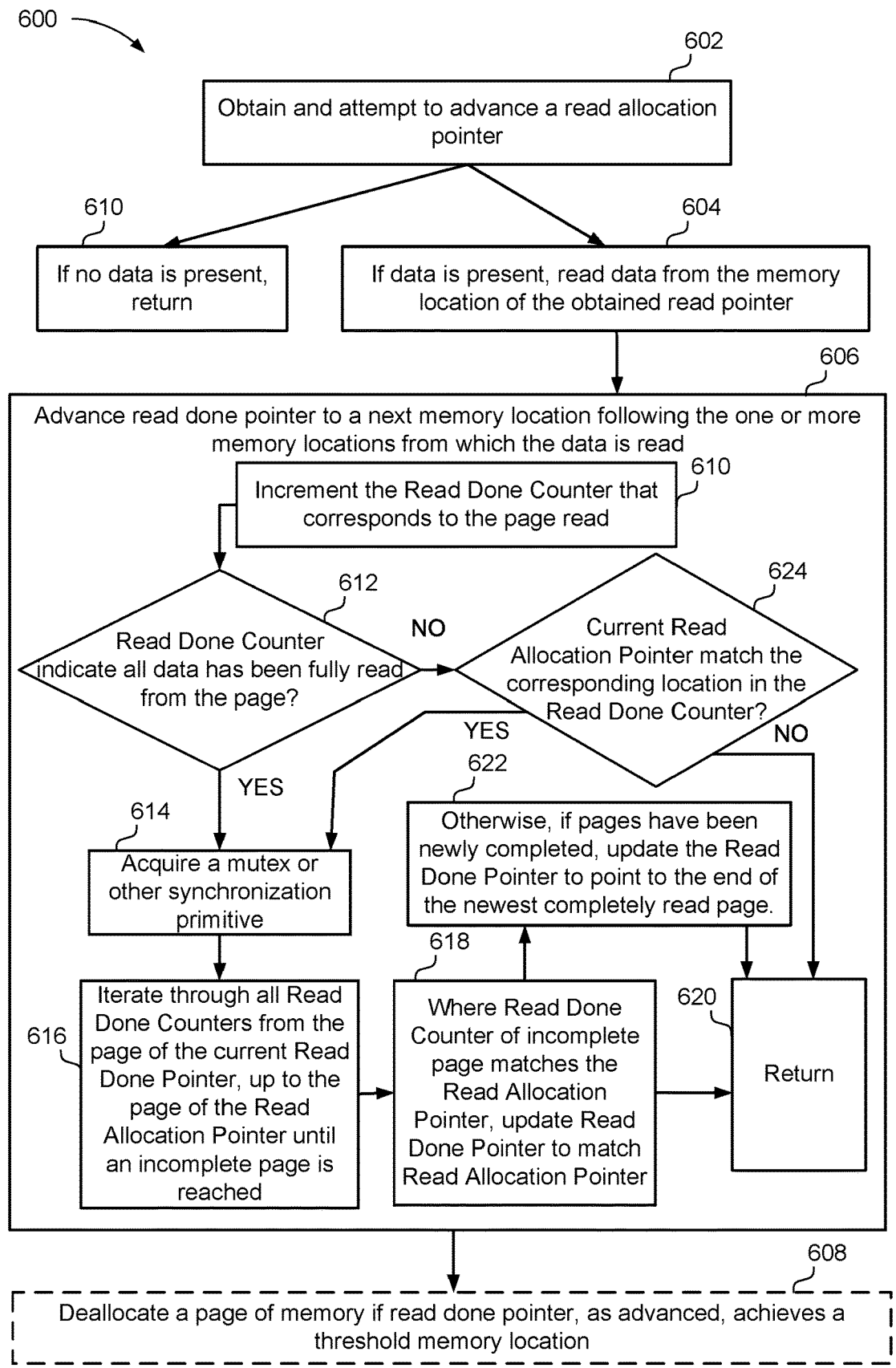
FIG. 6 is a flowchart of an example of a method of reading from memory resources according to the described examples.

Referring to FIG. 6, one example of a method 600 for operating a GPU 12 to read data from memory resources is illustrated. For example, method 600 can be performed by each read thread in a group of multiple read threads executing in parallel, as described herein.

At 602, method 600 includes obtaining and advancing a read allocation pointer. In an example, GPU 12 can be configured to, e.g., via a compute shader or other construct executing a read thread, FIFO queue pop/dequeue address-generation routine 322, etc., obtain and advance the read allocation pointer. For example, the GPU 12 can initialize a group of threads to read data from the FIFO queues. In one example, the GPU 12 can determine to execute the group of threads based on the write done pointer 218, as described (e.g., via a FIFO queue work-launching program 330 that can manage threads that perform the writing and reading of data to/from the queues). In one example, a portion of a shader program 73 (such as pool page allocation routine 316) may wish to pop an item from a FIFO, such as the free page list 204 of a memory pool 82. For example, the given read thread can obtain the current read allocation pointer 220 and can advance the read allocation pointer 220. This may include performing an atomic operation to both obtain and advance the read allocation pointer. Thus, for example, once the operation to advance the read allocation pointer succeeds, the thread can determine the read allocation pointer to use in reading its data (e.g. as the read allocation pointer 220 value before the increment or advance procedure succeeded). Moreover, as described, the read allocation pointer 220 can track memory locations as a function of a memory unit size for the FIFO queue, and thus the read allocation pointer 220 can be incremented by 1 by a given read thread, and the address can be resolved by subdividing the read allocation pointer into portions representing the memory page index, and offset within the page, looking up the memory page's address based on the index, and adding the offset multiplied by the memory unit size. Once the read allocation pointer 220 is advanced, a next read thread can determine its read allocation pointer address and advance, and so on. In addition, for example, incrementing performed by multiple read threads may be coalesced into a single add operation on the read allocation pointer. This can improve efficiency of the action 602. This coalescing can be provided for a fixed set of threads, and/or multiple groups of fixed sets of threads.

In another example, at action 602, FIFO queue work-launching program 330 (or other dispatcher thread) can read a Write Done pointer (via 332) and perform a multi-allocate-for-read routine 334 to obtain and update read allocation pointer 220, then launch a set of shader threads and pass the old copy of the read allocation pointer to the shaders.

In one example, modes of FIFO Queue processing can be provided for reading the data where reading of the data may occur simultaneously with writing of data from a different portion of the same FIFO queue—or a mode may exist where reading and writing simultaneously is not allowed.

At 604, the method 600 includes reading data from the memory location of the obtained read allocation pointer. In an example, GPU 12 can be configured to, e.g., via a compute shader or other construct executing a read thread, data-consumption routine 324, etc., read data from the memory location of the obtained read allocation pointer. Thus, as each read thread has a separate value for the obtained read allocation pointer 220, as described, any of the read threads can read data from the FIFO in parallel at their corresponding read allocation pointer 220 addresses. In another example, the read thread can also increment a read done counter 226, as described. At 610, the method 600 can return if no data is present.

At 606, the method 600 includes advancing the read done pointer to a next memory location following the one or more memory locations from which the data is read. In an example, GPU 12 can be configured to, e.g., via a compute shader or other construct executing a read thread, FIFO queue read-done update routine 327, etc., advance the read done pointer 222 to the next memory location following the one or more memory locations from which all data has been read by one or more read threads. In one example, a counter of completed reads per page is maintained (e.g., a read done counters 226), such that any time a read thread completes a read, it increments the appropriate counter; when a thread determines that it has completed the last read on a page, it can update the read done pointer 222 to point to the beginning of the next page of memory, after verifying that data has also been read from any previous pages (e.g., by reading the read done pointer 222 and/or previous page read done counters 226). In another example, when a thread determines that it has completed the last read that has been initiated, e.g., because the outstanding read counter on a page matches the number of reads which have been initiated on the page, and the read done pointer points to that page, the read done pointer can be updated to point to the read allocation pointer.

In a specific example, advancing the read done pointer at action 606 may include, at 610, incrementing the read done counter that corresponds to the page read. In an example, GPU 12 can be configured to, e.g., via a compute shader or other construct executing a read thread, FIFO queue read-done update routine 327, etc., increment the read done counter 226 that corresponds to the page read. In this example, at 612, it can be determined whether the read done counter indicates that all data has been fully read from the page. In an example, GPU 12 can be configured to, e.g., via a compute shader or other construct executing a read thread, FIFO queue read-done update routine 327, etc., determine whether the read done counter indicates all data has been fully read from the page. For example, this can include determining whether the read done counter is equal to a value representing a maximum number of items that can be read from the page.

Where the read done counter indicates that all data has been fully read from the page, at 614, a mutex or other synchronization primitive can be acquired, such that only one thread may be allowed to modify the one or more read done pointers at a time. In an example, GPU 12 can be configured to, e.g., via a compute shader or other construct executing a read thread, FIFO queue read-done update routine 327, etc., acquire the mutex or other synchronization primitive such as a "No-Spin Mutex" 1810. In an example, this can be accomplished using atomic/interlocked operation hardware 63, as described. In this example, at 616, all read done counters can be iterated through from the page of the current read done pointer, up to the page of the read allocation pointer until an incompletely read page is reached. In an example, GPU 12 can be configured to, e.g., via a compute shader or other construct executing a read thread, FIFO queue read-done update routine 327, etc., iterate through all read done counters 226 from the page of the current read done pointer 222 up to the page of the read allocation pointer 220 until the incompletely read page is reached. For example, this can include determining an incompletely read page as having a read done counter not equal to the number of items that have been allocated to be read from a page.

At 618, where the read done counter of the incomplete page matches the read allocation pointer, the read done pointer can be updated to match the read allocation pointer, and can return at 620. In an example, GPU 12 can be configured to, e.g., via a compute shader or other construct executing a read thread, FIFO queue read-done update routine 327, etc., can, where it determines that the read done counter 226 matches the read allocation pointer 220, update the read done pointer 222 to match the read allocation pointer 220.

At 622, where the read done counter of the incompletely read page does not match the read allocation pointer (i.e., if one page has been newly completely read, but another page has some space allocated for reads, which reads have not yet completed) the read done pointer can be updated to point to the end of the newest completely read page, and the code can return at 620. In an example, GPU 12 can be configured to, e.g., via a compute shader or other construct executing a read thread, FIFO queue read-done update routine 327, etc., if the pages have been newly completely read, update the read done pointer 222 to point to the end of the newest completely read page of memory.

Where the read done counter does not indicate that all data has been fully read from the page at action 612, at 624, it can be determined whether the current read allocation pointer matches the corresponding location in the read done counter. In an example, GPU 12 can be configured to, e.g., via a compute shader or other construct executing a read thread, FIFO queue read-done update routine 327, etc., determine whether the current read allocation pointer 220 matches the corresponding location in the read done counter 226. If not, this can indicate that there is more reading to be performed, and the action 606 can return at 620. Or if so, action 606 can proceed to 614 to acquire the mutex and begin iterating through counters, as described.

At 608, the method 600 optionally includes deallocating a page of memory if the specified FIFO queue is growable (e.g., that its memory comes from pages dynamically allocated from a pool 82), and if the read done pointer, as advanced, achieves a threshold memory location. In an example, GPU 12 can be configured to, e.g., via a compute shader or other construct executing a read thread that can utilize routines of the FIFO queue manager 74, such as pool page-free routine 328, etc., deallocate a page of memory if the read done pointer 222, as advanced, achieves a threshold memory location. Thus, this operation can be performed by the read thread that detects the read done pointer 222 achieving the threshold to ensure the deallocation occurs one time for the multiple read threads. In addition, the threshold can be set to ensure an entire page is read before it is freed back to the memory pool 82, to prevent data corruption in reading the page. In addition, this can include marking the page for deallocation (e.g., where another thread, such as a dispatcher thread, can actually process the deallocation).

In one example, the dispatcher thread can initiate an ordered read (or pop from the FIFO queue) by retrieving and advancing the read allocation pointer 220, and then indicating, to each read thread, the initial value of the read allocation pointer 220 along with a thread identifier. Thus, each read thread can deduce its read allocation pointer 220 for reading the data from the FIFO queue, as described herein, as an offset from the indicated read allocation pointer based on the thread identifier. In this example (when ordered reads are used), a dispatcher thread can advance the read done pointer by the number of threads once the threads have completed, or the consumer threads can perform the update of the read done pointer as previously described.

In one example, the dispatcher thread can initiate threads that perform both one or more ordered read operations and/or one or more ordered write operations, from one or more FIFO queues, by examining and advancing the associated read allocation pointers 220 and/or write allocation pointers 216, and passing the original values as inputs to the shader threads.

In another example, a number of items written per page can be tracked via a write done counters 224 in the write threads, as can a number of items read per page via a read done counters 226 in the read threads. These counters can be updated via atomic instructions. In this example, a dispatcher thread, or some other thread such as might be executing the data-consumption shader program 320, can compare the counter values to determine when the page has been fully written and read, and can use this information to determine when to deallocate the page. For example, when a thread updates a page's read done counter 226, it can compare it to a threshold indicating that all data in the page has been read (and therefore, by assumption, was also first written)—and therefore, the page can be freed by the thread, or marked by the thread to be freed by some other thread at a later time.

Additionally, other modes of FIFO Queue processing can be provided (in addition to, or in combination with the above) where excessive read requests can be detected (e.g., where the read threads attempt to access beyond the write done pointer) and/or where excessive write requests can be detected (e.g., where the FIFO queue is full, but a thread attempts to push additional data into it). Additional modes can also be provided (in addition to, or in combination with the above modes) where FIFOs are growable or not growable. In this example, the application 46 or FIFO queue manager 74 or other software may select a mode or combination of modes for a FIFO queue or collection of FIFO queues, in order to determine behavior of shaders and other threads or programs which will initialize, manage and/or use the growable FIFOs.

FIGS. 7-11 depict examples of methods for modifying the various pointers 214 to ensure that read threads (e.g., executing data-consumption shader program 320) do not attempt to read data from memory locations that have not yet been written. These methods of modifying various pointers 214 can also be used to allow shader programs 73 such as data-consumption shader program 320, or portions of shader programs such as pool allocation routine 316, to efficiently and atomically both enquire whether data is present in a FIFO, and (only if data is present), acquire and allocate that data for consumption, e.g., even when some or additional data is simultaneously being written by other shader threads. In addition, the same or similar algorithms can also be used to ensure that write threads (e.g., executing data-production shader program, 310) do not attempt to allocate and use memory which is not available for writing (e.g., because a FIFO queue or ring buffer is full), as described in FIGS. 12-16 below. In an example, a FIFO queue can be set up to support this advanced write-time overflow checking, or advanced read-time underflow checking, or both. For example, in the case where both are supported, two snapshot pointers may be used: one for specifying access to the write allocation pointers, read done pointers, and batch read done pointers; and another for specifying access to the write done pointers, batch write done pointers, and read allocation pointers.

Figure 7:
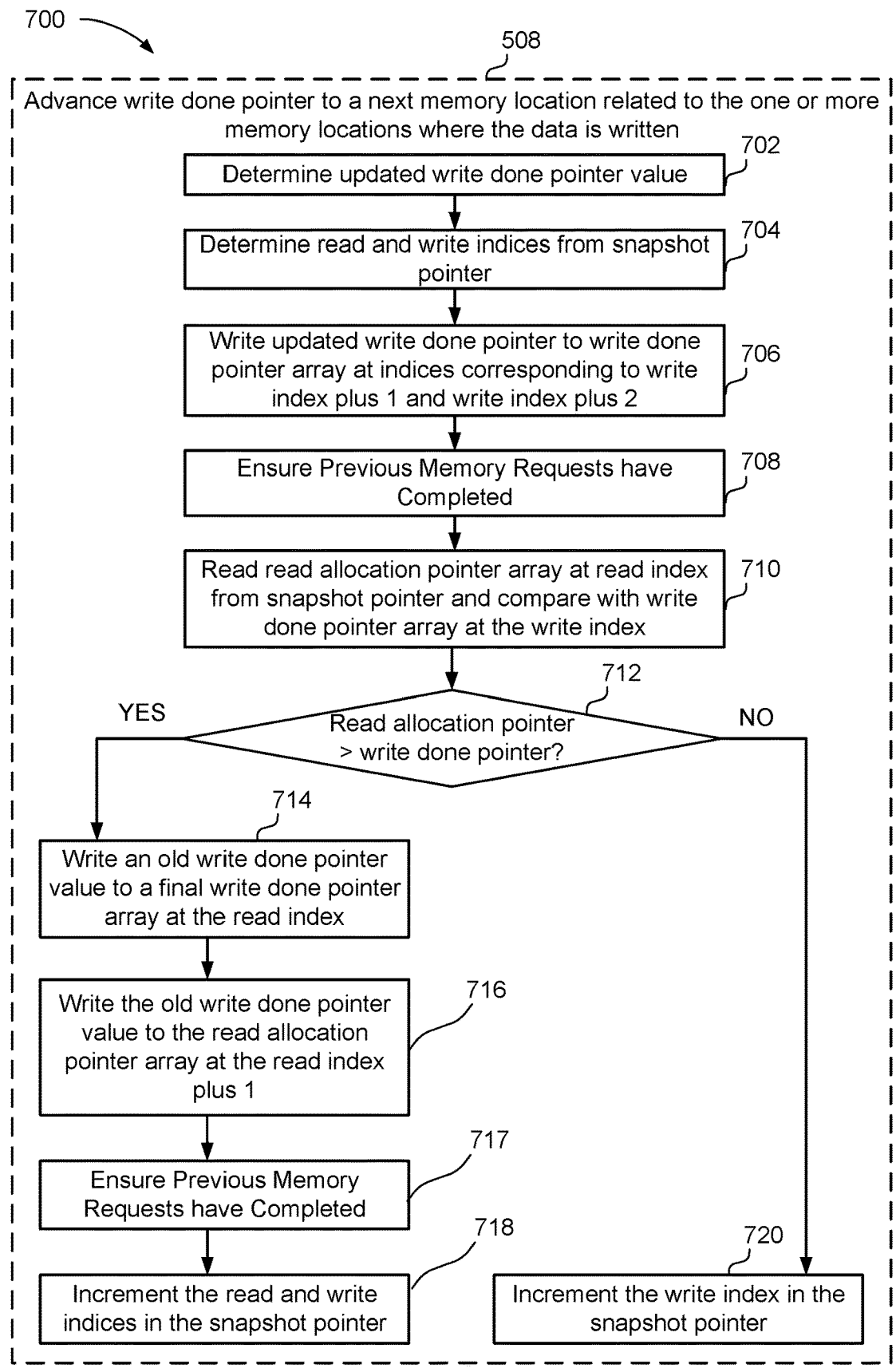
FIG. 7 is a flowchart of an example of a method of writing data to memory resources and updating corresponding pointers to facilitate reading the data according to the described examples.
Figure 8:
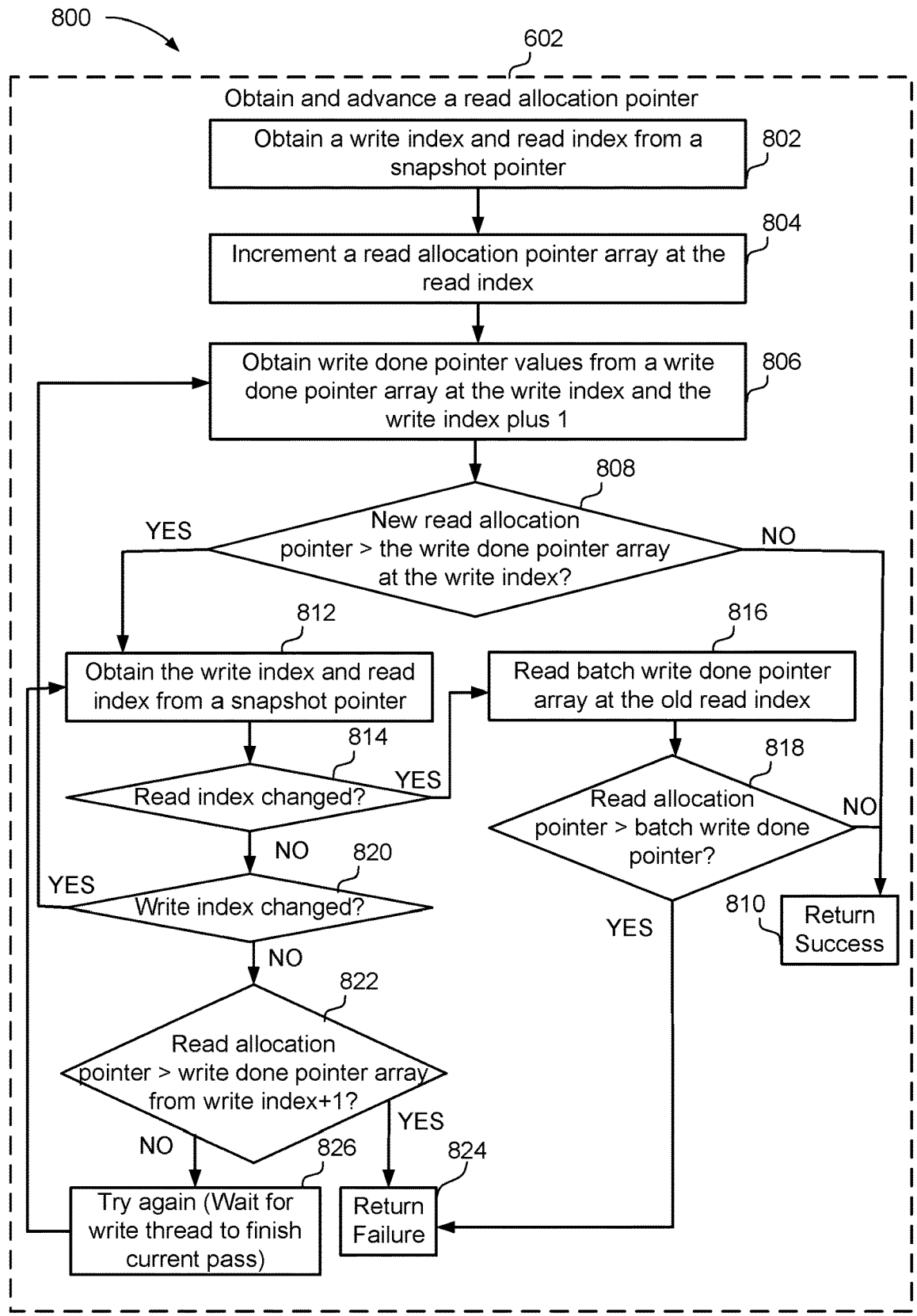
FIG. 8 is a flowchart of an example of a method of reading from memory resources based on determining a read index and write index into arrays of pointers according to the described examples.

Referring to FIGS. 7 and 8, one example of a method 700 for operating a GPU 12 to advance a write done pointer and one example of a method 800 for operating the GPU 12 to advance a read allocation pointer are illustrated. For example, method 700 can further define an example of advancing the write done pointer to a next memory location related to the one or more memory locations of a FIFO queue where the data is written, as described in reference to action 508 in method 500 of FIG. 5 above. For example, method 800 can further define an example of obtaining and advancing a read allocation pointer to determine one or more memory locations from which to read data from the FIFO queue, as described in reference to action 602 in method 600 of FIG. 6 above. In methods 700 and 800, multiple copies of a write done pointer can be stored in an array of write done pointers 218 to resolve race conditions in setting and/or checking the write done pointer. Similarly, in methods 700 and 800, multiple copies of a read allocation pointer can be stored in an array of read allocation pointers 220 to resolve race conditions between advancing and/or comparing the read allocation pointers 220 and write done pointers 218.

In general, in an example, methods 700 and 800 can describe updating a write done pointer by setting a next value in the write done pointer array, and updating a write index to reflect the index of the next value. If the read allocation pointer 220 is determined to advance too far (e.g., beyond the current write done pointer), a previous value of the write done pointer as set in the write done pointer array can be used as a reference for a read allocation pointer in the read allocation pointer array 220 (e.g., to roll back from an over-allocated position represented in a previous read allocation pointer, into the first location where valid data is present, in a new read allocation pointer in array 220). The value of the write done pointer can also be used to set a batch write done pointer (e.g., in batch write done pointer array 232) to specify a range of data that is valid for an associated read allocation pointer in array 220.

At 702, action 508 can include determining an updated write done pointer value. In an example, GPU 12 can be configured to, e.g., via a compute shader or other construct executing a write thread, FIFO queue write-done update routine 318, etc., determine the updated write done pointer value. For example, the updated write done pointer value can refer to the memory location to which the write done pointer is advanced in action 508.

At 704, action 508 can include determining read and write indices from a snapshot pointer. In an example, GPU 12 can be configured to, e.g., via a compute shader or other construct executing a write thread, FIFO queue write-done update routine 318, etc., determine the read and write indices from the snapshot pointer 228. As described, the GPU 12 can store the snapshot pointer 228 to indicate one or more indices in one or more arrays to indicate current values of the one or more arrays. For example, the snapshot pointer 228 may include a single value from which can be calculated an index into an array of read allocation pointers 220, an index into an array of batch write done pointers 232, and an index into an array of write done pointers 218; or may include a read index into both the array of read allocation pointers 220 and batch write done pointers 232, and also a separate write index into the array of write done pointers 218, etc.

At 706, action 508 can include writing the updated write done pointer to a write done pointer array at indices corresponding to the write index plus 1 and the write index plus 2. In an example, GPU 12 can be configured to, e.g., via a compute shader or other construct executing a write thread, FIFO queue write-done update routine 318, etc., write the updated write done pointer to the write done pointer array (e.g., an array of write done pointers 218, also referred to herein as "writeDonePtr[ ]") at indices corresponding to the write index (also referred to herein as "wIndex") plus 1 (e.g., writeDonePtr[wIndex+1]) and the write index plus 2 (e.g., writeDonePtr[wIndex+2]). Writing the updated write done pointer value to both the wIndex+1 and wIndex+2 can help with race/error conditions, described in further detail below. Additionally, the example may include performing a wrapping operation, such that if wIndex+1 or wIndex+2 specifies an index that points to a location beyond the write done pointer array, then the summed value can be replaced with a value of 0 or 1, as would be appropriate if the write done pointer array was a ring buffer.

At 708, action 508 can include ensuring previous memory requests have completed. In an example, GPU 12 can be configured to, e.g., via a compute shader or other construct executing a write thread, FIFO queue write-done update routine 318, etc., ensure previous memory requests (e.g., for graphics memory 58, memory pool 82, FIFO memory buffer 83, etc.) have completed. In an example, the same thread which performs 706 can wait for the writes to the write done pointer array 218 to be completed by the GPU, such that the changes to write done pointer array 218 are visible to all other shader processor cores 68, before continuing on to action 710.

At 710, action 508 can include reading the read allocation pointer array at a read index from the snapshot pointer and comparing this value with the write done pointer array at the write index. In an example, GPU 12 can be configured to, e.g., via a compute shader or other construct executing a write thread, FIFO queue write-done update routine 318, etc., read the read allocation pointer array (e.g., array of read allocation pointers 220, also referred to herein as "readAllocPtr[ ]") at the read index (also referred to herein as "rIndex") from the snapshot pointer 228, and can compare this value with the write done pointer array at the write index.

At 712, action 508 can include determining whether the read allocation pointer (at the read index) is greater than the write done pointer (at the write index). In an example, GPU 12 can be configured to, e.g., via a compute shader or other construct executing a write thread, FIFO queue write-done update routine 318, etc., determine whether the read allocation pointer is greater than the write done pointer (e.g., whether readAllocPtr[rIndex]>writeDonePtr[wIndex]). For example, where the read allocation pointer is greater than the write done pointer, this may indicate that the read allocation pointer is set to read data that may not have been present before the write operation at action 506 completed. The comparison operation may also take wrapping into account such that if the specified read allocation pointer has wrapped more or less times than the specified write done pointer, then the number of times wrapping can be used in comparison instead of the value of the specified pointers.

In this example, where the read allocation pointer (at the read index) is determined to be greater than the write done pointer (at the write index), action 714 can include writing an old write done pointer value to a batch write done pointer array at the read index. In this example, GPU 12 can be configured to, e.g., via a compute shader or other construct executing a write thread, FIFO queue write-done update routine 318, etc., write the old write done pointer value to the batch write done pointer array (also referred to herein as "batchWriteDonePtr[ ]"), which may include a plurality of batch write done pointers 232, at the read index. This value can be used in subsequently determining whether to read data and/or report that no data is present, as described further with reference to FIG. 8.

In addition, in this example, action 716 can include writing the old write done pointer value to the read allocation pointer array at the read index plus 1 (e.g., or, if the read index plus 1 is equal to the number of valid locations in the read allocation pointer array, then writing the value to the first element of read allocation pointer array, e.g., readAllocPtr[0]).

In addition, in this example, action 717 can include ensuring previous memory requests have completed, similarly as action 708. And action 718 can include incrementing the read index in the snapshot pointer. In this example, GPU 12 can be configured to, e.g., via a compute shader or other construct executing a write thread, FIFO queue write-done update routine 318, etc., increment the read index (e.g., rIndex) in the snapshot pointer 228 to facilitate reading data at a memory location indicated in the read allocation pointer at the read index (e.g., that corresponds to the old write done pointer value, as described above).

In addition, in this example, and where the read allocation pointer is not greater than the write done pointer at action 712, actions 718 and/or 720 can include incrementing the write index in the snapshot pointer. In this example, GPU 12 can be configured to, e.g., via a compute shader or other construct executing a write thread, FIFO queue write-done update routine 318, etc., increment the write index (e.g., wIndex) in the snapshot pointer 228 to facilitate updating the write done pointer in the array at the next wIndex value by the next write thread (e.g., at action 706 when executed by the next thread). For example, in 718, the read and write indices can be incremented simultaneously.

Referring to FIG. 8, at 802, action 602 for obtaining and advancing the read allocation pointer (e.g., one of multiple read allocation pointers associated with a FIFO queue), can include obtaining a write index and a read index from a snapshot pointer. In an example, GPU 12 can be configured to, e.g., via a compute shader or other construct executing a read thread, FIFO queue pop/dequeue address-generation routine 322, etc., obtain the write index and the read index from the snapshot pointer 228. For example, the write index and the read index values can be modified in advancing the write done pointer at action 508, as described in reference to FIG. 7 above. Modifying the indices can include updating values and storing them in the snapshot pointer 228 stored in memory, as described.

At 804, action 602 for obtaining and advancing the read allocation pointer, can include incrementing a read allocation pointer in the read allocation pointer array at the read index. In an example, GPU 12 can be configured to, e.g., via a compute shader or other construct executing a read thread, FIFO queue pop/dequeue address-generation routine 322, etc., increment the read allocation pointer array at the read index. For example, GPU 12 can increment the read allocation pointer in the array at the read index (e.g., readAllocPtr[rIndex]), which can be the current read allocation pointer, to a next memory location or other value. In one example, this can include an atomic increment of the read allocation pointer. For example, this increment can be an increment operation using atomic/interlocked operation hardware 63 to interlocked increment the read allocation pointer. In this regard, in one example, the interlocked increment performed by multiple read threads may be coalesced into a single add operation on the read allocation pointer. This can improve efficiency of the action 602, and can also result in data from contiguous memory locations be returned to the threads.

At 806, action 602 for obtaining and advancing the read allocation pointer, can include obtaining write done pointer values from a write done pointer array at the write index and the write index plus 1 (including, in an example, wrapping the sum of the write index as necessary, as described above in reference to action 706). In an example, GPU 12 can be configured to, e.g., via a compute shader or other construct executing a read thread, FIFO queue pop/dequeue address-generation routine 322, etc., obtain write done pointer values from the write done pointer array at the write index and the write index plus 1 (e.g., obtain writeDonePtr[wIndex] and writeDonePtr[wIndex+1]). As described, obtaining both values (and/or additional values) can help prevent race conditions, as described below.

At 808, action 602 for obtaining and advancing the read allocation pointer, can include determining whether the new read allocation pointer (e.g., as incremented at action 804) is greater than the write done pointer array at the write index. In an example, GPU 12 can be configured to, e.g., via a compute shader or other construct executing a read thread, FIFO queue pop/dequeue address-generation routine 322, etc., determine whether the new read allocation pointer (e.g., readAllocPtr[rIndex] as incremented at action 804) is greater than the write done pointer array at the write index (e.g., whether readAllocPtr[rIndex]>writeDonePtr[wIndex]). If not, this can indicate that advancing the read allocation pointer at action 804 is correct, and the action of obtaining and advancing the read allocation pointer can successfully return at 810. If so, additional logic may be specified to determine whether to successfully return or not. Additionally, the comparison of read allocation pointer with write done pointer may include also comparing the number of times each value has wrapped (such as might happen with a ring buffer). So, in this example, if the specified read allocation pointer has wrapped fewer times than the write done pointer, then it is treated as if the read allocation pointer is less than the write done pointer, regardless of the values of the pointers.

For example, where the new read allocation pointer is greater than the write done pointer at the indices specified by the snapshot pointer at action 808, action 812 can include again obtaining the write index and read index from the snapshot pointer (e.g., to determine whether one or more of the indices has changed since they were read at action 802). In an example, GPU 12 can be configured to, e.g., via a compute shader or other construct executing a read thread, FIFO queue pop/dequeue address-generation routine 322, etc., obtain the write index and the read index from the snapshot pointer 228, as described above, as one or more of the indices may have been updated by a write thread (e.g., as described in reference to FIG. 7).

In this example, at 814, action 602 for obtaining and advancing the read allocation pointer, can include determining whether the read index has changed. In an example, GPU 12 can be configured to, e.g., via a compute shader or other construct executing a read thread, FIFO queue pop/dequeue address-generation routine 322, etc., determine whether the read index of the snapshot pointer has changed (e.g., which can indicate that the thread at action 712 had detected that one or more read allocation operations had progressed beyond data which had been fully written). If so, at 816, the batch write done pointer array at the old read index can be read. In an example, GPU 12 can be configured to, e.g., via a compute shader or other construct executing a read thread, FIFO queue pop/dequeue address-generation routine 322, etc., read the batch write done pointer at the old read index (e.g., the read index obtained from the snapshot pointer at action 802).

In this example, at 818, action 602 for obtaining and advancing the read allocation pointer, can include determining whether the read allocation pointer is greater than the batch write done pointer (e.g., indicating that the present thread read allocation operation 602 is one of the one or more threads detected as underflowing by operation 712). In an example, GPU 12 can be configured to, e.g., via a compute shader or other construct executing a read thread, FIFO queue pop/dequeue address-generation routine 322, etc., determine whether the read allocation pointer is greater than the batch write done pointer (as read from the batch write done pointer array at the old read index). If not (e.g., indicating that the read allocation operation 602 successfully allocated data for reading before underflow occurred), action 602 can successfully return at action 810. Or if the read allocation pointer is determined to be greater than the batch write done pointer, action 602 can proceed to actions 824 and 610 to return a failure or error code, in which case no data should be read.

Where the read index has not changed at action 814 (indicating that a thread updating the write done pointer has not yet detected an underflow by the read threads), at 820, it can be determined whether the write index has changed (indicating that that a write thread has recently updated a write done pointer). In an example, GPU 12 can be configured to, e.g., via a compute shader or other construct executing a read thread, FIFO queue pop/dequeue address-generation routine 322, etc., determine whether the write index of the snapshot pointer has changed. If so, action 602 can proceed to action 806 to obtain the write done pointer values from the new write index.

Where the write index has not changed at action 814, at 822, it can be determined whether the read allocation pointer is greater than the write done pointer array at the write index plus 1. In an example, GPU 12 can be configured to, e.g., via a compute shader or other construct executing a read thread, FIFO queue pop/dequeue address-generation routine 322, etc., determine whether the read allocation pointer is greater than the write done pointer array at the write index plus 1 (e.g., whether readAllocPtr[rIndex]>batchWriteDonePtr[wIndex+1], where wrapping of wIndex+1 may be performed, as previously explained). If so, action 602 can return a failure at 824. If not (e.g., indicating a write thread is in the process of updating a write done pointer as part of action 508), at 826, action 602 can try to read data and/or manage the corresponding pointers again, which may include waiting (e.g., for a determined amount of time) for the write thread to finish its current pass. For example, GPU 12, in this example, can continue to action 812 to obtain the write index and read index from the snapshot pointer and/or determine whether the read allocation pointer is still greater than the write done pointer, etc. In another example, GPU 12 can return failure where the write index has not changed regardless of the new snapshot values.

In addition, in the example of method 800, after action 602 returns, if the return is successful, data may be read at action 604. Also, in this example, action 606 in method 600 may include additional consideration to prevent underflowing of the read allocation pointer, such as a reread of the snapshot pointer 228, a reread of the read allocation pointer in the array at the read index of the snapshot pointer (e.g., read readAllocPtr[rIndex]), a reread of the write done pointer array at the write index of the snapshot pointer (e.g., writeDonePtr[wIndex]), and/or ensuring the read allocation pointer does not pass the write done pointer (e.g., that readAllocPtr[rIndex]<writeDonePtr[wIndex]). If action 602 returns a failure or error, data may not be read at action 604 and/or method 600 can terminate for the read thread.

Figure 9:
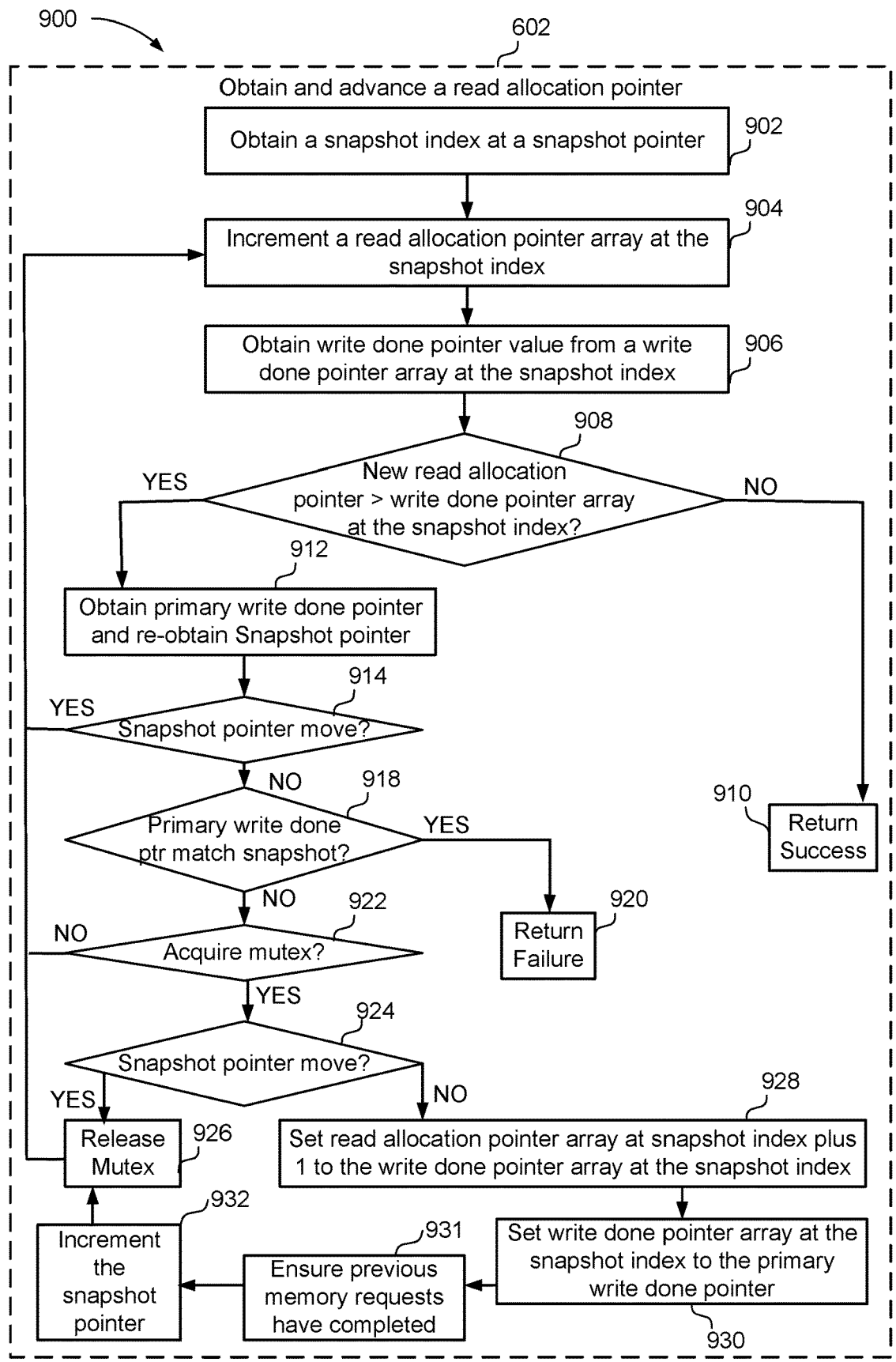
FIG. 9 is a flowchart of an example of a method of reading from memory resources based on determining a snapshot index into arrays of pointers according to the described examples.

Referring to FIG. 9, one example of a method 900 for operating the GPU 12 to advance a read allocation pointer is illustrated. For example, method 900 can further define an example of obtaining and advancing a read allocation pointer to determine one or more memory locations from which to read data from the FIFO queue, as described in reference to action 602 in method 600 of FIG. 6 above. In method 900, multiple copies of a write done pointer can be stored in an array of write done pointers 218 to resolve race conditions in setting and/or checking the write done pointer. Similarly, in method 900, multiple copies of a read allocation pointer can be stored in an array of read allocation pointers 220 to resolve race conditions in advancing the read allocation pointer. In method 900, for example, a single snapshot pointer value can be used as an index into an array of write done pointers (e.g., writeDonePtr[ ]) and an array of read allocation pointers (e.g., readAllocPtr[ ]).

At 902, action 602 for obtaining and advancing the read allocation pointer, can include obtaining a snapshot index at a snapshot pointer. In an example, GPU 12 can be configured to, e.g., via a compute shader or other construct executing a read thread, FIFO queue pop/dequeue address-generation routine 322, etc., obtain the snapshot index at the snapshot pointer. For example, as described, GPU 12 can store the snapshot pointer 228 to include a value for the snapshot index in graphics memory 58, memory pool 82, FIFO memory buffer 83, etc. The snapshot pointer 228 index value can be used to reference which value in an array of read allocation pointers 220 and/or write done pointers 218 are current and to be used for reading data from the FIFO queue.

At 904, action 602 for obtaining and advancing the read allocation pointer, can include incrementing a read allocation pointer array at the snapshot index. In an example, GPU 12 can be configured to, e.g., via a compute shader or other construct executing a read thread, FIFO queue pop/dequeue address-generation routine 322, etc., increment the read allocation pointer array at the snapshot index. Thus, for example, GPU 12 can increment the current read allocation pointer. In one example, this can include an atomic increment of the read allocation pointer. For example, this increment can be an increment operation using atomic/ interlocked operation hardware 63 to interlocked increment the read allocation pointer. In this regard, in one example, the interlocked increment performed by multiple read threads may be coalesced into a single add operation on the read allocation pointer. This can improve efficiency of the action 602.

At 906, action 602 for obtaining and advancing the read allocation pointer, can include obtaining a write done pointer value from a write done pointer array at the snapshot index. In an example, GPU 12 can be configured to, e.g., via a compute shader or other construct executing a read thread, FIFO queue pop/dequeue address-generation routine 322, etc., obtain the write done pointer value from the write done pointer array at the snapshot index. In this example, GPU 12 can obtain writeDonePtr[snapshot].

At 908, action 602 for obtaining and advancing the read allocation pointer, can include determining whether the new read allocation pointer is greater than the write done pointer array at the snapshot index. In an example, GPU 12 can be configured to, e.g., via a compute shader or other construct executing a read thread, FIFO queue pop/dequeue address-generation routine 322, etc., determine whether the new read allocation pointer (as incremented at action 904) is greater than the write done pointer at the snapshot index (e.g., writeDonePtr[snapshot]). If not, action 602 can successfully return at 910.

If the new read allocation pointer is greater than the write done pointer array at the snapshot pointer, at 912, a primary write done pointer can be obtained and the snapshot pointer may be re-obtained. In an example, GPU 12 can be configured to, e.g., via a compute shader or other construct executing a read thread, FIFO queue pop/dequeue address-generation routine 322, etc., obtain the primary write done pointer and re-obtain the snapshot pointer. For example, the primary write done pointer can be set by the write thread when writing data and advancing the write done pointer (e.g., at action 508 of FIG. 5).

In this example, at 914, action 602 for obtaining and advancing the read allocation pointer, can include determining whether the re-obtained snapshot pointer moved. In an example, GPU 12 can be configured to, e.g., via a compute shader or other construct executing a read thread, FIFO queue pop/dequeue address-generation routine 322, etc., determine whether the re-obtained snapshot pointer moved (e.g., from the snapshot pointer obtained at 902). If so, action 602 can continue to 904 to again increment the read allocation pointer array at the new snapshot pointer index value. If not, at 918, it can be determined whether the primary write done pointer matches the write done pointer array at the snapshot index. In an example, GPU 12 can be configured to, e.g., via a compute shader or other construct executing a read thread, FIFO queue pop/dequeue address-generation routine 322, etc., determine whether the primary write done pointer matches the write done pointer array at the snapshot index value (e.g., writeDonePtr[snapshot]). If so, action 602 can return a failure or error code at 920.

If the primary write done pointer does not match the write done pointer array at the snapshot index value, at 922 a mutex can be acquired (or an attempt to acquire the mutex can be made). In an example, GPU 12 can be configured to, e.g., via a compute shader or other construct executing a read thread, FIFO queue pop/dequeue address-generation routine 322, etc., can attempt to acquire the mutex. For example, the mutex can prevent other threads from executing and/or accessing certain resources of the GPU 12, such as certain portions of graphics memory 58, memory pool 82, FIFO memory buffer 83, etc. In addition, multiple requests by multiple threads to acquire the mutex may be consolidated into a single request for the mutex, such that one read thread in the group of multiple read threads can attempt to acquire the FIFO's mutex.

If the mutex is not acquired, action 602 can spin to wait for an event indicating that the snapshot pointer may have changed (e.g., based on a write thread updating the snapshot pointer when the write done pointer is moved), and the action 602 can then proceed to 904 to increment the read allocation pointer array at the new snapshot index. In one example, spinning can include waiting for a determined amount of time and/or periodically checking the snapshot pointer to see if it has changed. In another example, spinning can include waiting for a notification and/or an in-progress update that the snapshot pointer, or associated the write done pointers, batch write done pointers, write index, read index, etc., have been, or are to be, updated.

If the mutex is acquired at action 922, at 924, action 602 for obtaining and advancing the read allocation pointer, can include determining whether the snapshot pointer moved. In an example, GPU 12 can be configured to, e.g., via a compute shader or other construct executing a read thread, FIFO queue pop/dequeue address-generation routine 322, etc., can determine whether the snapshot pointer moved. If so, action 602 can release the mutex at 926 and proceed to action 904 to increment the read allocation pointer array at the updated snapshot index.

If the snapshot pointer did not move at 924, action 602 for obtaining and advancing the read allocation pointer, can include setting the read allocation pointer at the snapshot index plus 1 to the value of the write done pointer array at the snapshot index. In an example, GPU 12 can be configured to, e.g., via a compute shader or other construct executing a read thread, FIFO queue pop/dequeue address-generation routine 322, etc., set the read allocation pointer array of the snapshot index plus 1 to the write done pointer array at the snapshot index (e.g., readAllocPtr[snapshot+1] =writeDonePtr[snapshot]). In addition accessing readAllocPtr[snapshot+1] can involve checking if snapshot is set to the last element of readAllocPtr, in which case readAllocPtr [0] is written instead, e.g., wrapping can be performed. In addition, at 930, action 602 for obtaining and advancing the read allocation pointer, can include setting the write done pointer at the snapshot index to the primary write done pointer. In an example, GPU 12 can be configured to, e.g., via a compute shader or other construct executing a read thread, FIFO queue pop/dequeue address-generation routine 322, etc., set the write done pointer array at the snapshot index (e.g., writeDonePtr[snapshot]) to the primary write done pointer.

Moreover, in this example at action 931, action 602 for obtaining and advancing the read allocation pointer, can include ensuring previous memory requests have completed. In an example, GPU 12 can be configured to, e.g., via a compute shader or other construct executing a read thread, FIFO queue pop/dequeue address-generation routine 322, etc., ensure previous memory read and write requests issued, e.g., by the thread executing 928 and 930, have been completed, and/or are visible to other shader processor cores 68. In this example, at action 932, action 602 for obtaining and advancing the read allocation pointer, can include incrementing the snapshot pointer. In an example, GPU 12 can be configured to, e.g., via a compute shader or other construct executing a read thread, FIFO queue pop/dequeue address-generation routine 322, etc., increment the snapshot pointer. In this regard, the next read can occur at the location indicated in the read allocation pointer array at the next snapshot index. In this example, action 602 can release the mutex at 926 and proceed to action 904 to increment the read allocation pointer array at the snapshot index.

In addition, in the example of method 900, after action 602 returns, if the return is successful, data may be read at action 604. Also, in this example, action 606 in method 600 may include additional consideration to prevent underflowing of the read allocation pointer, such as a reread of the snapshot pointer 228, a reread of the read allocation pointer array at the snapshot value (e.g., readAllocPtr[snapshot]), a reread of the write done pointer array at the snapshot value (e.g., writeDonePtr[snapshot]), and/or ensuring the read allocation pointer does not pass the write done pointer (e.g., that readAllocPtr[snapshot]<writeDonePtr[snapshot]). Based on the pointer values, it can be determined whether to update the read done pointer 222. If action 602 returns a failure or error, data may not be read at action 604 and/or method 600 can terminate for the read thread.

Figure 10:
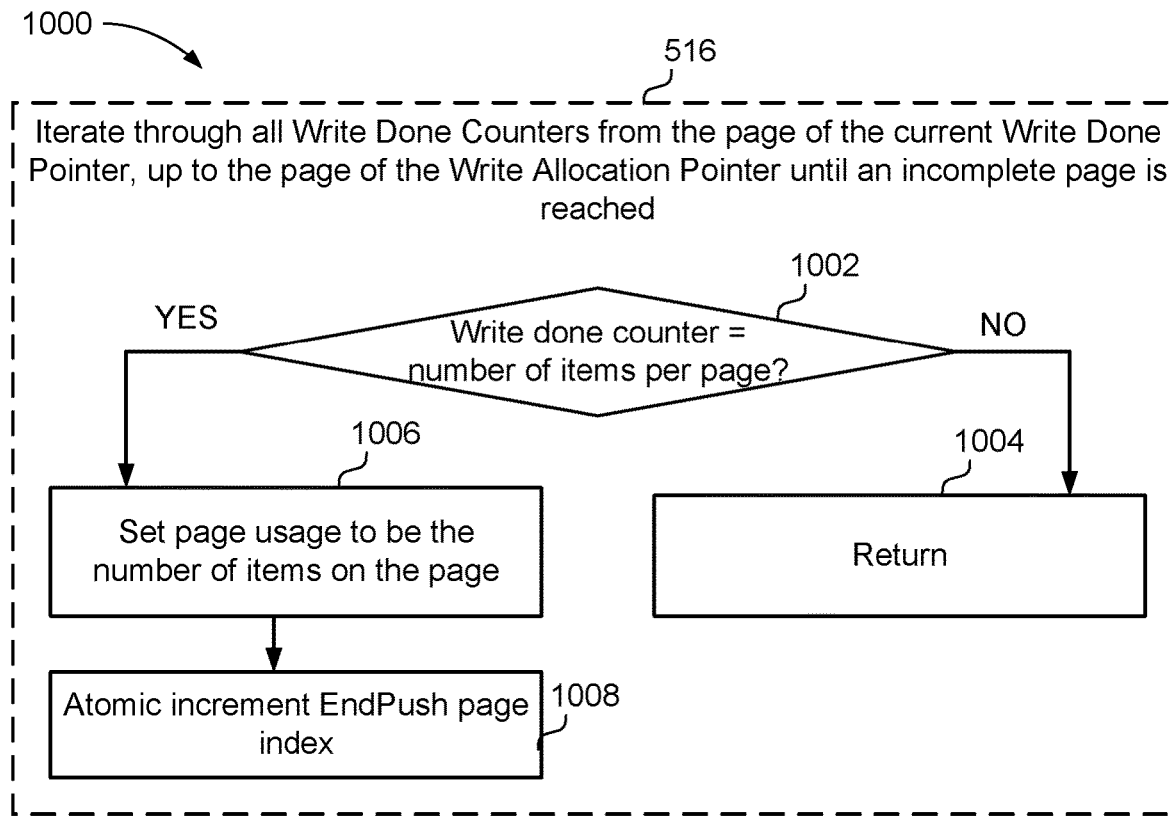
FIG. 10 is a flowchart of an example of a method of writing data to memory resources and updating page pointers according to the described examples.
Figure 11:
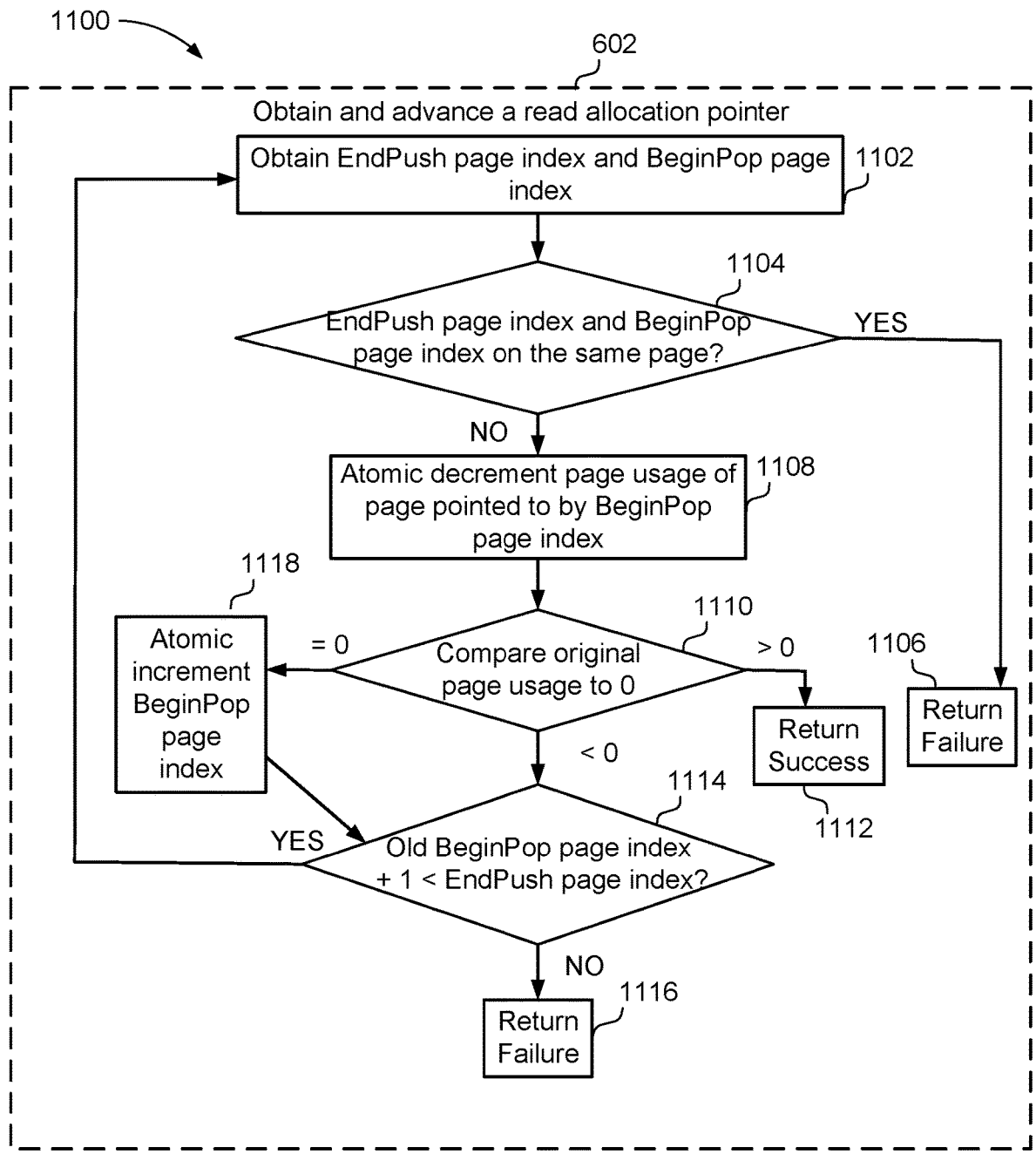
FIG. 11 is a flowchart of an example of a method of reading from memory resources based on page pointers according to the described examples.

Referring to FIGS. 10 and 11, one example of a method 1000 for operating a GPU 12 to advance a write done pointer and one example of a method 1100 for operating the GPU 12 to advance a read allocation pointer are illustrated. For example, method 1000 can further define an example of advancing the write done pointer to a next memory location related to the one or more memory locations of a FIFO queue where the data is written, as described in reference to action 508 in method 500 of FIG. 5 above. For example, method 1100 can further define an example of obtaining and advancing a read allocation pointer to determine one or more memory locations from which to read data from the FIFO queue, as described in reference to action 602 in method 600 of FIG. 6 above. In methods 1000 and 1100, reading data from a same page, or other unit of memory, to which the write done pointer points can be prohibited. This can ensure that a page is fully filled with data before the page is read. In one example, page indices (e.g. EndPush page index 240 and BeginPop Page Index 242) can be used, to track whether the page is currently being used (e.g., by one or more read threads or one or more write threads). Additionally, Page Use Counters 234 can be used (one counter per page) to indicate how many locations on a page are available for writing.

At 1002, action 516 for iterating through completed pages can include determining whether the write done counter for a page is equal to a number of items per page. In an example, GPU 12 can be configured to, e.g., via a compute shader or other construct executing a write thread, FIFO queue write-done update routine 318, etc., determine whether the write done counter is equal to the number of items per page (or another unit of memory), which can indicate that the write done pointer has reached the end of the page, and therefore all data on that page and previous pages are available to be read. If the write done counter is not determined to be equal to the number of items on the page, action 1000 (which is a part of action 516) can return at 1004.

If the page's write done counter is determined to be equal to the number of items on the page, at 1006, action 516 for iterating through consecutive newly-completed pages can include setting the page's page usage counter to be the number of items on the page. In an example, GPU 12 can be configured to, e.g., via a compute shader or other construct executing a write thread, FIFO queue write-done update routine 318, production complete routine 302, etc., set the page's page usage counter 234 to be equal to the number of items on the page. In another example, page usage can be set to the number of items on a page where a write operation for all threads has completed. In one example, as described, the production complete routine 302 can set the page usage counter 234 using a value from a corresponding write done counter 224, after production has completed for a set of threads (e.g., after the set of threads have all completed the data-production shader program 310).

In addition, in this example, at 1008, action 516 for iterating through completed pages can include performing an atomic increment of an EndPush page index, for every newly completed page. In an example, GPU 12 can be configured to, e.g., via a compute shader or other construct executing a write thread, FIFO queue write-done update routine 318, etc., to perform the atomic increment of the EndPush page index 240 (e.g., using atomic/interlocked operation hardware 63). In addition, multiple atomic increments performed by multiple write threads may be coalesced into a single add operation, as described above.

Or in an example, instead of (or in addition to) performing action 1008, the EndPush page index 240 can be derived by calculations performed on the write done pointer. In an example, GPU 12 can be configured to, e.g., via a compute shader or other construct executing a write thread such as is executing FIFO queue write-done update routine 318, and/or a read thread such as might be executing FIFO queue read allocation routine 320 or 322, etc., perform calculations to calculate the last page indicated to be fully complete, by the value of write done pointer 218.

Referring to FIG. 11, at 1102, action 602 for obtaining and advancing the read allocation pointer, can include obtaining an EndPush page index and a BeginPop page index. In an example, GPU 12 can be configured to, e.g., via a compute shader or other construct executing a read thread, FIFO queue pop/dequeue address-generation routine 322, etc., obtain the EndPush page index 240 and the BeginPop page index 242. As described, the EndPush page index 240 relates to an oldest page associated with the FIFO queue which has not been fully written, and the BeginPop page index 242 can indicate a page on which the next memory location is to be read. For example, as described with respect to FIG. 10, the EndPush page index 240 can be updated when the write done pointer reaches the end of a page (or other unit of memory) and/or crosses the page boundary. In another example, as explained above, the EndPush page index 240 can be calculated (e.g., by action 602) from write done pointer 218.

At 1104, action 602 for obtaining and advancing the read allocation pointer, can include determining whether the EndPush page index and the BeginPop page index refer to the same page. In an example, GPU 12 can be configured to, e.g., via a compute shader or other construct executing a read thread, FIFO queue pop/dequeue address-generation routine 322, etc., determine whether the EndPush page index 240 and the BeginPop page index 242 point to the same page of memory. For example GPU 12 can determine whether the EndPush page index 240 is equal to the BeginPop page index 242. If so, this can indicate that the thread is trying to read data on the same page that data is currently being written, which may be prohibited in this example. Thus, if the EndPush page index 240 and BeginPop page index 242 are determined to be on the same page, action 602 can return a failure or error at 1106.

Where the EndPush page index 240 and BeginPop page index 242 are determined not to be on the same page, this may indicate that the page is no longer being used by write threads for writing data. Thus, at 1108, action 602 for obtaining and advancing the read allocation pointer, can include atomically decrementing page usage of a page pointed to by the BeginPop page index. In an example, GPU 12 can be configured to, e.g., via a compute shader or other construct executing a read thread, FIFO queue pop/dequeue address-generation routine 322, etc., atomically decrement page usage counter 234 of the page pointed to by the BeginPop page index 242. For example, the GPU 12 can perform the atomic decrement using atomic/interlocked operation hardware 63. In addition, multiple atomic decrements performed by multiple read threads may be coalesced into a single subtract operation, as described above. In this regard, decrementing the page usage counter 234 can allow for determining a number of items on the page that have been written and not read. As described, the page usage is set to the number of items on a page when the write operation for the page (or all write threads) complete. As the read threads read the data, this number is decremented, as described. When page usage reaches zero, this can indicate that all written data on the page has been read.

Thus, at 1110, action 602 for obtaining and advancing the read allocation pointer, can include comparing the original page usage (e.g., the value before the atomic decrement) to zero. In an example, GPU 12 can be configured to, e.g., via a compute shader or other construct executing a read thread, FIFO queue pop/dequeue address-generation routine 322, etc., compare the original page usage to zero. Where the original page usage is greater than zero, this can indicate that there are still items on the page to read, and action 602 can successfully return at 1112 (and, data can be read from the page e.g., by action 604).

Where the original page usage is less than zero, at 1114, action 602 for obtaining and advancing the read allocation pointer, can include determining whether the BeginPop page index plus 1 is less than the EndPush page index. In an example, GPU 12 can be configured to, e.g., via a compute shader or other construct executing a read thread, FIFO queue pop/dequeue address-generation routine 322, etc., determine whether the BeginPop page index 242 plus 1 is less than the EndPush page index 240 (or that the BeginPop page index 242 otherwise points to a page that has already been written). If not, action 602 can return a failure or error at 1116. Where the BeginPop page index 242 is not less than the EndPush page index 240, this may indicate that the BeginPop page index 242 is stale, and thus action 602 can proceed to action 1102 to again obtain the EndPush page index and the BeginPop page index.

Where the original page usage counter 234 is determined to be equal to zero, this may also indicate that reading has completed on the current page, and thus, at 1118, action 602 for obtaining and advancing the read allocation pointer, can include atomically incrementing the BeginPop page index 242. In an example, GPU 12 can be configured to, e.g., via a compute shader or other construct executing a read thread, FIFO queue pop/dequeue address-generation routine 322, etc., atomically increment the BeginPop page index 242. For example, this may include using atomic/interlocked operation hardware 63 to increment the read page pointer. In addition, multiple atomic increments performed by multiple read threads may be coalesced into a single add operation, as described above. After incrementing, action 602 can proceed to action 1114 to determine whether the incremented BeginPop page index is less than the EndPush page index. If not, this can indicate that the new read page is on the same page that is currently being used for writing data, and action 602 can return failure at 1116 in this case.

Figure 12:
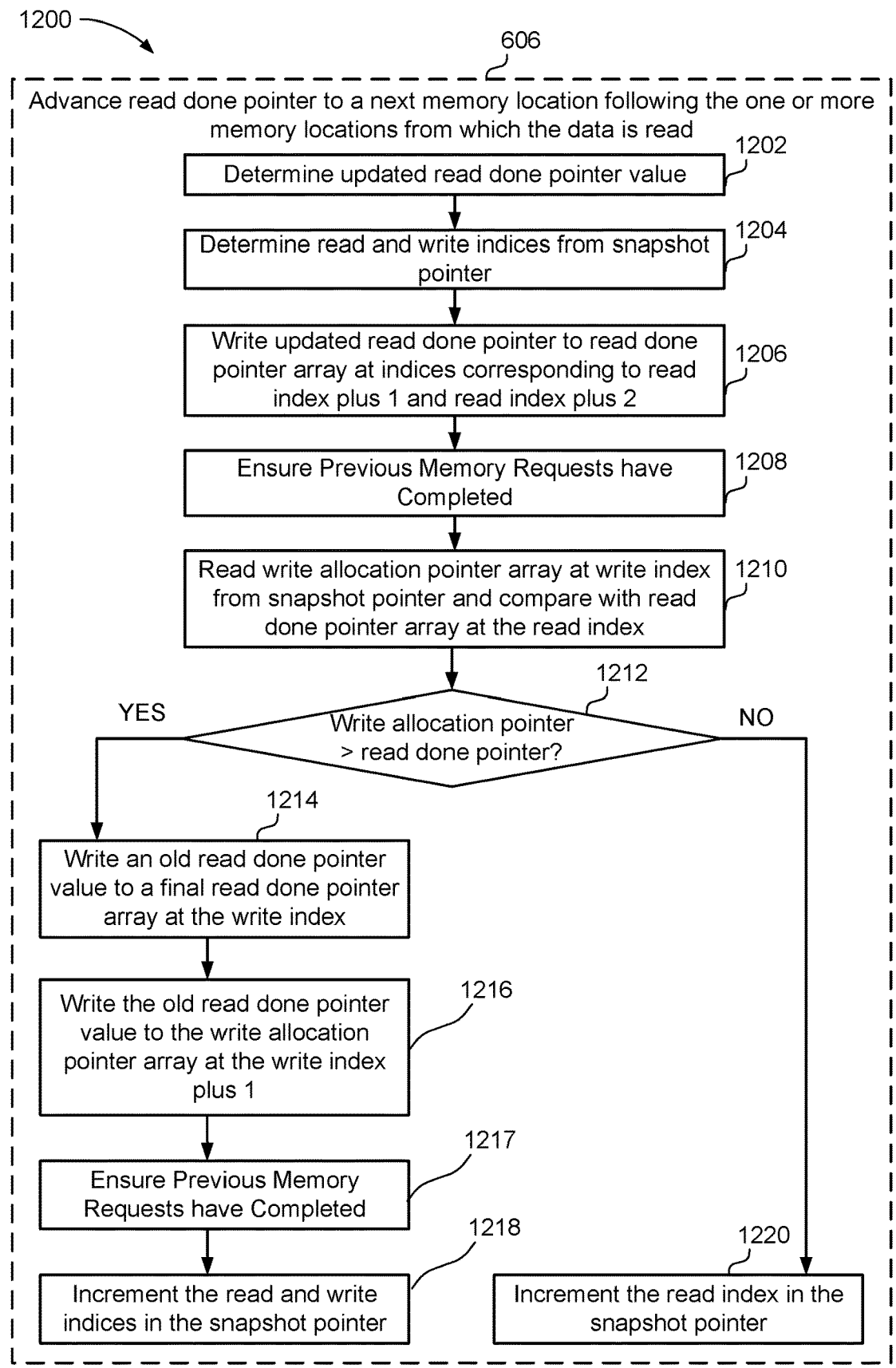
FIG. 12 is a flowchart of an example of a method of reading data from memory resources and updating corresponding pointers to facilitate writing the data according to the described examples.
Figure 13:
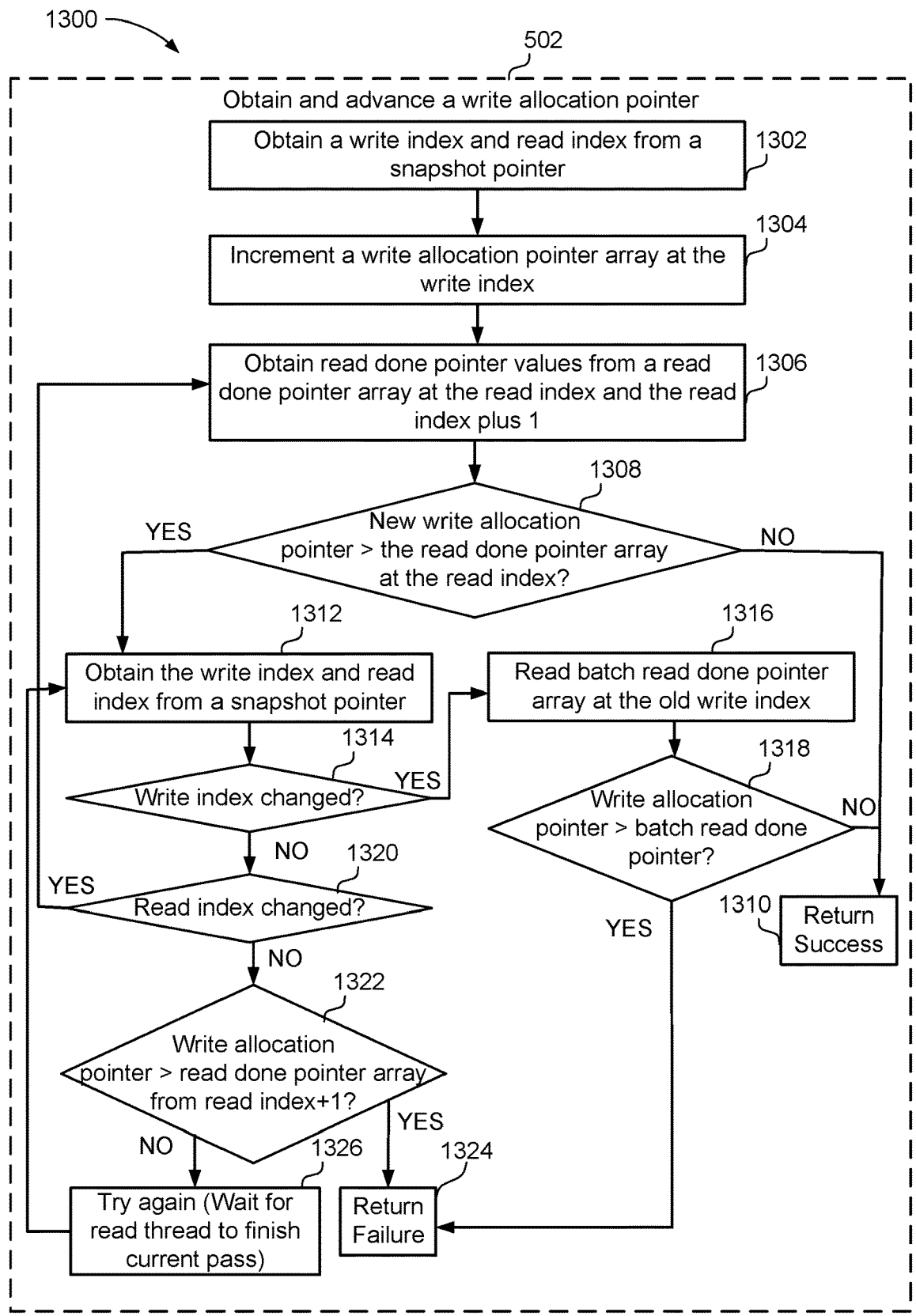
FIG. 13 is a flowchart of an example of a method of writing data to memory resources based on determining a read index and write index into arrays of pointers according to the described examples.

Referring to FIGS. 12 and 13, one example of a method 1200 for operating a GPU 12 to advance a read done pointer and one example of a method 1300 for operating the GPU 12 to advance a write allocation pointer are illustrated. For example, method 1200 can further define an example of advancing the read done pointer to a next memory location related to the one or more memory locations of a FIFO queue from which the data is read, as described in reference to action 606 in method 600 of FIG. 6 above. For example, method 1300 can further define an example of obtaining and advancing a write allocation pointer to determine one or more memory locations to which to write data to the FIFO queue, as described in reference to action 502 in method 500 of FIG. 5 above. In methods 1200 and 1300, multiple copies of a read done pointer can be stored in an array of read done pointers 222 to resolve race conditions in setting and/or checking the read done pointer. Similarly, in methods 1200 and 1300, multiple copies of a write allocation pointer can be stored in an array of write allocation pointers 216 to resolve race conditions between advancing and/or comparing the write allocation pointers 216 and read done pointers 222.

In general, in an example, methods 1200 and 1300 can describe updating a read done pointer by setting a next value in the read done pointer array, and updating a read index to reflect the index of the next value. If the write allocation pointer 216 is determined to advance too far (e.g., beyond the current read done pointer), a previous value of the read done pointer as set in the read done pointer array can be used as a reference for a write allocation pointer in the write allocation pointer array 216 (e.g., to roll back from an over-allocated position represented in a previous write allocation pointer, into the first location where data can be written, in a new write allocation pointer in array 216). The value of the read done pointer can also be used to set a batch read done pointer (e.g., in batch read done pointer array 233) to specify a range of data that is valid for an associated write allocation pointer in array 216.

At 1202, action 606 can include determining an updated read done pointer value. In an example, GPU 12 can be configured to, e.g., via a compute shader or other construct executing a read thread, FIFO queue read-done update routine 327, etc., determine the updated read done pointer value. For example, the updated read done pointer value can refer to the memory location to which the read done pointer is advanced in action 606.

At 1204, action 606 can include determining read and write indices from a snapshot pointer. In an example, GPU 12 can be configured to, e.g., via a compute shader or other construct executing a read thread, FIFO queue read-done update routine 327, etc., determine the read and write indices from the snapshot pointer 228. As described, the GPU 12 can store the snapshot pointer 228 to indicate one or more indices in one or more arrays to indicate current values of the one or more arrays. For example, the snapshot pointer 228 may include a single value from which can be calculated an index into an array of write allocation pointers 216, an index into an array of batch read done pointers 233, and an index into an array of read done pointers 222; or may include a read index into both the array of write allocation pointers 216 and batch read done pointers 233, and also a separate read index into the array of read done pointers 220, etc.

At 1206, action 606 can include writing the updated read done pointer to a read done pointer array at indices corresponding to the read index plus 1 and the read index plus 2. In an example, GPU 12 can be configured to, e.g., via a compute shader or other construct executing a read thread, FIFO queue read-done update routine 327, etc., write the updated read done pointer to the read done pointer array (e.g., an array of read done pointers 220, also referred to herein as "readDonePtr[ ]") at indices corresponding to the read index (also referred to herein as "rIndex") plus 1 (e.g., readDonePtr[rIndex+1]) and the read index plus 2 (e.g., readDonePtr[rIndex+2]). Writing the updated read done pointer value to both the rIndex+1 and rIndex+2 can help with race/error conditions, described in further detail below. Additionally, the example may include performing a wrapping operation, such that if rIndex+1 or rIndex+2 specifies an index that points to a location beyond the read done pointer array, then the summed value can be replaced with a value of 0 or 1, as would be appropriate if the read done pointer array was a ring buffer.

At 1208, action 606 can include ensuring previous memory requests have completed. In an example, GPU 12 can be configured to, e.g., via a compute shader or other construct executing a read thread, FIFO queue read-done update routine 327, etc., ensure previous memory requests (e.g., for graphics memory 58, memory pool 82, FIFO memory buffer 83, etc.) have completed. In an example, the same thread which performs 1206 can wait for the read to the read done pointer array 222 to be completed by the GPU, such that the changes to read done pointer array 222 are visible to all other shader processor cores 68, before continuing on to action 1210.

At 1210, action 606 can include reading the write allocation pointer array at a write index from the snapshot pointer and comparing this value with the read done pointer array at the read index. In an example, GPU 12 can be configured to, e.g., via a compute shader or other construct executing a read thread, FIFO queue read-done update routine 327, etc., read the write allocation pointer array (e.g., array of write allocation pointers 216, also referred to herein as "writeAllocPtr[ ]") at the write index (also referred to herein as "wIndex") from the snapshot pointer 228, and can compare this value with the read done pointer array at the read index.

At 1212, action 606 can include determining whether the write allocation pointer (at the write index) is greater than the read done pointer (at the read index). In an example, GPU 12 can be configured to, e.g., via a compute shader or other construct executing a read thread, FIFO queue read-done update routine 327, etc., determine whether the write allocation pointer is greater than the read done pointer (e.g., whether writeAllocPtr[wIndex]>readDonePtr[rIndex]). For example, where the write allocation pointer is greater than the read done pointer, this may indicate that the write allocation pointer is set to write data to locations where unconsumed data is still present. The comparison operation may also take wrapping into account such that if the specified write allocation pointer has wrapped more or less times than the specified read done pointer, then the number of times wrapping can be used in comparison instead of the value of the specified pointers, assuming that the write allocation pointer starts at an offset of 0, and the read done pointer starts at an offset equal or near to the maximum size of the FIFO. If instead, the read done pointer starts at zero then for the purposes of comparing wrap counts, the read done pointer's wrap count should be initialized with a value of 1+the value set into the write allocation pointer's wrap count.

In this example, where the write allocation pointer (at the write index) is determined to be greater than the read done pointer (at the read index), action 1214 can include writing an old read done pointer value to a batch read done pointer array at the write index. In this example, GPU 12 can be configured to, e.g., via a compute shader or other construct executing a read thread, FIFO queue read-done update routine 327, etc., write the old read done pointer value to the batch read done pointer array (also referred to herein as "batchReadDonePtr[ ]"), which may include a plurality of batch read done pointers 233, at the write index. This value can be used in subsequently determining whether to write data, as described further with reference to FIG. 13.

In addition, in this example, action 1216 can include writing the old read done pointer value to the write allocation pointer array at the write index plus 1 (e.g., or, if the write index plus 1 is equal to the number of valid locations in the write allocation pointer array, then writing the value to the first element of write allocation pointer array, e.g., writeAllocPtr[0]).

In addition, in this example, action 1217 can include ensuring previous memory requests have completed, similarly as action 1208. And action 1218 can include incrementing the write index in the snapshot pointer. In this example, GPU 12 can be configured to, e.g., via a compute shader or other construct executing a read thread, FIFO queue read-done update routine 327, etc., increment the write index (e.g., wIndex) in the snapshot pointer 228 to facilitate writing data to a memory location indicated in the write allocation pointer at the write index (e.g., that corresponds to the old read done pointer value, as described above).

In addition, in this example and where the write allocation pointer is not greater than the read done pointer at action 1212, actions 1218 and/or 1220 can include incrementing the read index in the snapshot pointer. In this example, GPU 12 can be configured to, e.g., via a compute shader or other construct executing a read thread, FIFO queue read-done update routine 327, etc., increment the read index (e.g., rIndex) in the snapshot pointer 228 to facilitate updating the read done pointer in the array at the next rIndex value by the next read thread (e.g., at action 1206 when executed by the next thread). For example, in 1218, the read and write indices can be incremented simultaneously.

Referring to FIG. 13, at 1302, action 502 for obtaining and advancing the write allocation pointer (e.g., one of multiple write allocation pointers associated with a FIFO queue), can include obtaining a write index and a read index from a snapshot pointer. In an example, GPU 12 can be configured to, e.g., via a compute shader or other construct executing a write thread, FIFO queue push/enqueue routine 314, etc., obtain the write index and the read index from the snapshot pointer 228. For example, the write index and the read index values can be modified in advancing the read done pointer at action 606, as described in reference to FIG. 12 above. Modifying the indices can include updating values and storing them in the snapshot pointer 228 stored in memory, as described.

At 1304, action 502 for obtaining and advancing the write allocation pointer, can include incrementing a write allocation pointer in the write allocation pointer array at the write index. In an example, GPU 12 can be configured to, e.g., via a compute shader or other construct executing a write thread, FIFO queue push/enqueue routine 314, etc., increment the write allocation pointer array at the write index. For example, GPU 12 can increment the write allocation pointer in the array at the write index (e.g., writeAllocPtr[wIndex]), which can be the current write allocation pointer, to a next memory location or other value. In one example, this can include an atomic increment of the write allocation pointer. For example, this increment can be an increment operation using atomic/interlocked operation hardware 63 to interlocked increment the write allocation pointer. In this regard, in one example, the interlocked increment performed by multiple write threads may be coalesced into a single add operation on the write allocation pointer. This can improve efficiency of the action 502, and can also result in data from contiguous memory locations be written by the threads.

At 1306, action 502 for obtaining and advancing the write allocation pointer, can include obtaining read done pointer values from a read done pointer array at the read index and the read index plus 1 (including, in an example, wrapping the sum of the read index as necessary, as described above in reference to action 1206). In an example, GPU 12 can be configured to, e.g., via a compute shader or other construct executing a write thread, FIFO queue push/enqueue routine 314, etc., obtain read done pointer values from the read done pointer array at the read index and the read index plus 1 (e.g., obtain readDonePtr[rIndex] and readDonePtr[rIndex+1]). As described, obtaining both values (and/or additional values) can help prevent race conditions, as described below.

At 1308, action 502 for obtaining and advancing the write allocation pointer, can include determining whether the new write allocation pointer (e.g., as incremented at action 1304) is greater than the read done pointer array at the read index. In an example, GPU 12 can be configured to, e.g., via a compute shader or other construct executing a write thread, FIFO queue push/enqueue routine 314, etc., determine whether the new write allocation pointer (e.g., writeAllocPtr[wIndex] as incremented at action 1304) is greater than the read done pointer array at the read index (e.g., whether writeAllocPtr[wIndex]>readDonePtr[rIndex]). If not, this can indicate that advancing the write allocation pointer at action 1304 is correct, and the action of obtaining and advancing the write allocation pointer can successfully return at 1310. Or if so, additional logic may be specified to determine whether to successfully return or not. Additionally, the comparison of write allocation pointer with read done pointer may include also comparing the number of times each value has wrapped (such as might happen with a ring buffer). So, in this example, if the specified write allocation pointer has wrapped fewer times than the read done pointer, then it is treated as if the write allocation pointer is less than the read done pointer, regardless of the values of the pointers. (Though see note above about initialization and comparison of wrap counts).

For example, where the new write allocation pointer is greater than the read done pointer at the indices specified by the snapshot pointer at action 1308, action 1312 can include again obtaining the write index and read index from the snapshot pointer (e.g., to determine whether one or more of the indices has changed since they were read at action 802). In an example, GPU 12 can be configured to, e.g., via a compute shader or other construct executing a write thread, FIFO queue push/enqueue routine 314, etc., obtain the write index and the read index from the snapshot pointer 228, as described above, as one or more of the indices may have been updated by a write thread (e.g., as described in reference to FIG. 12).

In this example, at 1314, action 502 for obtaining and advancing the write allocation pointer, can include determining whether the write index has changed. In an example, GPU 12 can be configured to, e.g., via a compute shader or other construct executing a write thread, FIFO queue push/enqueue routine 314, etc., determine whether the write index of the snapshot pointer has changed (e.g., which can indicate that the thread at action 1212 had detected that one or more write allocation operations had progressed beyond available (empty) portions of the FIFO queue). If so, at 1316, the batch read done pointer array at the old write index can be read. In an example, GPU 12 can be configured to, e.g., via a compute shader or other construct executing a write thread, FIFO queue push/enqueue routine 314, etc., read the batch read done pointer at the old write index (e.g., the write index obtained from the snapshot pointer at action 1302).

In this example, at 1318, action 502 for obtaining and advancing the write allocation pointer, can include determining whether the write allocation pointer is greater than the batch read done pointer (e.g., indicating that the present thread write allocation operation 502 is one of the one or more threads detected as overflowing by operation 1212). In an example, GPU 12 can be configured to, e.g., via a compute shader or other construct executing a write thread, FIFO queue push/enqueue routine 314, etc., determine whether the write allocation pointer is greater than the batch read done pointer (as read from the batch read done pointer array at the old write index). If not (e.g., indicating that the write allocation operation 502 successfully allocated space for writing data before overflow occurred), action 502 can successfully return at action 1310. Or if the write allocation pointer is determined to be greater than the batch read done pointer, action 502 can proceed to actions 1324 and 503 to return a failure or error code, in which case no data should be written.

Where the write index has not changed at action 1314 (indicating that a thread updating the read done pointer has not yet detected an overflow by the write threads), at 1320, it can be determined whether the read index has changed (indicating that that a read thread has recently updated a read done pointer). In an example, GPU 12 can be configured to, e.g., via a compute shader or other construct executing a write thread, FIFO queue push/enqueue routine 314, etc., determine whether the read index of the snapshot pointer has changed. If so, action 502 can proceed to action 1306 to obtain the read done pointer values from the new read index.

Where the read index has not changed at action 1314, at 1322, it can be determined whether the write allocation pointer is greater than the read done pointer array at the read index plus 1. In an example, GPU 12 can be configured to, e.g., via a compute shader or other construct executing a write thread, FIFO queue push/enqueue routine 314, etc., determine whether the write allocation pointer is greater than the read done pointer array at the read index plus 1 (e.g., whether writeAllocPtr[wIndex]>batchReadDonePtr[rindex+1], where wrapping of rindex+1 may be performed, as previously explained). If so, action 502 can return a failure at 1324. If not (e.g., indicating a read thread is in the process of updating a read done pointer as part of action 606), at 1326, action 502 can try to write data and/or manage the corresponding pointers again, which may include waiting (e.g., for a determined amount of time) for the read thread to finish its current pass. For example, GPU 12, in this example, can continue to action 1312 to obtain the write index and read index from the snapshot pointer and/or determine whether the write allocation pointer is still greater than the read done pointer, etc. In another example, GPU 12 can return failure where the read index has not changed regardless of the new snapshot values.

In addition, in the example of method 1300, after action 502 returns, if the return is successful, data may be written at action 506. Also, in this example, action 508 in method 500 may include additional consideration to prevent overflowing of the write allocation pointer, such as a reread of the snapshot pointer 228, a reread of the write allocation pointer in the array at the write index of the snapshot pointer (e.g., read writeAllocPtr[wIndex]), a reread of the read done pointer array at the read index of the snapshot pointer (e.g., readDonePtr[rIndex]), and/or ensuring the write allocation pointer does not pass the read done pointer (e.g., that writeAllocPtr[wIndex]<readDonePtr[rIndex]). If action 502 returns a failure or error, data may not be read at action 506 and/or method 500 can terminate for the write thread.

Figure 14:
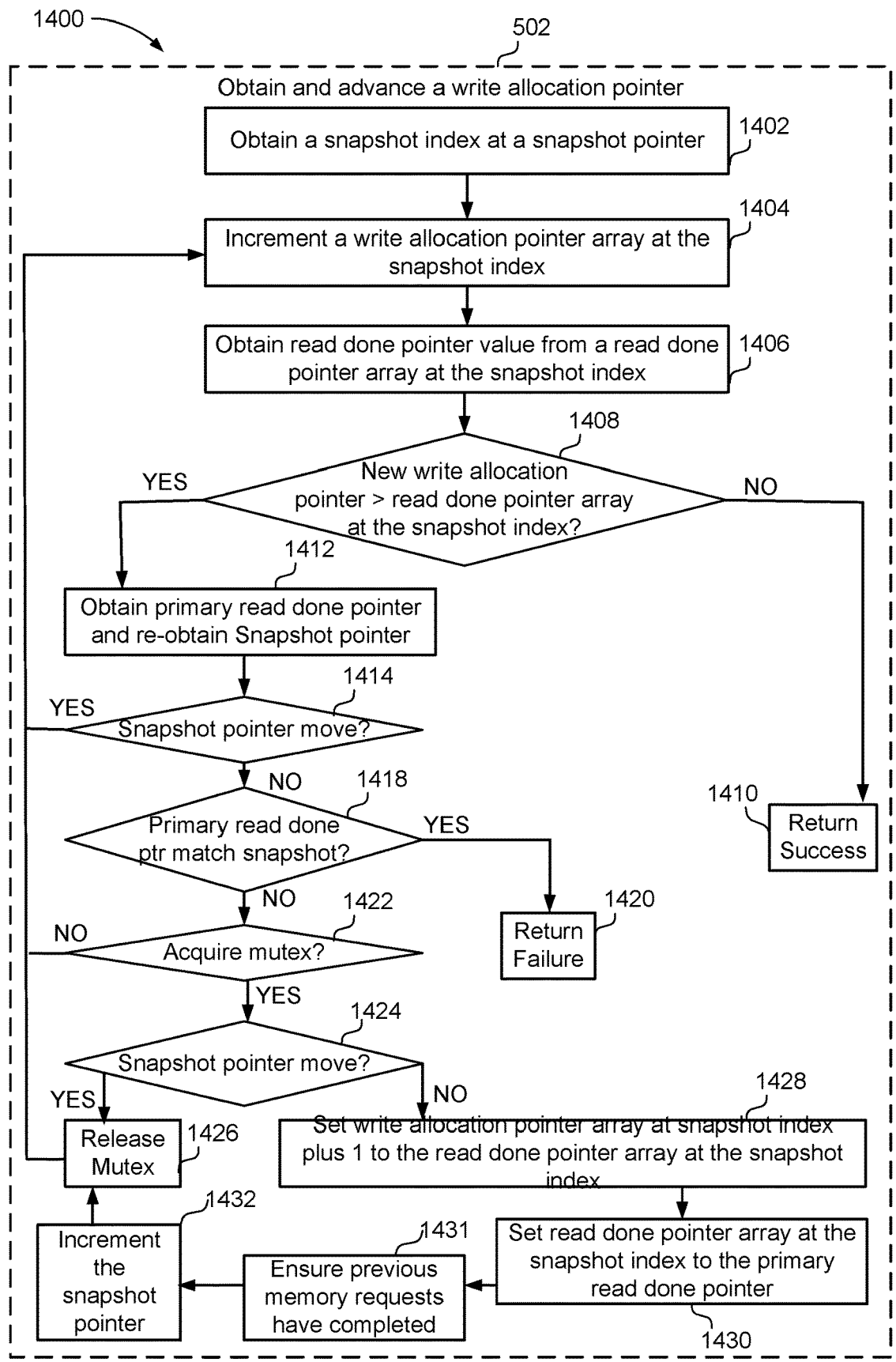
FIG. 14 is a flowchart of an example of a method of writing from memory resources based on determining a snapshot index into arrays of pointers according to the described examples.

Referring to FIG. 14, one example of a method 1400 for operating the GPU 12 to advance a write allocation pointer is illustrated. For example, method 1400 can further define an example of obtaining and advancing a write allocation pointer to determine one or more memory locations to which to write data to the FIFO queue, as described in reference to action 502 in method 500 of FIG. 5 above. In method 1400, multiple copies of a read done pointer can be stored in an array of read done pointers 222 to resolve race conditions in setting and/or checking the read done pointer. Similarly, in method 1400, multiple copies of a write allocation pointer can be stored in an array of write allocation pointers 216 to resolve race conditions in advancing the write allocation pointer. In method 1400, for example, a single snapshot pointer value can be used as an index into an array of read done pointers (e.g., readDonePtr[ ]) and an array of write allocation pointers (e.g., writeAllocPtr[ ]).

At 1402, action 1402 for obtaining and advancing the write allocation pointer, can include obtaining a snapshot index at a snapshot pointer. In an example, GPU 12 can be configured to, e.g., via a compute shader or other construct executing a write thread, FIFO queue push/enqueue routine 314, etc., obtain the snapshot index at the snapshot pointer. For example, as described, GPU 12 can store the snapshot pointer 228 to include a value for the snapshot index in graphics memory 58, memory pool 82, FIFO memory buffer 83, etc. The snapshot pointer 228 index value can be used to reference which value in an array of write allocation pointers 216 and/or read done pointers 222 are current and to be used for writing data to the FIFO queue.

At 1404, action 502 for obtaining and advancing the write allocation pointer, can include incrementing a write allocation pointer array at the snapshot index. In an example, GPU 12 can be configured to, e.g., via a compute shader or other construct executing a write thread, FIFO queue push/enqueue routine 314, etc., increment the write allocation pointer array at the snapshot index. Thus, for example, GPU 12 can increment the current write allocation pointer. In one example, this can include an atomic increment of the write allocation pointer. For example, this increment can be an increment operation using atomic/interlocked operation hardware 63 to interlocked increment the write allocation pointer. In this regard, in one example, the interlocked increment performed by multiple write threads may be coalesced into a single add operation on the write allocation pointer. This can improve efficiency of the action 502.

At 1406, action 502 for obtaining and advancing the write allocation pointer, can include obtaining a read done pointer value from a read done pointer array at the snapshot index. In an example, GPU 12 can be configured to, e.g., via a compute shader or other construct executing a write thread, FIFO queue push/enqueue routine 314, etc., obtain the read done pointer value from the read done pointer array at the snapshot index. In this example, GPU 12 can obtain readDonePtr[snapshot].

At 1408, action 502 for obtaining and advancing the write allocation pointer, can include determining whether the new write allocation pointer is greater than the read done pointer array at the snapshot index. In an example, GPU 12 can be configured to, e.g., via a compute shader or other construct executing a write thread, FIFO queue push/enqueue routine 314, etc., determine whether the new write allocation pointer (as incremented at action 1404) is greater than the read done pointer at the snapshot index (e.g., readDonePtr[snapshot]). If not, action 502 can successfully return at 1410.

If the new write allocation pointer is greater than the read done pointer array at the snapshot pointer, at 1412, a primary read done pointer can be obtained and the snapshot pointer may be re-obtained. In an example, GPU 12 can be configured to, e.g., via a compute shader or other construct executing a write thread, FIFO queue push/enqueue routine 314, etc., obtain the primary read done pointer and re-obtain the snapshot pointer. For example, the primary read done pointer can be set by the read thread when reading data and advancing the read done pointer (e.g., at action 606 of FIG. 6).

In this example, at 1414, action 502 for obtaining and advancing the write allocation pointer, can include determining whether the re-obtained snapshot pointer moved. In an example, GPU 12 can be configured to, e.g., via a compute shader or other construct executing a write thread, FIFO queue push/enqueue routine 314, etc., determine whether the re-obtained snapshot pointer moved (e.g., from the snapshot pointer obtained at 1402). If so, action 502 can continue to 1404 to again increment the write allocation pointer array at the new snapshot pointer index value. If not, at 1418, it can be determined whether the primary read done pointer matches the read done pointer array at the snapshot index. In an example, GPU 12 can be configured to, e.g., via a compute shader or other construct executing a write thread, FIFO queue push/enqueue routine 314, etc., determine whether the primary read done pointer matches the read done pointer array at the snapshot index value (e.g., readDonePtr[snapshot]). If so, action 502 can return a failure or error code at 1420.

If the primary read done pointer does not match the read done pointer array at the snapshot index value, at 1422 a mutex can be acquired (or an attempt to acquire the mutex can be made). In an example, GPU 12 can be configured to, e.g., via a compute shader or other construct executing a write thread, FIFO queue push/enqueue routine 314, etc., can attempt to acquire the mutex. For example, the mutex can prevent other threads from executing and/or accessing certain resources of the GPU 12, such as certain portions of graphics memory 58, memory pool 82, FIFO memory buffer 83, etc. In addition, multiple requests by multiple threads to acquire the mutex may be consolidated into a single request for the mutex, such that one write thread in the group of multiple write threads can attempt to acquire the FIFO's mutex.

If the mutex is not acquired, action 502 can spin to wait for an event indicating that the snapshot pointer may have changed (e.g., based on a read thread updating the snapshot pointer when the read done pointer is moved), and the action 502 can then proceed to 1404 to increment the write allocation pointer array at the new snapshot index. In one example, spinning can include waiting for a determined amount of time and/or periodically checking the snapshot pointer to see if it has changed. In another example, spinning can include waiting for a notification and/or an in-progress update that the snapshot pointer, or associated the read done pointers, batch read done pointers, write index, read index, etc., have been, or are to be, updated.

If the mutex is acquired at action 1422, at 1424, action 502 for obtaining and advancing the write allocation pointer, can include determining whether the snapshot pointer moved. In an example, GPU 12 can be configured to, e.g., via a compute shader or other construct executing a write thread, FIFO queue push/enqueue routine 314, etc., can determine whether the snapshot pointer moved. If so, action 502 can release the mutex at 1426 and proceed to action 1404 to increment the write allocation pointer array at the updated snapshot index.

If the snapshot pointer did not move at 1424, action 502 for obtaining and advancing the write allocation pointer, can include setting the write allocation pointer at the snapshot index plus 1 to the value of the read done pointer array at the snapshot index. In an example, GPU 12 can be configured to, e.g., via a compute shader or other construct executing a write thread, FIFO queue push/enqueue routine 314, etc., set the write allocation pointer array of the snapshot index plus 1 to the read done pointer array at the snapshot index (e.g., writeAllocPtr[snapshot+1]=readDonePtr[snapshot]). In addition accessing writeAllocPtr[snapshot+1] can involve checking if snapshot is set to the last element of writeAllocPtr, in which case writeAllocPtr[0] is written instead, e.g., wrapping can be performed. In addition, at 1430, action 502 for obtaining and advancing the write allocation pointer, can include setting the read done pointer at the snapshot index to the primary read done pointer. In an example, GPU 12 can be configured to, e.g., via a compute shader or other construct executing a write thread, FIFO queue push/enqueue routine 314, etc., set the read done pointer array at the snapshot index (e.g., readDonePtr[snapshot]) to the primary read done pointer.

Moreover, in this example at action 1431, action 502 for obtaining and advancing the write allocation pointer, can include ensuring previous memory requests have completed. In an example, GPU 12 can be configured to, e.g., via a compute shader or other construct executing a write thread, FIFO queue push/enqueue routine 314, etc., ensure previous memory read and write requests issued, e.g., by the thread executing 1428 and 1430, have been completed, and/or are visible to other shader processor cores 68. In this example, at action 1432, action 502 for obtaining and advancing the write allocation pointer, can include incrementing the snapshot pointer. In an example, GPU 12 can be configured to, e.g., via a compute shader or other construct executing a write thread, FIFO queue push/enqueue routine 314, etc., increment the snapshot pointer. In this regard, the next write can occur at the location indicated in the write allocation pointer array at the next snapshot index. In this example, action 502 can release the mutex at 1426 and proceed to action 1404 to increment the write allocation pointer array at the snapshot index.

In addition, in the example of method 1400, after action 502 returns, if the return is successful, data may be written at action 506. Also, in this example, action 508 in method 500 may include additional consideration to prevent overflowing of the write allocation pointer, such as a reread of the snapshot pointer 228, a reread of the write allocation pointer array at the snapshot value (e.g., writeAllocPtr[snapshot]), a reread of the read done pointer array at the snapshot value (e.g., readDonePtr[snapshot]), and/or ensuring the write allocation pointer does not pass the read done pointer (e.g., that writeAllocPtr[snapshot]<readDonePtr[snapshot]). Based on the pointer values, it can be determined whether to update the write done pointer 218. If action 502 returns a failure or error, data may not be read at action 506 and/or method 500 can terminate for the write thread.

Figure 15:
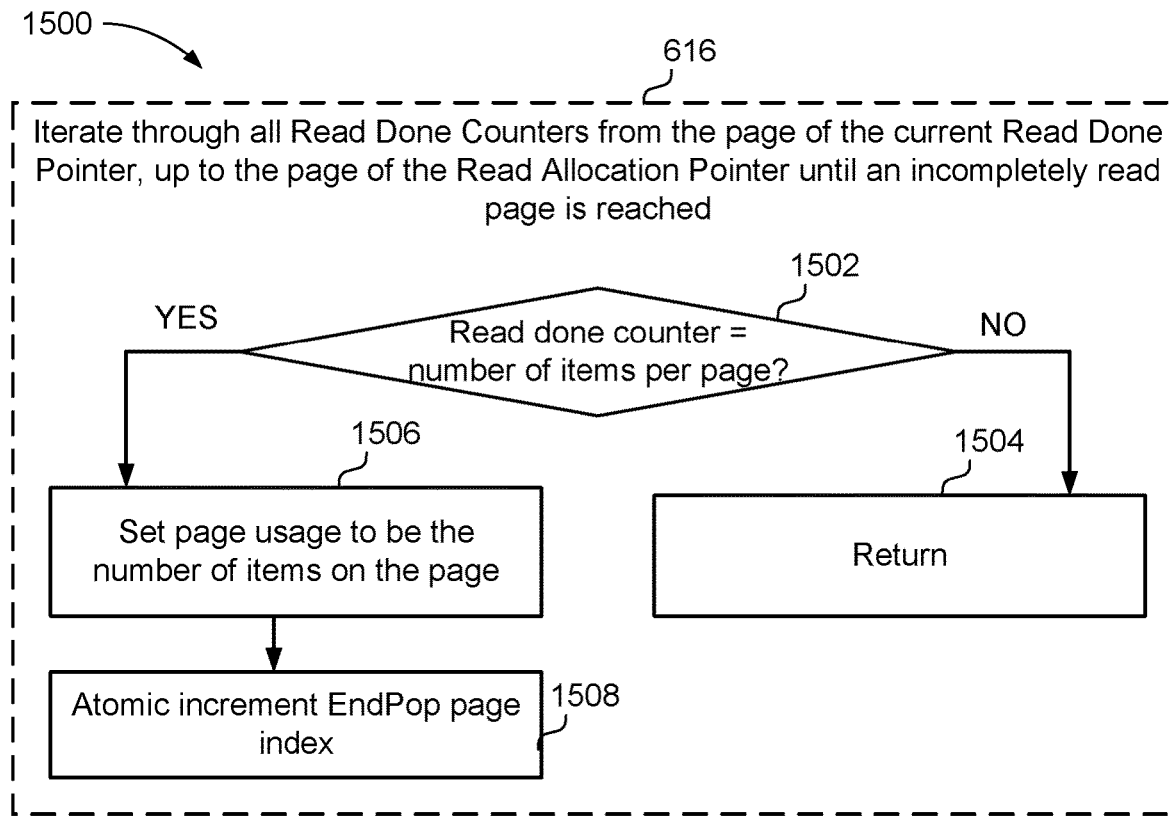
FIG. 15 is a flowchart of an example of a method of reading data from memory resources and updating page pointers according to the described examples.
Figure 16:
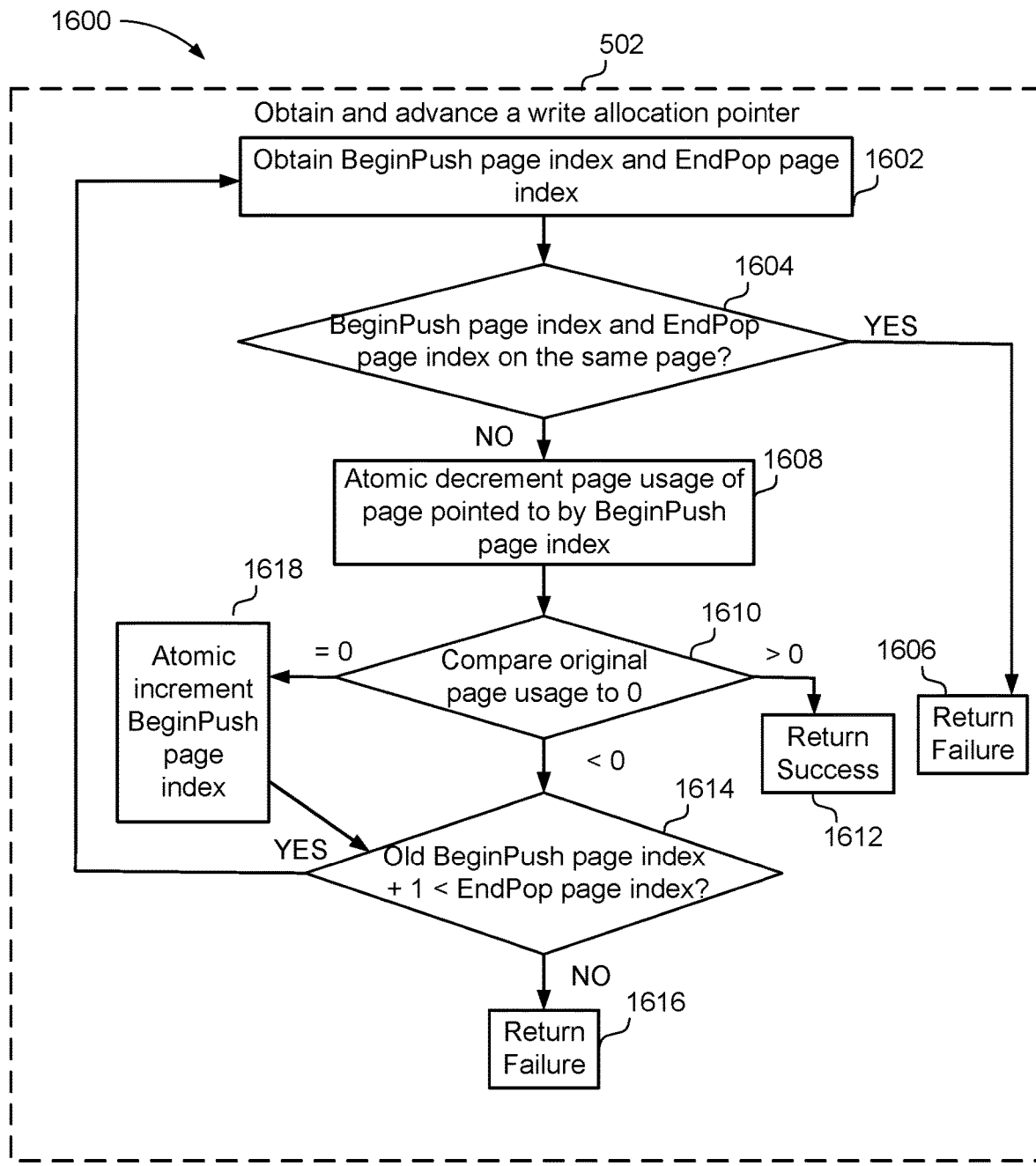
FIG. 16 is a flowchart of an example of a method of writing data to memory resources based on page pointers according to the described examples.

Referring to FIGS. 15 and 16, one example of a method 1500 for operating a GPU 12 to advance a read done pointer and one example of a method 1600 for operating the GPU 12 to advance a write allocation pointer are illustrated. For example, method 1500 can further define an example of advancing the read done pointer to a next memory location related to the one or more memory locations of a FIFO queue from which data is to be read, as described in reference to action 606 in method 600 of FIG. 6 above. For example, method 1600 can further define an example of obtaining and advancing a write allocation pointer to determine one or more memory locations to which to write data to the FIFO queue, as described in reference to action 502 in method 500 of FIG. 5 above. In methods 1500 and 1600, writing data to a same page, or other unit of memory, to which the read done pointer points can be prohibited. This can ensure that a page in a FIFO queue is fully emptied or consumed before it is again made available for writing. An EndPop Page Index (e.g. 236) can be used to point to the oldest page whose data has not been fully consumed, and a BeginPush page pointer (e.g., 238) can be used to point to the page currently being written to. Additionally, Page Use Counters 234 can be used per page to track how many units of space remain unused on the page.

At 1502, action 616 for iterating through completely read pages can include determining whether the read done counter for a page is equal to a number of items per page. In an example, GPU 12 can be configured to, e.g., via a compute shader or other construct executing a read thread, FIFO queue read-done update routine 327, etc., determine whether the read done counter of read done counters 226 is equal to the number of items per page (or another unit of memory), which can indicate that the read done pointer 222 has reached the end of the page, and therefore all locations on that page and previous pages are available to be written. If the read done counter is not determined to be equal to the number of items on the page, action 1500 (which is a part of action 616) can return at 1504.

If the read done counter is determined to be equal to the number of items on the page, at 1506, action 616 for iterating through consecutive newly-completely read pages can include setting a page usage counter for the page, to be the number of items on the page. In an example, GPU 12 can be configured to, e.g., via a compute shader or other construct executing a read thread, FIFO queue read-done update routine 327, production complete routine 302, etc., set a page usage counter of page use counters 234 to be equal to the number of items on the page.

In addition, in this example, at 1508, action 616 action 516 for iterating through completed pages can include performing an atomic increment of an EndPop page index, for every newly completely read page. In an example, GPU 12 can be configured to, e.g., via a compute shader or other construct executing a read thread, FIFO queue read-done update routine 327, etc., to perform the atomic increment of the EndPop page index 236 (e.g., using atomic/interlocked operation hardware 63). In addition, multiple atomic increments performed by multiple read threads may be coalesced into a single add operation, as described above.

Or in an example, instead of (or in addition to) performing action 1508, the EndPop page index 236 can be derived by calculations performed on the read done pointer. In an example, GPU 12 can be configured to, e.g., via a compute shader or other construct executing a read thread such as is executing FIFO queue read-done update routine 327, and/or a write thread such as might be executing FIFO queue write allocation routine 310 or 312, etc., perform calculations to calculate the last page indicated to be fully completely read, by the value of read done pointer 222.

Referring to FIG. 16, at 1602, action 502 for obtaining and advancing the write allocation pointer, can include obtaining a BeginPush page index and an EndPop page index. In an example, GPU 12 can be configured to, e.g., via a compute shader or other construct executing a write thread, FIFO queue push/enqueue routine 314, etc., obtain the BeginPush page index 238 and the EndPop page index 236. As described, the BeginPush page index 238 can indicate a page on which new write allocations should occur, and the EndPop page index 236 can indicate the oldest page from which all data has not been completely read or consumed. For example, as described with respect to FIG. 15, the EndPop page index 236 can be updated when the read done pointer reaches the end of a page (or other unit of memory) and/or cross the page boundary. In another example, as explained above, the EndPop page index 236 can be calculated (e.g., by action 502) from read done pointer 222.

At 1604, action 502 for obtaining and advancing the write allocation pointer, can include determining whether the BeginPush page index and the EndPop page index refer to the same page. In an example, GPU 12 can be configured to, e.g., via a compute shader or other construct executing a write thread, FIFO queue push/enqueue routine 314, etc., determine whether the BeginPush page index 238 and the EndPop page index 236 point to the same page of memory. For example GPU 12 can determine whether the BeginPush page index 238 is equal to the EndPop page index 236. If so, this can indicate that the thread is trying to write data on a page which contains data which is currently being read, which may be prohibited in this example. Thus, if the BeginPush page index 238 and EndPop page index 236 are determined to be on the same page, action 502 can return a failure or error at 1606.

Where the BeginPush page index 238 and EndPop page index 236 are determined not to be on the same page, this may indicate that the page is no longer being used by read threads for reading data. Thus, at 1608, action 502 for obtaining and advancing the write allocation pointer, can include atomic decrementing a page usage counter of a page pointed to by the BeginPush page index. In an example, GPU 12 can be configured to, e.g., via a compute shader or other construct executing a write thread, FIFO queue push/ enqueue routine 314, etc., atomic decrement a page usage counter (of page usage counters 234) of the page pointed to by the BeginPush page index 238. For example, the GPU 12 can perform the atomic decrement using atomic/interlocked operation hardware 63. In addition, multiple atomic decrements performed by multiple write threads may be coalesced into a single subtract operation, as described above. In this regard, decrementing the page usage can allow for determining the amount of available unallocated space remaining on a page. As described, the page usage counter is set to the number of items on a page when the read operation for the page (or all read threads) complete. As the write threads write the data, this number is decremented, as described. When page usage reaches zero, this can indicate that all data on the page has been read.

Thus, at 1610, action 502 for obtaining and advancing the write allocation pointer, can include comparing the original page usage (e.g., the value before the atomic decrement) to zero. In an example, GPU 12 can be configured to, e.g., via a compute shader or other construct executing a write thread, FIFO queue push/enqueue routine 314, etc., compare the original page usage counter to zero. Where the original page usage is greater than zero, this can indicate that there are still items on the page to write, and action 502 can successfully return at 1612 (and, data can be written to the page e.g., by action 506).

Where the original page usage is less than zero, at 1614, action 502 for obtaining and advancing the write allocation pointer, can include determining whether the BeginPush page index plus 1 is less than the EndPop page index. In an example, GPU 12 can be configured to, e.g., via a compute shader or other construct executing a write thread, FIFO queue push/enqueue routine 314, etc., determine whether the BeginPush page index 238 plus 1 is less than the EndPop page index 236 (or that the BeginPush page index 238 otherwise points to a page that has already been read). If not, action 502 can return a failure or error at 1616. Where the BeginPush page index 238 is not less than the EndPop page index 236, this may indicate that the write page pointer is stale, and thus action 502 can proceed to action 1602 to again obtain the write page pointer and the read page pointer.

Where the original page usage is determined to be equal to zero, this may also indicate that reading has completed on the current page, and thus, at 1618, action 502 for obtaining and advancing the write allocation pointer, can include atomically incrementing the BeginPush page index. In an example, GPU 12 can be configured to, e.g., via a compute shader or other construct executing a write thread, FIFO queue push/enqueue routine 314, etc., atomically increment the BeginPush page index 238. For example, this may include using atomic/interlocked operation hardware 63 to increment the BeginPush page index 238. In addition, multiple atomic increments performed by multiple write threads may be coalesced into a single add operation, as described above. After incrementing, action 502 can proceed to action 1614 to determine whether the incremented BeginPush page index is less than the EndPop page index. If not, this can indicate that the new write page is on the same page that is currently being used for read data, and action 502 can return failure at 1616 in this case.

Figure 17:
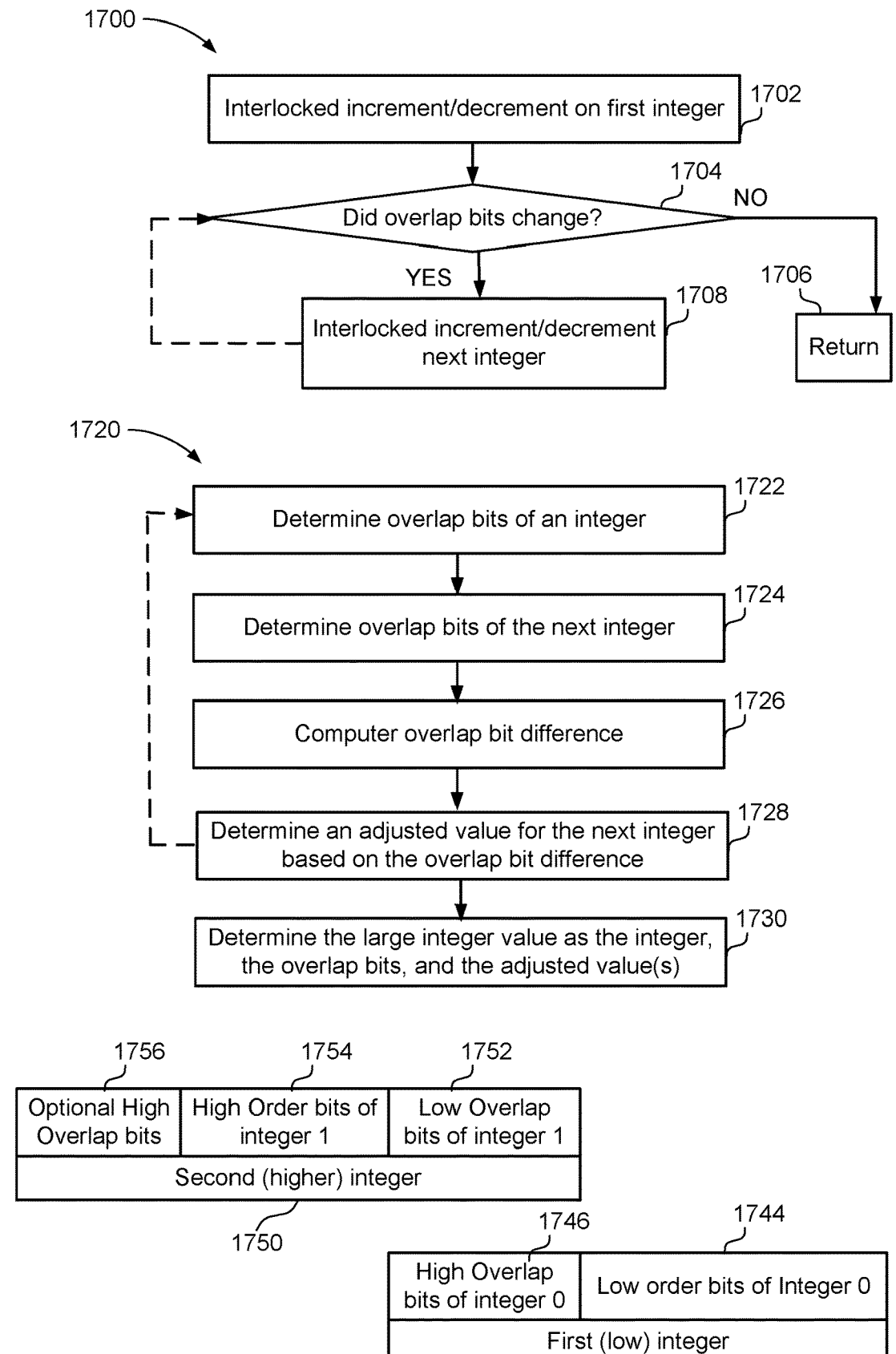
FIG. 17 is a flowchart of an example of a method of operating with large integers according to the described examples.

Referring to FIG. 17, examples of methods for operating with large integers, having a potential size that is beyond the bounds of a single given integer available to the GPU 12, are illustrated. For example, multiple integers (1740 and 1750, etc.) can be used to express and track a value that is beyond the bounds of integers defined for the GPU 12. In this regard, overlap bits (e.g., 1746, 1752, 1756, etc.) of the multiple integers can be used to detect when to increment/decrement a next integer in the multiple integers defining the large integer. This may be useful in GPU operations to maintain the various pointers 214 described herein considering the fact that many threads can execute and operate with the same pointers 214 at similar times. Thus, overflow of the pointers can be prevented by using these example large integer operations.

Method 1700 depicts an example of a method for incrementing or decrementing a large integer at the request of a thread. In method 1700, at 1702, once the request is received, an interlocked increment or decrement can be performed on the first integer 1740. In an example, GPU 12 can be configured to, e.g., via atomic/interlocked operation hardware 63, etc., to perform the interlocked increment/ decrement (e.g., based on whether the request is for increment or decrement) on the first integer. For example, the first integer may be the lowest order of the multiple integers.

In method 1700, at 1704, it can be determined whether the overlap bits 1746 changed as a result of the atomic operation performed in 1702. In an example, GPU 12 can be configured to, e.g., via results returned by atomic/interlocked operation hardware 63, and/or further additional mathematical instructions etc., determine whether the overlap bits changed as a result of the interlocked increment/decrement on the first integer. For example, the overlap bits 1746 can be defined as a set of highest order bits (such as the highest two bits) of the first integer 1740 and can be the same number of lowest order bits (such as the lowest order two bits 1752) of the next integer 1750. If the overlap bits 1746 in the first integer are not changed by operation 1702, this can indicate that the second (1750) and optional further integer(s) containing higher-order bits of the large integer do not need updates, and method 1700 can return at 1706.

If the overlap bits 1746 did change, this can indicate that there is (or should be) another integer to define the large integer, and at 1708, an interlocked increment or decrement can be performed on the next integer 1750. In an example, GPU 12 can be configured to, e.g., via atomic/interlocked operation hardware 63, etc., perform the interlocked increment/decrement on the next integer. In one example, to support another level of large integer, the overlap bits 1756 on the highest order of the next integer 1750 can be checked, and if changed, interlocked increment/decrement can be performed on the integer after the next integer in the multiple integers, and so on.

Method 1720 depicts an example of a method for reading a large integer value at the request of a thread. In method 1720, at 1722, the overlap bits 1746 of an integer can be determined. In an example, GPU 12 can be configured to, e.g., via atomic/interlocked operation hardware 63, or other reads from graphics memory 58 or some other memory, etc., determine the overlap bits 1746 of an integer (e.g., as the highest order bits of the first integer 1740). At 1724, the overlap bits 1752 of the next integer 1750 can be determined. In an example, GPU 12 can be configured to, e.g., via atomic/interlocked operation hardware 63, or operations to read graphics memory 58 or other memory, etc., determine the overlap bits 1752 of the next integer 1750 (e.g., as the lowest order bits of the next integer). At 1726, an overlap bit difference can be determined. In an example, GPU 12 can be configured to, e.g., via operations performed by one or more shader processor core(s) 68, etc., determine the difference between overlap bits of an integer (e.g., overlap bits 1752 of the second integer subtracted from the overlap bits 1746 of the first integer).

At 1728, an adjusted value for the next integer can be determined based on the overlap bit difference. In an example, GPU 12 can be configured to, e.g., via instructions performed by shader processor core(s) 68, etc., determine the adjusted value for the next integer based on the overlap bit difference. In an example, GPU 12 can determine the adjusted value by adding the difference in overlap bits with the value of the second integer. Where there are additional integers representing the large integer, actions 1722, 1724, 1726, and 1728 can be performed on the additional integers to obtain additional adjusted values for higher-order bits of the large integer.

At 1730, the large integer value can be determined as the concatenation of the low order bits 1744 of integer 1740, and the adjusted value(s) calculated from the sum of the higher order integer(s) (e.g., 1750) and the difference in overlap bits 1746 and 1752. In an example, GPU 12 can be configured to, e.g., instructions performed by shader processor core(s) 68, etc., determine the large integer value as the integer, the overlap bits (from either the integer or the next integer), and the remaining bits of the adjusted value(s) of the next integer(s). This large integer value can be returned (e.g., in response to receiving a request for the large integer).

Figure 18:
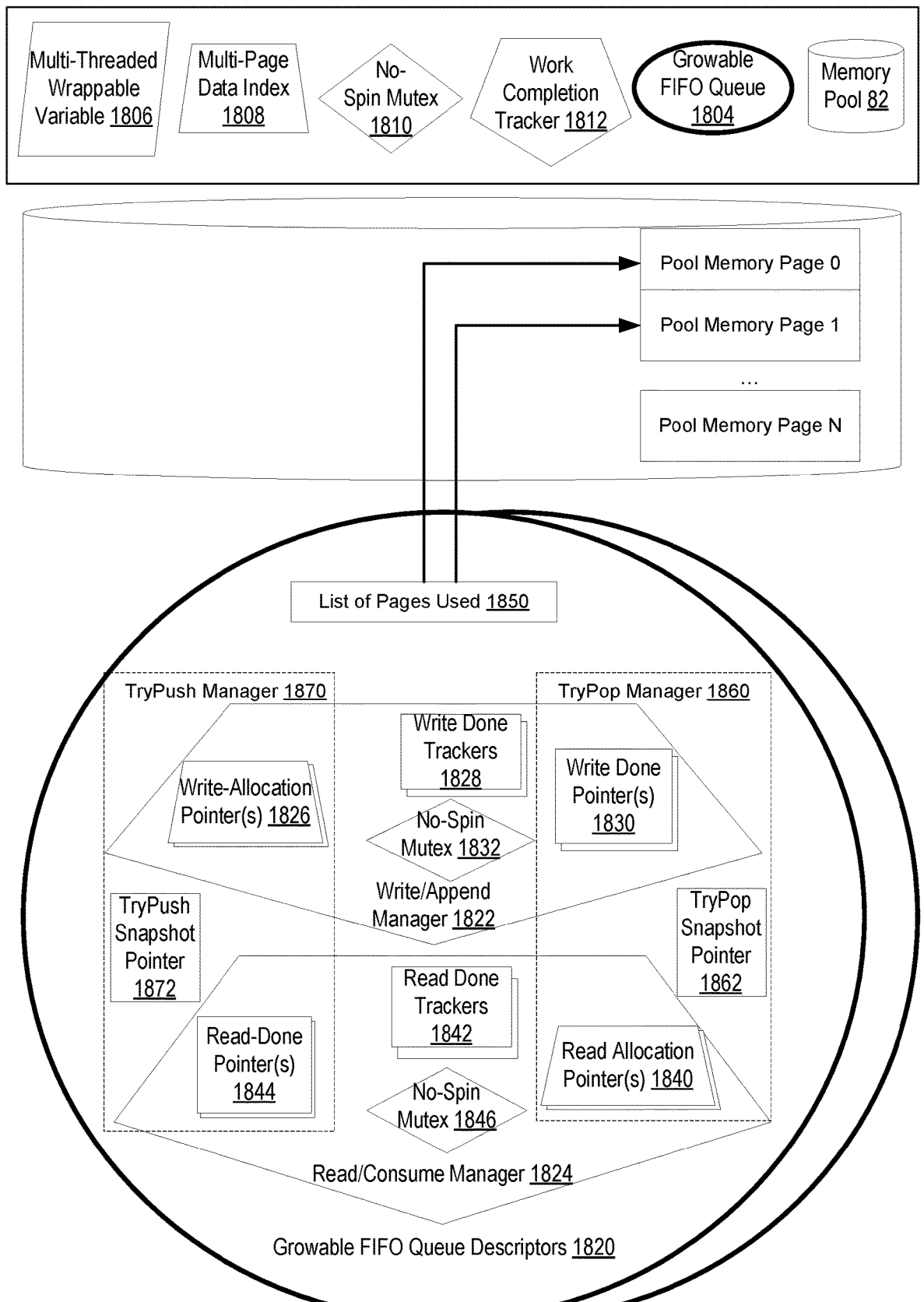
FIG. 18 is a schematic diagram of an example of a hierarchy of components used to build a growable first-in first-out (FIFO) queue.
Figure 19:
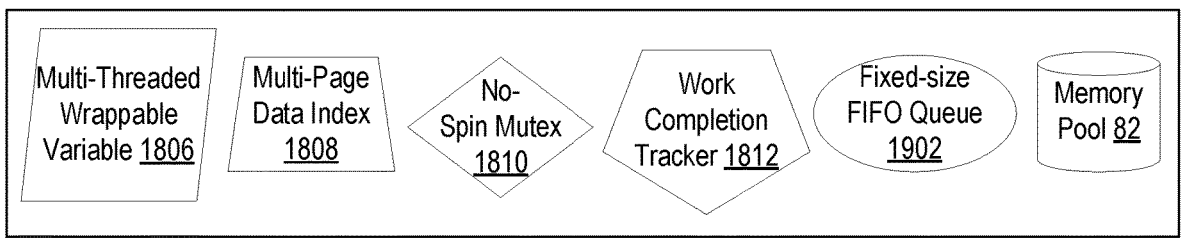
FIG. 19 is a schematic diagram of an example of a hierarchy of components used to build a fixed-size FIFO queue.
Figure 19:
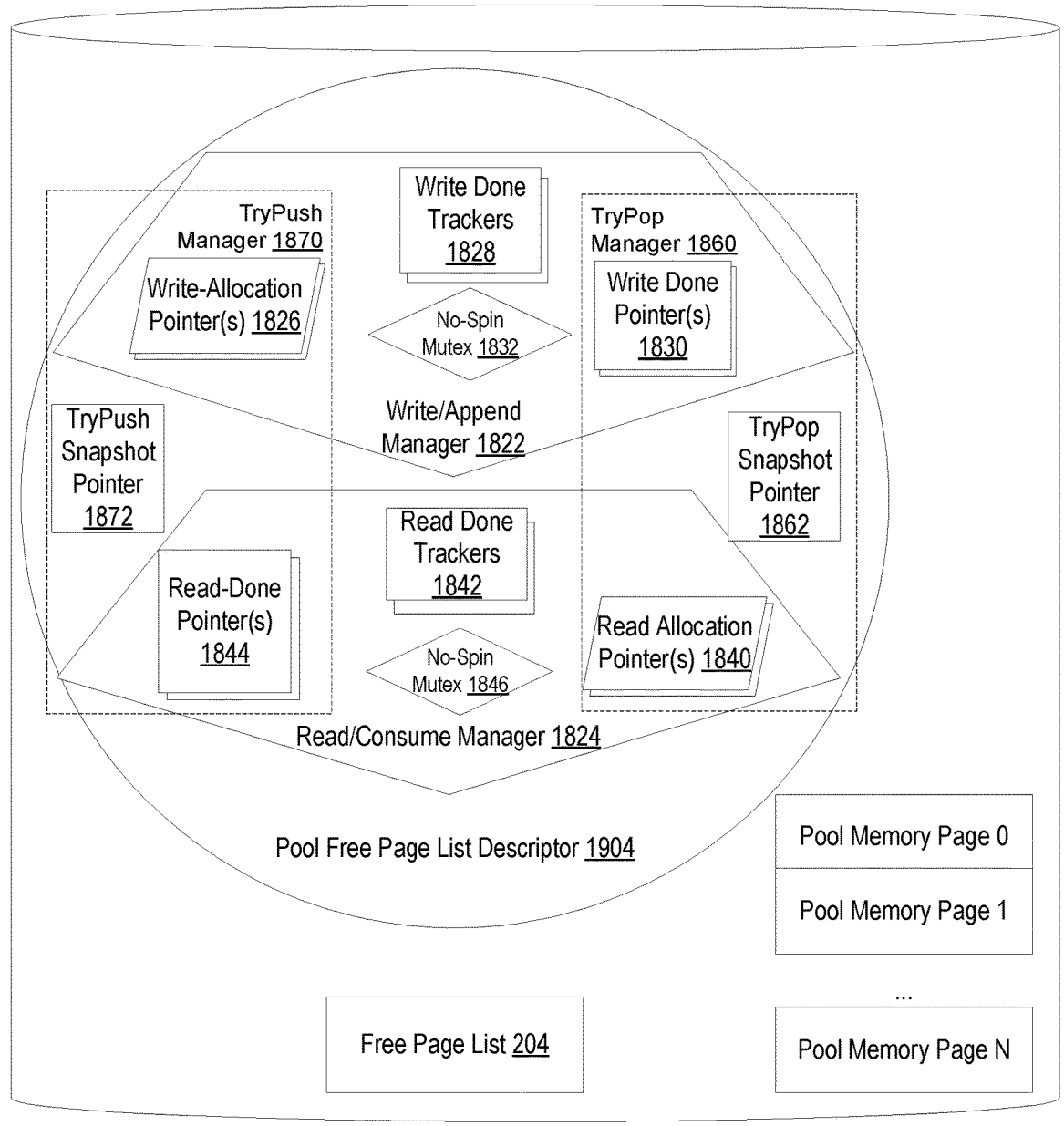

FIGS. 18 and 19 illustrate a hierarchy of objects/classes used to build a non-growable FIFO queue, a memory pool, and a set of growable FIFO queues backed by an associated memory pool, as described above. For example, various components can be provided by the application shader programs 73, FIFO queue manager 74, shader processor core(s) 68 and/or other hardware and/or software components of the GPU 12, CPU 34, etc. as building blocks for providing the growable FIFO queue 1804 and/or related functionality described herein. Each growable FIFO queue 1804 can include growable FIFO queue descriptor 1820 describing a status, contents, etc. of, and/or to facilitate writing data to and/or reading memory from, each growable FIFO queue. In an example, the growable FIFO queue descriptors 1820 may include a write/append manager 1822 having a write allocations pointer 1826, write done counters 1828, write done pointer 1830, no-spin mutex 1832, etc., as described. In addition, in an example, the growable FIFO queue descriptors 1820 may include a read/consume manager 1824 having a read allocations pointer 1840, read done trackers 1842, read done pointer 1844, no-spin mutex 1832, etc., as described. In addition, in an example, the growable FIFO queue descriptors 1820 may contain a list of pages 1850 used by (or assigned to) the growable FIFO queue, where each page referenced (by pointer, index, address, etc.) by the list 1850 is associated with a memory pool 82 associated with the growable FIFO queue.

For example, a Multi-threaded, Wrappable Variable 1806 can be provided. This can be a building block for the read allocation pointer 1908 (also referred to herein as the "Read-Alloc Pointer") of a fixed-size FIFO queue 1902 described in FIG. 19, and write allocation pointer 1906 (also referred to herein as the "Write-Alloc pointer") for use by various read and write threads, as described above. The Multi-threaded, Wrappable Variable 1806 can also be used as a building block of the Multi-Page Data Index 1808, which is described below. The Multi-threaded, Wrappable Variable 1806 can exist in memory, and many threads can increment it simultaneously, using atomic/interlocked operation hardware 63. The Multi-threaded, Wrappable Variable 1806 can have a certain number of bits B (where B can be 32, but could be other values). There can be a "wrap point", or a "maximum valid value" M selected, such that $0<M$, and $2*M<=2^{\wedge}B$ (2 to the power of B). If a thread T (e.g., a read thread or a write thread) increments the wrappable variable (e.g., as part of advancing the corresponding read or write allocation pointer) such that it crosses from $<M$ to $>=M$, the thread T can be responsible for performing an atomic operation to subtract M from the variable. The code executed by all threads that read V (without incrementing it) may occasionally receive a value of V that is $>=M$, in which case those threads may subtract M from their obtained value, before using the results for various calculations. Additionally, the code executed by all threads that increment V may be designed in such that when some thread T causes V to cross the boundary from $<M$ to $>=M$, these other threads may not be allowed to increment V to a value $>=M*2$, before the first thread adjusts the value to a value $<M$. For instance, where B is 32, M may be 89473024 (5461*16384, as may be the case where a Growable FIFO is capable of storing 12-byte data elements into up to 16384 unique 65536-byte pages).

In addition, a Multi-Page Data Index 1808 can be provided, which can be a building block for the Read-Alloc Pointer 1840 and a Write-Alloc Pointer 1826 of the growable FIFO queue 1804. These pointers (which indicate both a page, and indices of memory locations in a page) can be incremented by multiple threads simultaneously, can be converted from a simple numeric representation (which can be easily modified by atomics), into a page index, and an offset within that page, etc. For this Growable FIFO implementation, the Multi-threaded Wrappable Variable 1806 described above can be used. For example, M can be set to the maximum allowed valid value=NumberOfPages*NumberOfUniqueAllowedIndices InAPage. For example, if "V" is the name of the index in memory, then: PageIndex=V/NumberOfUniqueAllowedIndicesInAPage, and IndexWithinThePage is =V % NumberOfUniqueAllowedIndicesInAPage. If M is a power of 2, then the division (/) and modulo (%) operations can simplify to binary math. If M is not a power of 2, then these operations (where division and modulo instructions may not be available on a GPU) can be simplified to simpler multiplication and shift operations, using commonly-known algorithms.

In another example, a No-Spin Mutex 1810 can be provided. There may be situations where a given task is to be performed occasionally, and multiple threads may (e.g., based on their own calculations) determine that the task is to be performed. Especially in shader environments where there are thousands of active threads, it can be desirable to have a mechanism which allows threads to complete a given task, but that no thread waits (e.g., spins) while attempting to start the work. The GPU 12 can provide a No-Spin Mutex by using a single DWORD. The FIFO queue manager 74, application shader programs 73, such as data-production shader program 310, data-consumption shader program 320, etc., can implement or otherwise leverage operations for the No-Spin mutex 1810, such as: "TryToAcquire" (which can return a value representing "acquired" or "some other thread owns"), and "TryToRelease" (which can return a value representing "released" or "try the task again"). TryToAcquire can perform an InterlockedIncrement of the control integer, and can return "acquired" if the previous value was 0, or "some other thread owns" if the previous value is >0. TryToRelease can perform an InterlockedExchange of the control integer, exchanging it with 0. If the previous number was equal to 1, then the release succeeded, and the task is completed. If the previous number was greater than 1, this can indicate that another thread requested that the task be re-tried while the current thread was performing the task. If this is the case, the thread can re-call TryToAcquire. If that fails, this can indicate another thread has acquired the mutex, and can complete the task, so the current thread is done. If the new call to TryToAcquire succeeds, then the thread can loop back to perform the task again, call TryToRelease again, and repeat. In an example, write/append manager 1822 can include one or more no-spin mutexes 1832 to provide such functionality for one or more of the pointers, (e.g., write done pointer 1830), etc. Moreover, in an example, read/consume manager 1824 can include one or more no-spin mutexes 1846 to provide such functionality for updating one or more of the pointers (e.g., read done pointer 1844), etc. For example, the mutexes can correspond to one or more mutexes requested in method 900 of FIG. 9, method 1400 of FIG. 14, etc.

In another example, a Simple Ordered-Start-Unordered-Completion Work Tracker can be provided (which is approximately used as a building block of the Nested Work Completion Tracker 1812). This simple work completion tracker can contain a single work allocation counter (indicating how many work items have been initiated), a single work completion counter (indicating how many work items have been completed, though not in any particular order), a work done pointer (indicating how many consecutive work items, starting at the first, have been completed, and therefore can be used to determine how many consecutive results of the work item tasks can be consumed, or how many consecutive inputs to the work items can be discarded, etc.), and a no spin mutex which controls access to the work done pointer.

If there are a certain number of tasks to perform, FIFO queue manager 74, application shader programs 73, such as data-production shader program 310, data-consumption shader program 320, etc., can provide or utilize a simple Work Completion Tracker to assign work and track how many items have been completed.

When a thread (such as one or more write threads executing in action 404 of method 400, one or more read threads executing in action 412 of method 400, etc.) allocates a work item (or multiple work items), the thread can perform an InterlockedAdd (or InterlockedIncrement) on the Work-Started counter, which can include using atomic/interlocked operation hardware 63 and/or using large integer operations described in methods 1700, 1720 of FIG. 17. When a thread completes a work item, it can perform an InterlockedAdd (or InterlockedIncrement) on the Work Completed counter. The thread can then determine whether it just completed the last initiated work item or not, as for which the thread can re-read the current value of Work Started Counter and compare this value to the new value of the Work Completed Counter. If the thread determines that these values are the same, the thread can attempt to acquire the No-Spin Mutex, and either the thread or a different thread that already owned the mutex can then re-read the Work Started Counter and the Work Completed Counter, and if the two values are equal, set the Work Done Counter equal to the Work Completed Counter. For example, write/append manager 1822 and/or read/consume manager 1824 can be implemented at least partially as a Simple Work Completion Tracker. The concepts used to build the Simple Work Completion Tracker can be used to build a Nested Work Completion Tracker 1812.

In another example, a Nested Work Completion Tracker can be provided, which can facilitate separating a large batch of work into smaller batches (e.g., in executing multiple write threads in action 406 or multiple read threads in action 412 of method 400, and/or in corresponding methods 500, 600), where each batch can include more than one work item. This Tracker can be similar to, and/or may be based on, the Work Completion Tracker 1812, and may use a Multi-Threaded Wrappable Variable 1806 or Multi-Page Data Index 1808 to track allocated work, a per-batch count of how many work items have been completed, optionally a per-batch "Done" pointer, a global "done" pointer, and a mutex or other synchronization primitive such as a global No-Spin Mutex (see above). In allocating new work items, a thread can (e.g., via application shader programs 73, such as data-production shader program 310, data-consumption shader program 320, etc.) increment the Wrappable Data Pointer (and performing the associated wrapping). The thread that allocates a work item can be responsible for determining which batch the work belongs to (or which "page", see the Multi-Page Data Pointer described herein). Once a work item is complete, the thread can be responsible for incrementing the appropriate per-batch Work Completed Counter, then performing similar operations as with the Ordered-Start-Unordered-Complete tracker. After acquiring the global mutex: the thread can be update the per-batch "done" counter, the thread can also check whether the "global done pointer" indicates all work on the page that that global pointer is pointing to or not. If so, the thread can scan through all batches after that, until it finds a batch that is not completely done, and can update the global done pointer to point to the appropriate point in that batch. One thread can do this work, so no other threads have to spin waiting on it. In one example, write/append manager 1822 and/or read/consume manager 1824 can be implemented at least partially as a Nested Work Completion Tracker.

In another example, referring to FIG. 19, a Fixed-Size FIFO queue 1902, also referred to as a Basic Ring Buffer Implementation, can be provided by the FIFO queue manager 74, application shader programs 73, such as data-production shader program 310, data-consumption shader program 320, etc. Implementing a Ring Buffer in a highly-multithreaded environment, such as shaders on a GPU, can be accomplished using examples described herein. Fixed-Size FIFO queue 1902 includes a descriptor as described herein, and can also have an associated data buffer (such as might be described by a base address and a size, e.g., FIFO memory buffer 83). In an example, the data buffer might be used to store a list of addresses (such as a pool free page list descriptor 1904, which can indicate free memory pages in the free page list 204) or other graphics-related or non-graphics-related data. To work with the described features, the Fixed-Size FIFO queue 1902 can be split into segments (or batches or pages) of substantially equal size. As similarly described with respect to the growable FIFO queue 1804 above, in an example, one or more of the following can be used to provide the Fixed-Size FIFO queue 1902: a Multi-Page Data Index 1808 or Multi-threaded Wrappable Variable 1806 for allocating space for writes, a Nested Work Completion Tracker 1812 for writes (e.g., write/append manager 1822), a Multi-threaded Wrappable Variable 1806 for allocating already-written data for reads, a Nested Work Completion Tracker 1812 for reads (e.g., a read/consume manager 1824), and one or more associated memory buffer(s) (which may or may not be located in the FIFO memory buffer 83, memory pool 82, etc.) of a specified size to hold the data, etc. Note that all data written to a specific non-growable FIFO queue's associated buffer can be of the same fixed size, though other FIFO queues may be used to contain data elements of a different size. Or if a non-growable FIFO queue contains multiple associated buffers, each buffer can have its own fixed unique or non-unique element size. In one example, where Multi-threaded Wrappable Variables 1806 are used to provide the pointers, such as Write-Alloc Pointer 1906 and Read-Alloc Pointer 1908, there can be a conversion step to convert between the Multi-threaded Wrappable Variable Pointers, and the actual address in the Fixed-Size FIFO queue 1902 by scaling and offsetting the multi-page data pointer based on the fixed size of the data to read/write, and offsetting the result by a base address associated with a buffer associated with the fixed-size FIFO queue.

There can be multiple steps to use a Fixed-Size FIFO queue 1902, as described above. To write data, for example, a thread writing the data (e.g., the multiple write threads executing in action 406 of method 400 and/or in method 500) can, via application shader programs 73, such as data-production shader program 310, data-consumption shader program 320, etc., increment the Write-Alloc Pointer 1906, and retrieve the previous value of it, convert the pre-incremented Write-Alloc Pointer 1906 to an address to write the data, taking note of which "batch" of data is being written, write the data, and wait for its data to be guaranteed to be fully written and visible to other threads, increment the Nested Work Completion Tracker's appropriate per-batch done counter (e.g., one or more write done counters 1828), and take appropriate steps based on that (e.g., updating the Write Done Pointer 1830 using steps described above). To read data, for example, a thread reading the data (e.g., the multiple read threads executing in action 412 of method 400 and/or in method 600) can, via application shader programs 73, such as data-production shader program 310, data-consumption shader program 320, etc., follow similar steps as used for writing data, except use the Read-Alloc Pointer 1908, and the read-time work completion tracker (e.g., one or more read done counters 1842), instead of the "write" variants. In an example, however, code can be designed to prevent the Fixed-Size FIFO queue 1902 from entirely filling up, to prevent the write pointer from wrapping around and entering the same batch as the read pointer. For example, if the Fixed-Size FIFO queue 1902 of 1 megabyte (MB) is divided into 16 batches of 64 kilobytes (KB) each, the program (such as application shader programs 73, data-production shader program 310, data-consumption shader program 320, etc.) can guarantee there is at least 64 KB of space between the read and write pointers. Also, in some examples, the program (such as application shader programs 73, such as data-production shader program 310, data-consumption shader program 320, etc.) can prevent requesting (or reading) of data that has not been fully written, and (for example) return an error code.

In another example, a Basic Pool Implementation for Shaders can be provided by a library of GPU-executable code. A Pool can refer to a memory allocation subdivided into equally-sized chunks, which can be allocated, used, and then later freed (e.g., returned to the pool), such as memory pool 82, as described above. Using building blocks described above, a Pool can be implemented for highly multithreaded environments like shaders can be implemented, such as memory pool 82. An example pool implementation can include: a memory allocation (e.g., such as initializing the memory at action 402 of method 400), which is subdivided into equal-sized chunks, a Fixed-Size FIFO queue 1902, which hold or manages Free Page list 204, whose associated data buffer is large enough to hold a reference or pointer to each chunk of the pool, plus some extra padding specific to the Fixed-Size FIFO queue 1902 rules discussed earlier. Various operations can be performed on the memory pool 82 such as initializing the pool (e.g., at action 402 of method 400), allocating pages from the memory pool (e.g., at actions 404 or 408 of method 400), and freeing pages back to the pool (e.g., action 414 of method 400), etc.

In an example, initializing the free page list of the pool may be performed by "pushing" one entry into the Fixed-Size FIFO queue 1902 per chunk of the pool, which entry contains a pointer or index to that chunk of the pool.

In an example, allocating from the pool can be done by "popping" one entry from the Fixed-Size FIFO queue 1902. The data "popped" can include an index or pointer to the chunk or page of the pool which can be used.

In another example, once a thread is done using the chunk of the pool it allocated, it can "free" it, by "pushing" the address or index of the pool chunk into the Fixed-Size FIFO queue 1902. The pool's associated Fixed-Size FIFO queue 1902 can be referred to as the Free Page List, or the Free Chunk list. In some implementations, one or more pages of the pool can be pre-allocated to hold the free-page list itself.

In another example, as described, a Growable FIFO queue 1804 can be provided, as described herein. A standard Fixed-Size FIFO queue 1902 implementation, or fixed-size FIFO queue 1902 (described earlier) is of fixed size. A Growable FIFO queue 1804 can be similar in implementation to the Fixed-Size FIFO queue 1902 mentioned earlier, except that the buffer for holding the Growable FIFO queue's data may not be a fixed size. For example, the Growable FIFO queue 1804 can start at an initial size, and then automatically can grow to fit the data that is "pushed" or enqueued into it, and/or can shrink as data is "popped" or dequeued out of it. A Growable FIFO queue 1804 can be associated with a memory pool 82 (as described earlier), whose "chunks" or "pages" can be a reasonably large size (such as 64 KB). These chunks can be allocated by the Growable FIFO queue implementation, via application shader programs 73, such as data-production shader program 310, data-consumption shader program 320, etc., in order to expand the FIFO queue size. In an example, when the FIFO queue data is consumed, empty pages can be returned to the pool. The Growable FIFO queue 1804 can also include a similar tracking structure as was described for the Fixed-Size FIFO queue 1902 (namely, the Write-Alloc Pointer 1826, the Read-Alloc Pointer 1840, the nested write-completion tracker (e.g., write done counter(s) 1828), and the nested read-completion tracker (e.g., read done counter(s) 1842)), but it additionally can contain a list of pages 1850 that are used in the Growable FIFO queue. The list of pages 1850 can be large enough to hold some maximum number of pages, such as the number of pages in the associated pool, if the FIFO queue grows to that maximum size. This page list can be the same size, or smaller than, the number of segments tracked in the Write Done Counters 1828 and/or Read Done Counters 1842.

With Growable FIFO queues, the pages used to store the data may not be contiguous, as is the case with a Fixed-Size FIFO queue 1902. In this example, the process of converting from a Multi-Page Data Index into a data address, can be different than is done for a fixed-size FIFO queue. The address can be calculated using a formula similar to the following: Address=PageAddressList[PageIndex]+OffsetInPage*DataElementSize (where PageIndex and OffsetInPage are calculated using the formulas listed in Multi-Page Data Index). Note, the Growable FIFO queue 1804 can be subdivided into pages, for growing/shrinking purposes. It also can be subdivided into segments (as with the Fixed-Size FIFO queue 1902 implementation), for "work completion" tracking. The segments can be the same size as pages, or they can be larger or smaller. Smaller segments, for example, can allow the "done" pointer to be updated more frequently, though there may be additional processing associated with updating the "done" pointer.

Implementing the Growable FIFO queue 1804 can include pre-allocating new pages before they are needed, as described above. A threshold of memory utilization can be established, such that the thread which allocates data beyond that threshold, can allocate a new page in the memory pool 82, and add the page's address into the page list. The threshold can be set to balance a desire that other threads do not spin waiting for the page allocation to be completed, with conserving memory space. In one example, when the Growable FIFO queue 1804 is initialized, an appropriate number of pages can be pre-allocated. If (for example) the pre-allocation threshold is set at a distance D pages ahead, where 1<D<=2, then 2 pages can be pre-allocated, for example.

In another example, an optimization can be available to Growable FIFO queue 1804 in that pages can be freed out of order. With a Fixed-Size FIFO queue 1902, there may be a per-segment read done pointer, and there can be the global read done pointer, which is updated whenever the oldest per-segment read done pointer is updated. But with growable FIFO queues, in some cases, the global read done pointer may not be used. For example, if growable FIFO queue is initialized such that it has a maximum size of P bytes (e.g., P=1 GB), any page allocated for writes may be freed before P additional bytes are allocated for writing by that FIFO. Removing the global read done pointer can allow a popping operation to become more efficient. In this situation, a page is freed when its associated read done counter reaches a threshold indicating that all data on the page has been fully consumed (and therefore that the page was first fully filled with data).

In another example, Error handling on Underflow can be provided. For example, when using Fixed-Size FIFO queue 1902 or Growable FIFO queue 1804, underflow may occur where a thread requests more data than has been completely written or pushed. To handle such conditions, for example, a shader executing the multiple write threads (e.g., at action 406 of method 400 and/or method 500, using a data-production shader program 310, etc.) or read threads (e.g., at action 412 of method 400 and/or method 600, using a data-consumption shader program 320, etc.) can fire an interrupt, or send a message to a CPU 34 or other processor by some other mechanism, to notify it that the memory pool 82 may be corrupted. In another example, a shader can assume that the threads pushing the data are active but delayed, which can result in the thread which is popping (or reading) the data to spin waiting for the push (or write) to be complete, before attempting to access the data at the returned address. In another example, application shader programs 73, such as data-production shader program 310, data-consumption shader program 320, etc., can allow a mode where the FIFO is either in "append" mode or "consume" mode, but not both simultaneously. In this example, if a "pop" command is received, to pop (or read) data which is not present, the thread can just patch the Read-Alloc Pointer to set it equal to the Write Done Pointer. In another example, a shader program can implement an error handler where the retrieved Read-Alloc Pointer value (and potentially other data such as a FIFO ID) is pushed into a dedicated error-logging Fixed-Size FIFO queue 1902 (or the error log can be a growable FIFO queue). Another thread can go back and read that error logging FIFO queue and process the missed data, once it is present, in an example.

In another example, an Array of Growable FIFO queues 1804 can be provided by the application shader programs 73, such as data-production shader program 310, data-consumption shader program 320, etc. Having multiple Growable FIFO queue 1804 that share a memory pool 82 can be useful, because queue sizes can be determined on the fly, based on the data that the shaders encounter. The memory pool 82, for example, can be sized to fit the largest amount of data expected (plus some padding, due to the Growable FIFO queue pre-allocation functionality), and the FIFO queues can resize themselves within the memory pool. The implementation of a Growable FIFO queue array can be similar to many instances of a single Growable FIFO queue, and there can be some optimizations provided by the FIFO queue manager 74 (e.g., in allocating pages of memory to the multiple FIFO queues in action 404 of method 400) to make it efficient on a GPU 12. Because the 32 or 64 (or other number of) threads in a shader can typically execute the same instructions simultaneously, the GPU 12 hardware typically implements optimizations for when the threads read and write data in close proximity to other threads. In order to optimize for the situation where different threads all want to push data, but to different FIFO queues, components of the FIFO descriptors can be stored as arrays (e.g., a struct of arrays), rather than having an array of FIFO descriptors (e.g., an array of structs). For instance if there are 128 FIFO queues, the 128 Write-Alloc Pointers 1826 (or Write-Alloc Pointers 1906 for fixed-size FIFO queue 1902) can be kept in a 512-byte array, followed by the 128. Read-Alloc Pointers 1840 (or Read-Alloc Pointers 1908 for fixed-size FIFO queue 1902) in another 512-byte array, followed by the No-spin Mutexes 1832, 1846 in another array, and the Done pointers 1830, 1844 in another array. In an example, the array of FIFO queues may include both Growable and Non-Growable types. In this example, the two can be distinguished, and the appropriate style of "push" and "pop" code to execute can be selected to respectively write and read data to the FIFO queues.

In addition, for example, the growable FIFO queue 1804 and fixed-size FIFO queue 1902, a TryPush manager 1870 can be provided including various descriptors and methods for producing and writing data to the queue, and a TryPop manager 1860 for reading and deallocating data from the queue, as described in detail above. For example, the Try-Push manager 1870 can include Write-Alloc Pointer(s) 1826, which can include one or more write allocation pointers 216 described above, a TryPush snapshot pointer 1872, which can be similar to snapshot pointer 228 described above, and/or Read-Done pointer(s) 1844, which can include one or more read done pointers 222 described above. In this example, the data-production shader program 310 can provide or implement the TryPush manager 1870 to produce and write data to the FIFO queue, as described in reference to FIG. 6, method 600, and various examples of action 602 described in methods 800, 900, 1100, 1200, and 1500, in FIGS. 8, 9, 11, 12, and 15, above.

In addition, for example, the TryPop manager 1860 can include Write-Done Pointer(s) 1830, which can include an one or more write done pointers 218 described above, a TryPop snapshot pointer 1862, which can be similar to snapshot pointer 228 (and/or may be the same as the TryPush snapshot pointer 1872) described above, and/or Read-Alloc pointer(s) 1840, which can include one or more read allocation pointers 220 described above. In this example, the data-consumption shader program 320 can provide or implement the TryPop manager 1860 to read and/or deallocate data from the FIFO queue, as described in reference to FIG. 5, method 500, and various examples of action 508 described in methods 700, 1000, 1300, 1400, and 1600 in FIGS. 7, 10, 13, and 14, above.

In another example, one or more collections of shader code, hardware, software, or firmware, etc. can provide mechanisms for reporting status to other portions of the GPU 12 and/or CPU 34. For example, a New Work Summarizer can be provided. For example, it may be desirable for a shader to alert another component or program of the GPU 12 and/or CPU 34 (such as the FIFO queue write-done monitor of Work Launching Program 330, or the command processor 64, or the application 46) when new data is appended to a FIFO queue (whether growable or not). In this example, a bit array can be allocated for this purpose, with one bit per FIFO queue in the array. When the write done pointer 1830 (also referred to herein as the "WDonePtr") is updated for FIFO # F, the shader can atomically set the corresponding bit # F in the array, indicating that new work is available in that FIFO queue. When other component(s) or program(s) of the GPU 12 and/or CPU 34 (such as a write-done monitor 332) acknowledge that the new work has been observed and/or processed, the other component(s) can clear (or request clearing of) the corresponding bit (e.g., and/or can check for new work one additional time, after it clears the bit, to avoid a race condition). In many cases, summarizing the presence of new work in a bit array can be desirable over just having the external code scan through the array of Write Done Pointers, because the bit array for a large collection of FIFOs (such as 128) can typically be read and scanned in a few instructions, where scanning the array of Write Done Pointers may require hundreds of instructions and memory requests.

In another example, a New Work Prioritizer can be provided. In some situations, it can be desirable to prioritize new incoming work. For instance, on GPUs, it can be more efficient to launch shaders that have 64 active threads, instead of launching 64 shaders that each have one thread. Thus, when searching through FIFO queues to determine which FIFO queue to launch shaders to consume data from, it may be desirable to try to prioritize FIFO queues that can launch work in larger batches, in one example, but other consideration for prioritization may be possible as well, such as parsing data in depth-first order, etc. It can be beneficial to have an extra level of sorting and prioritization between the New Work Summarizer and the Auto-Dispatcher (described below) or Work Launching Program 330. A thread, either in a shader, or on the CPU, or on some other processor on the GPU, or a piece of dedicated hardware, etc., can periodically (or due to a message or interrupt from the shaders) perform an ordered scan the Write Done Pointers 1830 that have been updated (possibly according to the first level of New Work Summarizer booleans), and categorize the new work based on various criteria (index of the FIFO queue, amount of work pushed-but-not-popped, etc.). The work can then be prioritized into buckets, with one bit per FIFO queue per bucket. A highest-priority bucket can have an N-bit array, indicating which FIFO queues have data that are high-priority. A next-highest priority bucket can have an N-bit array, indicating which FIFO queues have data in that bucket, etc. A thread that prioritizes work, therefore can check for new work from the New Work Summarizer bits, read the Write Done Pointer 1830, and see how much new work is available on this FIFO queue; set the appropriate bit in the appropriate priority bucket, and potentially clear the corresponding bit in other priority buckets, clear the appropriate New Work Summarizer bit, check the Write Done Pointer 1830 again (to avoid race condition), and repeat the past few steps if it changed.

In another example, a Basic Auto-Dispatcher can be provided (e.g., a dispatcher thread, such as Work Launching Program 330 as described above) which may be executing on CPU 34, GPU 12, etc.). When data is pushed into various FIFO queues, it may be desired to have a mechanism to know how much data was written, and be able to launch shader threads to consume the data. For example, the FIFO queue work-launching program 330 can wait for all data to be written to a FIFO queue, then check how much data was written via the Write Done Pointer, then launch a sufficient threads to read the data. In another example, the Auto-Dispatcher (e.g., FIFO queue work-launching program 330) can manage a variable per FIFO queue to track how much data any consumer (or read) threads are intended to consume (such as Read Allocation Pointer 216 or a copy of it). In this example, the Auto-Dispatcher can periodically check if Write Done Pointer 1830 has been updated (or use the output of the New Work Prioritizer, or use the results of the New Work Summarizer directly). Based on prioritization algorithms (which may include tracking the fullness of various FIFO queues, a priority based on FIFO ID, or based on the high few bits of the FIFO ID, some other factors, or a combination of the above), the Auto-Dispatcher can select a FIFO queue to be consumed from, select a Shader to be launched, determine the number of threads or thread groups to be launched, launch the Shader and corresponding threads/thread groups, update the data to be consumed variable (and perform wrapping, if necessary, according to the Arbitrarily-wrappable Index rules), and update the New Work Prioritizer or Summarizer state, if necessary.

In an example, the Auto-Dispatcher can be single-threaded, although it could be multi-threaded in order to hide latency of fetching the Write Done Pointers and other states. Dedicated hardware could be added to simplify or optimize some of the prioritization. In an example, Auto-Dispatcher can select a FIFO queue by using InterlockedCompareExchange operations. In an example, the Auto-Dispatcher can sit in an infinite loop, always checking for work; or Terminate once all shaders it has launched have terminated, and all relevant FIFO queues are drained. The basic Auto-Dispatcher can include some logic to dictate prioritization, access to Write Done Pointers 1830, and optionally a New Work Prioritizer and/or New Work Summarizer, a selection of which FIFO queues to monitor (typically either all FIFOs in an array, or a range of FIFO queues, and/or an array of Shaders or which Pipeline State Objects to use when launching work, per FIFO queue. The shaders launched by the basic Auto-Dispatcher may expect it to pass in the FIFO ID to fetch from, as an input to the shader (since it is conceivable that a given shader might be used to digest work from more than one FIFO queue).

In another example, an Ordered Push and Pop can be provided. For example, if the Basic Auto-dispatcher launches 1024 threads (e.g., executing a data-consumption shader program 320) to consume data from a FIFO queue, there may be no guarantee that the first of those threads will see the first piece of data, nor that the last thread will get the last piece of data. Indeed, if the Auto-Dispatcher immediately launches another 128 threads to consume more data, it is possible that some of those 128 threads could get data that is located earlier in the FIFO queue than some of the data retrieved by some of the 1024 threads (e.g., due to the push or pop algorithm, and/or due to the timing disturbances that can occur in a massively parallel environment).

There can be are some shader programming algorithms that require strict access to the data, or where the algorithm becomes more efficient if that strict access can be provided. For these situations, the Auto-Dispatcher can be modified, such that the Auto-Dispatcher performs the first step of "begin push", e.g., it performs the Atomic Add on the Read-Alloc Pointer 1840. The Auto-Dispatcher can then pass the original Read-Alloc Pointer value as an input to the shaders, along with a ThreadID (and FIFO ID), and the shaders, or related write threads (e.g., executing at action 406 of method 400 or method 500) or read threads (e.g., executing at action 412 of method 400 or method 600) can accordingly generate their ordered index based at least in part on the provided Thread ID (e.g., Read-Alloc Pointer+ Thread ID, or some variation). Depending on the implementation, it may be desirable to have either the Auto-Dispatcher, or the Launched Thread, perform the atomic "wrap" operation to the Read-Alloc Pointer 1840. In an example, all (or multiple) shader threads can perform local wrap operations, in case the dispatcher wraps beyond the end of the last allowed page/segment index of the FIFO queue. The shader threads can also perform Page Pre-allocation, and page address lookup, as described. Moving the initial Read-Alloc Pointer operation into the AutoDispatcher also may have a performance benefit, because having one thread perform a single "add" on behalf of for multiple threads may be more efficient than having multiple shader threads each perform a single "increment by 1" operation. This same style of Ordered operation can also be applied to Pushes as well, as described above. For instance, if a shader consumes data from FIFO queue A, then produces additional data to be pushed into FIFO queue B, both operations can be ordered.

The Auto-Dispatcher gives the Read-Alloc Pointer 1840 and Write-Alloc Pointer 1826 as an input to the shader.

In another example, Multiplication and Division of Work can be provided. An advanced Auto-Dispatcher, supporting Ordered Push/Pop, can also be made to support multiplication and division of work. Per FIFO queue, for example, the Auto-Dispatcher can determine how many threads (T) should be used to consume a certain number (N) of items out of the FIFO queue. To handle N items, the Auto-Dispatcher can wait for at least N items to be available, then launch (a/N)*T threads (e.g., write threads at action 406 in method 400 or method 500 and/or read threads at action 412 in method 400 or method 600) to process that data, where "a" is the largest multiple of N less than or equal to the number of items actually available. The method of dispatching T threads can be specified by: .x and .y size components are used to specify the number of threads (where .x*.y=T), and .z specifies the maximum number of groups of N items to handle in a single thread group.

In another example, Page and Partial Dispatches can be provided by the Auto-Dispatcher. In some examples (e.g., involving Sorting), it can be desirable for a thread group or thread groups to process all pushed elements on a given page, or a portion of a page. The Auto-Dispatcher can be made aware of this (e.g., by a "use pages" flag, per FIFO queue). The Auto-Dispatcher can launch N threads or thread groups per page to perform the sort. In some situations, only a partial page of data may be available, but it may be desirable to still launch shaders to perform the sort. In this example, the shaders can be designed to expect an extra input from the Auto-Dispatcher, (e.g., besides just the initial Read-Alloc Pointer), in the form of a post-added Read-Alloc Pointer. This can help to define the range of a number of items that the shader thread groups can sort or digest. Thread groups can determine whether they are part of the page of the Initial Read-Alloc Pointer, or whether they are in the page including the end Read-Alloc Pointer, or whether they are in a page which contains both, or neither.

In another example, Multi-Push, Multi-Pop, and Task Graphs can be provided. For example: shader A reads from FIFO 0, and writes data to both FIFO 1 and FIFO 2, Shader B reads from FIFO 1, and writes to FIFO 3, Shader C reads from both FIFO 2 and FIFO 3, combines their data, and outputs to some non-FIFO buffer. Shader C may expect that the first element it reads from FIFO 2 to correspond to the first element it reads in FIFO 3. In other words, for data fork/join behavior like this, strict ordering may be expected. For situations like this, the Auto-Dispatcher can be modified such that, instead of treating the list of FIFOs as to-do lists (e.g., meaning, "grab an element from this FIFO, and launch a shader thread to read it"), the Auto-Dispatcher can first receive a list of tasks. In the above example, the tasks may be: "for every 1 element to read from FIFO 0, allocate 1 element in FIFO 1, and 16 elements in FIFO 2, and launch N threads of shader A to do that work," "for every 1 element to read from FIFO 1, allocate 1 element in FIFO 2, and launch one shader B thread to do that work," "for every 1 element in FIFO 2, and 16 elements in FIFO 3, launch one thread group of Shader C to do that work." The Auto-Dispatcher can launch Shader C when at least one element was present in FIFO 2, and at least 16 elements were present in FIFO 2. Depending on the desired behavior of the task graph, the Auto-Dispatcher can use a variety of Ordered Push/Pop (for cases where data needs to converge), or unordered (especially for cases where a shader can add an unknown amount of data to a variety of FIFOs). The Work Prioritizer can be updated to handle prioritizing a task graph node (with its plurality of inputs and/or outputs), instead of a queue, for example.

In another example, Single-Write-Multi-Read, and Page Freeing can be provided. For example, there may be some situations where a single piece of data is written, but then multiple shaders may attempt to read the data before it is freed. In this example, it may be more efficient to leave the data in place, and only free it once all involved shaders have read it, rather than making multiple copies of the data for each shader reading the data to free. In this regard, the Auto-Dispatcher, in executing multiple read threads (e.g., at FIFO queue multi-allocate-for-read routine 334 of FIFO queue work-launching program 330) can track one separate "Work Launched" pointer per consumer (e.g., per thread of the multiple executed threads that desires to read the data). Each task graph node can include not only directions or related parameters for how much data to read from each FIFO, but also a memory location for the Auto-Dispatcher to write its current Work Launched pointer, per FIFO queue, that it reads. Similar functionality can be provided for multi-push situations. In addition, the data can be freed once all threads are done reading it. For example, if the two readers of the data are strictly ordered (e.g., the data is written by Shader A, then read by Shader B, and then, after Shader B is done, Shader C reads it also, meaning that Shader C does not read a portion of data before Shader B does), then Shader B can skip the "end_pop" code where the Read Done Pointer is moved, and Shader C can perform that work. If Shader B and Shader C can both consume a piece of data in arbitrary order, then it can be more desirable to implement an "AddRef"/"Release"-style mechanism. That is, for every element Shader A writes, it increments a counter (e.g., stored per page) by 2 (e.g., as there are 2 consumers). Additionally, Shader A increments the count by an extra 1 when it first arrives on the page, and decrements it by 1 when it writes the final element on the page, ensuring that the page is not freed while it is still being written. Shaders B and C each decrement the counter by 1 when they consume the data. Or, Shader B and Shader C can skip any per-page reference counting, and the Auto-Dispatcher can queue a work item to be completed when all of Shader B and Shader C's threads are completed, which work item instructs the Auto-Dispatcher to free the pages (or otherwise launch a shader to free the pages). This can be done by remembering the Read-Alloc Pointer that is to be reached by the time Shader B and C are done, along with the Read-Alloc Pointer that they started with. The cleanup shader (or the Auto-Dispatcher itself) can then free any fully-consumed pages between the two Read-Alloc Pointers.

In another example, the FIFO queue manager 74 can virtualize the memory pool 82 in initializing the memory pool and/or allocating pages from the memory pool, as described in conjunction with actions 402, 404 of method 400. There may be some situations where the amount of pool space required for Growable FIFO queue-related work (or any other work requiring the allocation of pool pages) can increase or decrease over time. In some situations, the memory pool 82 may be nearly entirely in use, and in other situations, the memory in pool 82 may be nearly free, but other unrelated programs or pieces of the pool-using program may wish to use the space in graphics memory 58 that the memory pool 82 is consuming. In some examples, the memory pool 82 can include a large (>=1 GB) allocation. But it may be possible to virtualize the pool, such that it uses a larger (>4 GB) virtual address allocation, but reserves the number of physical pages that it actually needs (plus some buffering, for efficiency).

In this example, the maximum number of pages used over a period of time can be tracked. This can be an "interlocked max" operation, with an interlockedExchange to reset the value. The memory pool 82 can include an additional Fixed-Size FIFO queue 1902, listing pages which are not currently physically backed by actual physical memory, which can mean that the GPU's page tables map a given virtual address page as "invalid." A separate component (e.g., executing on a CPU 34, or possibly the same processor running the Auto-Dispatcher) monitors the memory pool 82. When the memory pool 82 achieves a threshold, the component can request additional physical pages to be mapped into the pool. This can be accomplished by popping an address off of the "Unmapped Pages" Fixed-Size FIFO queue 1902, allocating physical memory for the page, and patching the page table to properly back the page with physical memory. The page is then added to the "Unused Pages" Fixed-Size FIFO queue 1902 (e.g., instead of the Unmapped list FIFO queue 1902). If the memory pool 82 is consistently using significantly fewer pages than are allocated to it, then it can offload some of its pages. This can be done by popping one or more page addresses off of the "unused" buffer, invalidating their page table entry, and adding the address to the "unmapped" Fixed-Size FIFO queue 1902.

In another example, Automatic Pool Validation can be provided on CPU and/or GPU, and/or by a Graphics API 52 or GPU driver 48, etc. Some features that use multithreading or pool management may be easily corrupted in implementation, and corrupting something like the unused page list of the memory pool 82 may result in dramatic corruption in many places. Likewise if the push/pop logic that writes to and reads from the memory pool 82 is not implemented or called properly, pages may be lost, double-freed, etc., which may cause undesirable behavior. Thus, in an example, the Auto-Dispatcher can be put in a mode to automatically validate the various growable FIFO queue descriptors 1820, Pool Free Page List Descriptor 1904 and data in free page list 204, and other Tracking Data. This validation can be performed by halting the GPU after a certain shader is done (or after every use of a certain FIFO queue, or randomly, or every N Dispatches, etc.), then running a shader or CPU code which validates the buffers and tracking structures, etc. To track individual Fixed-Size FIFO queues 1902 and 1820, shaders can check to ensure that the Read-Alloc Pointers 1840/1908, Write-Alloc Pointers 1826/1906, Read Done Pointers 1844, and Write Done Pointers 1830 are all valid—when there are no shaders running which are actively pushing or popping data, these can all have a value between 0 and the maximum allowed value. Also, the Done Pointers should match the Alloc Pointers.

Any pages listed in the Growable FIFO queue's page list which are between the Write Done Pointer 1830 and the Read Done Pointer 1844, should be valid (otherwise corruption has occurred). Any pages which are not in valid portion of the lists of pages used 1850, may be invalid, and may appear in the free page list 204 (or if a physically-unbacked list FIFO queue 1902 is present, they could appear in that list), otherwise corruption has occurred. To track pool corruption, a boolean array can be allocated, with one bit per pool page. Iterating through the pool's "unallocated" list, through the "unused" list, and through each Growable FIFO queue, every time a given pool page is used, the boolean can be set to true using an interlocked operation. If the bit was already set when an operation says to set it, this can indicate that two things reference the same page, and corruption has occurred. Or, alternatively, if any page's bits are still zero when the scan is complete, this can indicate that a page has been lost, and corruption has occurred. The results of the validation can be written to a struct, and sent to an application 46, or driver 48, or API 52 that can report the problem to the user (e.g., via Interrupt, via debug spew, telemetry sent to a server in the Internet, or by some other mechanism).

In another example, Out-of-Order Free on a Growable FIFO queue can be provided. An example use case for Growable FIFO queues can involve data being allocated and written in order, and consumed in order. There may be other use cases where the Growable FIFO queue is allocated and written in order, but the data is consumed out of order. For instance, if references or indexes to the contents of the FIFO queue are stored elsewhere, shader threads (e.g., multiple read threads executing in action 412 of method 400 and/or method 600) can derefence those pointers to consume data out of order. In these situations, instead of using allocpop (e.g., where the Read-Alloc Pointer is moved after reading data e.g., at action 602) and end pop (e.g., where the Read Done Pointer is moved after reading data e.g., at action 602), the allocpop may be unnecessary (because pointers to the data are already known); the data can accordingly be freed using an Add-Ref/Release model (e.g., allocpush Add-Ref s a reference count, and "end_pop" increments a count of data consumed). When both counts are equal to the size of the page, the Auto-Dispatcher (e.g., FIFO queue work-launching program 330) or a thread executing a data-consumption shader program 320 (or other mechanism) can free the page, even if it is out of order. In this regard, a nested completion tracker (e.g., Write-Done Counter(s) 1828) may be used for pushing data, and/or a simple ordered-stat-unordered-completion tracker (e.g., the simple tracker upon which Work Completion Tracker 1812 is derived) may be used when consuming the data, because the consumption of the data may not require pages to be kept in any sort of order. An alternative approach may be to use a true Add-Ref/Release model, where a single "reference count" is incremented on production, and decremented on consumption. The page is freed once the reference count reaches zero, and some other condition is reached that indicates that all data to be written to the page has been written.

In yet another example, Indirect Auto-Dispatch can be provided. There may be situations where a shader or other source, fills a Growable FIFO queue or Fixed-Size FIFO queue 1902 with counts of threads to be launched. The Auto-Dispatcher can be modified to check for work in this Fixed-Size FIFO queue 1902, and perform the "pop" of this data, in order to launch work that it references. In a normal Auto-Dispatch, the Auto-Dispatcher determines how many entries are in a Growable FIFO queue or Fixed-Size FIFO queue 1902, and launches threads to consume that data. But in this indirect approach, the Auto-Dispatcher fetches the contents of the Growable FIFO queue or Fixed-Size FIFO queue 1902, in order to launch future work. For the act of launching the indirect work, for example, the indirect buffer can be permanently associated with one shader or PSO that can be responsible for consuming the data (e.g., by executing multiple read treads in action 412 of method 400 and/or method 600), and the indirect ring/FIFO can contain both a "count" and a pointer to a PSO or Shader (or the contents of the PSO, directly) associated with each count in the ring. Additionally, the count of threads to launch can include either one dimension (such as X or Z), or it could contain some combination of counts of two or three of the dimensions (X/Y/Z).

There also may be an optimization opportunity, which relates to how the Growable FIFO Implementation includes the Nested Work Completion Tracker. For example, if a combination of software and hardware can guarantee that there cannot be a span of more than N elements within the FIFO queue, of which shader threads have started a Begin_push without completing an end_push, then the memory required for the Nested Work Completion Tracker can be reduced to track completion of a small number (Q) of segments, where Q=ceiling((N−1)/NumElementsPerSegment)+2. By shrinking the number of work-completed counters, it may allow greater likelihood that in-use counters share cachelines, which can improve performance. A similar improvement can be done to the Basic Pop implementation.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method for managing first-in first-out (FIFO) queues in graphics processing, comprising:
    allocating multiple pages of memory to a FIFO queue of multiple FIFO queues; and
    executing, via parallel execution of multiple read threads of a graphics processing unit (GPU), a read operation to read data from memory locations in multiple pages of memory corresponding to the FIFO queue, wherein, for a given read thread of the multiple read threads, the read operation comprises:
        obtaining and advancing one read allocation pointer of multiple read allocation pointers, wherein the multiple read allocation pointers are associated with the FIFO queue, and
        determining whether the one read allocation pointer of the multiple read allocation pointers is greater than one write done pointer of multiple write done pointers maintained for the FIFO queue;
        where the one read allocation pointer is not greater than the one write done pointer:
            reading data from one or more memory locations to which the one read allocation pointer points within the memory; and
        where the one read allocation pointer is greater than the one write done pointer:
            determining, based on obtaining a read index and a write index from a snapshot pointer used to avoid race conditions that may occur when reading and/or writing the data, whether to read data from one or more memory locations within the memory.

2. The method of claim 1, further comprising obtaining the read index and the write index from the snapshot pointer, determining the one read allocation pointer from the multiple read allocation pointers based on the read index, and determining the one write done pointer from the multiple write done pointers based on the write index.

3. The method of claim 2, further comprising where the one read allocation pointer is greater than the one write done pointer, at least one of waiting for an event or a period of time before reading the data from the one or more memory locations, or indicating an error resulting from execution of the read operation.

4. The method of claim 3, further comprising where the one read allocation pointer is greater than the one write done pointer, rereading the snapshot pointer to determine whether the write index has changed.

5. The method of claim 4, further comprising where the write index has changed, determining whether the one read allocation pointer is greater than a next write done pointer based on the write index, where the one read allocation pointer is not greater than the next write done pointer, waiting for the event or period of time before reading the data from the one or more memory locations, and where the one read allocation pointer is greater than the write done pointer, indicating the error resulting from execution of the read operation.

6. The method of claim 2, further comprising where the one read allocation pointer is greater than the one write done pointer, rereading the snapshot pointer to determine whether the read index has changed, where the read index has changed, determining whether the one read allocation pointer is less than a write done pointer corresponding to the read index prior to the change.

7. The method of claim 6, further comprising:
where the one read allocation pointer is not greater than the write done pointer corresponding to the read index prior to the change:
reading data from one or more memory locations to which the one read allocation pointer points within the memory; and
advancing the one read allocation pointer to a next memory location following the one or more memory locations, wherein the one read allocation pointer is common to the FIFO queue; and
where the one read allocation pointer is greater than the write done pointer corresponding to the read index prior to the change at least one of:
indicating an error resulting from execution of the read operation; or
retrying the read operation.

8. The method of claim 6, further comprising setting a second one of the multiple write done pointers, that corresponds to the read index prior to the change, based on determining that a write operation writes data to one or more memory locations that fill a memory page.

9. The method of claim 8, further comprising setting the second one of the write done pointers based at least in part on determining whether the one read allocation pointer is underflowed.

10. The method of claim 2, further comprising where the one read allocation pointer is greater than the one write done pointer, determining whether the snapshot pointer moved.

11. The method of claim 10, further comprising where the snapshot pointer moved, advancing the one read allocation pointer and rereading the write done pointer to determine whether the one read allocation pointer is greater than the reread write done pointer.

12. The method of claim 10, further comprising where the snapshot pointer moved, determining whether a primary write done pointer matches the one write done pointer corresponding to the write index.

13. The method of claim 12, further comprising where the primary write done pointer matches the one write done pointer corresponding to the write index, advancing the one read allocation pointer and rereading the write done pointer to determine whether the one read allocation pointer is greater than the reread write done pointer.

14. The method of claim 12, further comprising where the primary write done pointer does not match the one write done pointer corresponding to the write index, acquiring a mutex.

15. The method of claim 14, further comprising where the primary write done pointer does not match the one write done pointer corresponding to the write index, determining whether the snapshot pointer moved.

16. The method of claim 15, further comprising, where the snapshot pointer moved, releasing the mutex, advancing the one read allocation pointer and rereading the write done pointer to determine whether the one read allocation pointer is greater than the reread write done pointer.

17. The method of claim 15, further comprising, where the snapshot pointer did not move, setting the one read allocation pointer and the one write allocation pointer to new values, incrementing the snapshot pointer, releasing the mutex, advancing the one read allocation pointer and rereading the write done pointer to determine whether the one read allocation pointer is greater than the reread write done pointer.

18. A method for managing first-in first-out (FIFO) queues in graphics processing, comprising:
allocating multiple pages of memory to a FIFO queue of multiple FIFO queues; and
executing, via parallel execution of multiple read threads of a graphics processing unit (GPU), a read operation to read data from memory locations in multiple pages of memory corresponding to the FIFO queue, wherein, for a given read thread of the multiple read threads, the read operation comprises:
determining, by the given read thread, whether a read page pointer, which points to a page of memory being read, and a write page pointer, which points to a page of memory being written, point to a same page of the memory;
where the read page pointer and the write page pointer do not point to the same page of the memory:
reading, by the given read thread, data from one or more memory locations to which a read allocation pointer points within the memory; and
advancing, by the given read thread, a read done pointer to the one or more memory locations, wherein the read allocation pointer and the read done pointer are common to the FIFO queue; and
where the read page pointer and the write page pointer point to the same page of the memory, indicating an error resulting from execution of the read operation.

19. The method of claim 18, where the read page pointer and the write page pointer do not point to the same page of the memory, further comprising:
decrementing a page usage value;
where the page usage value, before decrementing, is greater than zero, reading the data from the one or more memory locations and advancing the read allocation pointer; and
where the page usage value, before decrementing is not greater than zero:
where the page usage value, before decrementing, is equal to zero, incrementing the read page pointer;
where the page usage value, before decrementing, is less than zero, determining whether the read page pointer is less than the write page pointer;
where the read page pointer is less than the write page pointer, obtaining new values for the read page pointer and the write page pointer and determining whether the new values of the read page pointer and the write page pointer point to the same page of the memory; and
where the read page pointer is not less than the write page pointer, indicating an error resulting from execution of the read operation.

20. The method of claim 19, further comprising executing, via parallel execution of multiple write threads of the GPU, a write operation to write data to memory locations in the multiple pages of memory, wherein, for a given write thread of the multiple write threads, the write operation comprises:
writing data to one or more memory locations to which a write allocation pointer points;
advancing a write done pointer to the one or more memory locations;
where the write done pointer indicates that a full page of memory is written:

setting the page usage value to a number of items on the full page of memory; and incrementing the write page pointer.

21. A method for managing first-in first-out (FIFO) queues in graphics processing, comprising:

allocating multiple pages of memory to a FIFO queue of multiple FIFO queues; and executing, via parallel execution of multiple write threads of a graphics processing unit (GPU), a write operation to write data to memory locations in multiple pages of memory corresponding to the FIFO queue, wherein, for a given write thread of the multiple write threads, the write operation comprises:

obtaining and advancing one write allocation pointer of multiple write allocation pointers, wherein the multiple write allocation pointers are associated with the FIFO queue, and determining whether the one write allocation pointer of the multiple write allocation pointers is greater than one read done pointer of multiple read done pointers maintained for the FIFO queue;

where the one write allocation pointer is not greater than the one read done pointer:

writing data to one or more memory locations to which the one write allocation pointer points within the memory; and where the one write allocation pointer is greater than the one read done pointer:

determining, based on obtaining a read index and a write index from a snapshot pointer used to avoid race conditions that may occur when reading and/or writing the data, whether to write data to one or more memory locations within the memory.

22. The method of claim 21, further comprising obtaining the read index and the write index from the snapshot pointer, determining the one write allocation pointer from the multiple write allocation pointers based on the write index, and determining the one read done pointer from the multiple read done pointers based on the read index.

23. The method of claim 22, further comprising where the one write allocation pointer is greater than the one read done pointer, determining whether the snapshot pointer moved, and where the snapshot pointer moved, advancing the one write allocation pointer and rereading the read done pointer to determine whether the one write allocation pointer is greater than the reread read done pointer.

24. A method for managing first-in first-out (FIFO) queues in graphics processing, comprising:

allocating multiple pages of memory to a FIFO queue of multiple FIFO queues; and executing, via parallel execution of multiple write threads of a graphics processing unit (GPU), a write operation to write data to memory locations in multiple pages of memory corresponding to the FIFO queue, wherein, for a given write thread of the multiple write threads, the write operation comprises:

determining, by the given write thread, whether a write page pointer, which points to a page of memory being written to, and a read page pointer, which points to a page of memory being read, point to a same page of the memory;

where the write page pointer and the read page pointer do not point to the same page of the memory:

writing, by the given write thread, data to one or more memory locations to which a write allocation pointer points within the memory; and advancing, by the given write thread, a write done pointer to the one or more memory locations, wherein the write allocation pointer and the write done pointer are common to the FIFO queue; and where the write page pointer and the read page pointer point to the same page of the memory, indicating an error resulting from execution of the write operation.

25. The method of claim 24, where the write page pointer and the read page pointer do not point to the same page of the memory, further comprising:

decrementing a page usage value;

where the page usage value, before decrementing, is greater than zero, writing the data to the one or more memory locations and advancing the write allocation pointer; and where the page usage value, before decrementing is not greater than zero:

where the page usage value, before decrementing, is equal to zero, incrementing the write page pointer;

where the page usage value, before decrementing, is less than zero, determining whether the write page pointer is less than the read page pointer;

where the write page pointer is less than the read page pointer, obtaining new values for the write page pointer and the read page pointer and determining whether the new values of the write page pointer and the read page pointer point to the same page of the memory; and where the write page pointer is not less than the read page pointer, indicating an error resulting from execution of the write operation.

\* \* \* \* \*